US012795536B2

(12) United States Patent
Lei et al.

(10) Patent No.: US 12,795,536 B2
(45) Date of Patent: Nov. 10, 2026

(54) SIGNAL MEASUREMENT OPERATIONS FOR REDUCING POWER CONSUMPTION AT A USER EQUIPMENT

(71) Applicant: QUALCOMM Incorporated, San Diego, CA (US)

(72) Inventors: Jing Lei, San Diego, CA (US); Nazmul Islam, Littleton, MA (US); Chun-Hao Hsu, San Jose, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 408 days.

(21) Appl. No.: 18/489,781

(22) Filed: Oct. 18, 2023

(65) Prior Publication Data

US 2024/0196290 A1 Jun. 13, 2024

Related U.S. Application Data

(60) Provisional application No. 63/431,001, filed on Dec. 7, 2022.

(51) Int. Cl.
*H04W 52/02* (2009.01)
*H04B 7/06* (2006.01)
(Continued)

(52) U.S. Cl.
CPC .... *H04W 52/0216* (2013.01); *H04B 7/06968* (2023.05); *H04L 5/0092* (2013.01);
(Continued)

(58) Field of Classification Search
CPC . H04W 52/0216; H04W 76/20; H04W 24/10; H04W 36/08; H04W 56/0015; H04B 7/06968; H04L 5/0092; H04L 5/0096
See application file for complete search history.

(56) References Cited

U.S. PATENT DOCUMENTS

2024/0196323 A1 6/2024 Lei et al.

FOREIGN PATENT DOCUMENTS

CN 118489279 A * 8/2024 ............ H04W 48/12
CN 118805402 A * 10/2024 ........ H04W 74/0866
(Continued)

OTHER PUBLICATIONS

International Search Report and Written Opinion—PCT/US2023/077274—ISA/EPO—Feb. 14, 2024.
(Continued)

*Primary Examiner* — Saad A. Waqas
(74) *Attorney, Agent, or Firm* — Loza & Loza, LLP

(57) ABSTRACT

Cell reselection and other operations involving signal measurements at a UE may increase the power consumption and operation complexity at a UE, such as a reduced capacity UE (RedCap UE). In some scenarios, for example, a UE may need to frequently switch to bandwidth parts (BWPs) outside the bandwidth of its initial DL bandwidth part to receive and measure synchronization signal blocks (SSBs) for cell reselection, which increases the power consumption of the UE. The aspects described herein allow a UE to measure SSBs in one or more bandwidth parts that is not an initial DL bandwidth part configured by a serving cell of the UE in response to an event trigger or a message received at the UE. The SSBs may be associated with the serving cell of the UE or with a non-serving cell. The UE performs a cell reselection operation based on the measurements.

15 Claims, 27 Drawing Sheets

(51) Int. Cl.

| | |
|---|---|
| ***H04L 5/00*** | (2006.01) |
| ***H04W 24/10*** | (2009.01) |
| ***H04W 36/08*** | (2009.01) |
| ***H04W 56/00*** | (2009.01) |
| ***H04W 76/20*** | (2018.01) |

(52) U.S. Cl.

CPC ........... *H04L 5/0096* (2013.01); *H04W 24/10* (2013.01); *H04W 36/08* (2013.01); *H04W 56/0015* (2013.01); *H04W 76/20* (2018.02)

(56) References Cited

FOREIGN PATENT DOCUMENTS

| | | | | |
|---|---|---|---|---|
| WO | WO-2022212122 A1 | | 10/2022 | |
| WO | WO-2023079662 A1 | * | 5/2023 | ............. H04L 5/001 |
| WO | WO-2023080034 A1 | * | 5/2023 | ............ H04W 48/16 |
| WO | WO-2024030903 A1 | * | 2/2024 | ........ H04W 56/0015 |
| WO | WO-2024031671 A1 | * | 2/2024 | ............ H04W 88/02 |

OTHER PUBLICATIONS

Qualcomm Incorporated: "Discussion the SSB Evaluation in CG-SDT for RedCap UE", 3GPP TSG-RAN2 Meeting #120, R2-2212200, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 4, 2022, 3 Pages, XP052216284, 1. Introduction, 3. Conclusion.

Qualcomm Incorporated: "NCD-SSB Properties and Usage for RedCap", 3GPP TSG-RAN WG4 Meeting #102-e, R4-2206114, 3rd Generation Partnership Project, Mobile Competence Centre, 650, Route Des Lucioles, F-06921 Sophia-Antipolis Cedex, France, vol. RAN WG4, No. Electronic Meeting, Feb. 21, 2022-Mar. 3, 2022, Feb. 14, 2022, 3 Pages, XP052115422, p. 1-2, 1. Introduction, 2. Discussion, RRM Measurements on the serving cell, RRM Measurement on the neighbour cell, 3. Conclusion.

Qualcomm Incorporated: "Remaining Issues on Procedures of RedCap UE", 3GPP TSG RAN WG1 Meeting #111, R1-2212086, 3rd Generation Partnership Project, Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 5, 2022, 5 Pages, XP052222650, 1. Background, Figure 1, 5. Conclusion, 2. Clarification for Random Access Procedure of RedCap UE.

VIVO: "Considerations on Use of NCD-SSB Instead of CD-SSB for RedCap UE", 3GPP TSG-RAN WG4 Meeting #101-e, R4-2117806, 3rd Generation Partnership Project, Mobile Competence Centre, 650, Route Des Lucioles, F-06921 Sophia-Antipolis Cedex, France, vol. RAN WG4, No. Electronic Meeting, Nov. 1, 2021-Nov. 12, 2021, Oct. 22, 2021, 8 Pages, XP052069382, 1. Introduction, 2. Discusssion.

* cited by examiner

SIGNAL MEASUREMENT OPERATIONS FOR REDUCING POWER CONSUMPTION AT A USER EQUIPMENT

CROSS-REFERENCE TO RELATED APPLICATIONS

The present Application for Patent claims priority to and the benefit of pending U.S. Provisional Application No. 63/431,001, filed Dec. 7, 2022, and assigned to the assignee hereof and hereby expressly incorporated by reference herein as if fully set forth below in its entirety and for all applicable purposes.

BACKGROUND

Technical Field

The present disclosure relates generally to communication systems, and more particularly, to signal measurement operations for reducing power consumption at a user equipment.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a form as a prelude to the more detailed description that is presented later.

Cell reselection and other operations involving signal measurements at a UE may increase the power consumption and operation complexity at a UE, such as a reduced capacity UE (RedCap UE). In some scenarios, for example, a UE may need to frequently switch to bandwidth parts (BWPs) outside the bandwidth of its initial DL bandwidth part to receive and measure synchronization signal blocks (SSBs) for cell reselection, which increases the power consumption of the UE. The aspects described herein allow a UE to measure SSBs in one or more bandwidth parts that are not an initial DL bandwidth part configured by a serving cell of the UE in response to an event trigger or a message received at the UE. The SSBs may be associated with the serving cell of the UE or with a non-serving cell. The UE performs a cell reselection operation based on the measurements.

In an aspect of the disclosure, a method, a computer-readable medium, and an apparatus are provided. The apparatus obtains at least one of a first measurement of a first synchronization signal block (SSB) or a downlink (DL) reference signal that is quasi-colocated with the first SSB, or a second measurement of a second SSB or a DL reference signal that is quasi-colocated with the second SSB within a bandwidth of an initial DL bandwidth part configured by a serving cell of the apparatus, wherein the first SSB and the second SSB do not carry scheduling information for system information and wherein the first SSB is associated with a serving cell of the apparatus and the second SSB is associated with a non-serving cell; and performs additional measurements or a cell reselection operation based on at least one of the first measurement or the second measurement.

In an aspect of the disclosure, a method, a computer-readable medium, and an apparatus are provided. The apparatus obtains at least one of a first measurement of a first synchronization signal block (SSB) or a downlink (DL) reference signal that is quasi-colocated with the first SSB, or a second measurement of a second SSB or a DL reference signal that is quasi-colocated with the second SSB in one or more bandwidth parts that is not an initial DL bandwidth part configured by a serving cell of the apparatus in response to an event trigger or a message received at the apparatus, wherein the first SSB is associated with the serving cell of the apparatus and the second SSB is associated with a non-serving cell; and performs additional measurements or a cell reselection operation based on the at least one of the first measurement or the second measurement.

In an aspect of the disclosure, a method, a computer-readable medium, and an apparatus are provided. The apparatus receives at least one of a set of capabilities of a user equipment (UE) or UE assistance information (UAI) associated with at least a measurement relaxation; and transmits a configuration message associated with the measurement relaxation, wherein the measurement relaxation supports at least a cell reselection operation of the UE based on a first measurement of a first synchronization signal block (SSB) or a second measurement of a second SSB within a bandwidth of an initial downlink (DL) bandwidth part of the UE, wherein the first SSB and the second SSB do not carry scheduling information for system information and wherein the first SSB is associated with the apparatus and the second SSB is associated with a non-serving cell.

In an aspect of the disclosure, a method, a computer-readable medium, and an apparatus are provided. The apparatus receives at least one of a set of capabilities of a user equipment (UE) or UE assistance information (UAI) associated with at least a measurement relaxation; and transmits a configuration message associated with the measurement relaxation, wherein the measurement relaxation supports at least a cell reselection operation of the UE based on a first measurement of a first synchronization signal block (SSB) or a downlink (DL) reference signal that is quasi-colocated with the first SSB, or a second measurement of a second SSB or a DL reference signal that is quasi-colocated with the second SSB in one or more bandwidth parts that is not an initial DL bandwidth part configured by the apparatus in response to an event trigger or a message, wherein the first SSB is associated with a serving cell and the second SSB is associated with a non-serving cell.

In an aspect of the disclosure, a method, a computer-readable medium, and an apparatus are provided. The apparatus obtains at least one of a first measurement of a first synchronization signal block (SSB) or a downlink (DL) reference signal that is quasi-colocated with the first SSB, or a second measurement of a second SSB or a DL reference signal that is quasi-colocated with the second SSB within a bandwidth of an initial DL bandwidth part configured by a serving cell of the apparatus, wherein the first SSB and the second SSB do not carry scheduling information for system information and wherein the first SSB is associated with a serving cell of the apparatus and the second SSB is associated with a non-serving cell; and performs a cell reselection operation based on at least one of the first measurement or the second measurement.

In an aspect of the disclosure, a method, a computer-readable medium, and an apparatus are provided. The apparatus obtains, in response to an event trigger or a message received at the apparatus, at least one of a first measurement of a first synchronization signal block (SSB) or a downlink (DL) reference signal that is quasi-colocated with the first SSB, or a second measurement of a second SSB or a DL reference signal that is quasi-colocated with the second SSB in one or more bandwidth parts that is not an initial DL bandwidth part configured by a serving cell of the apparatus, wherein the first SSB is associated with the serving cell of the apparatus and the second SSB is associated with a non-serving cell; and performs a cell reselection operation based on the at least one of the first measurement or the second measurement.

In an aspect of the disclosure, a method, a computer-readable medium, and an apparatus are provided. The apparatus provides at least one of a set of capabilities of the UE or UE assistance information (UAI) associated with at least a measurement relaxation associated with small data transmission (SDT); and receives a configuration message for the measurement relaxation associated with the SDT.

In an aspect of the disclosure, a method, a computer-readable medium, and an apparatus are provided. The apparatus receives at least one of a set of capabilities of a user equipment (UE) or UE assistance information (UAI) associated with at least a measurement relaxation associated with small data transmission (SDT); and provides a configuration message associated with the measurement relaxation associated with the SDT.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
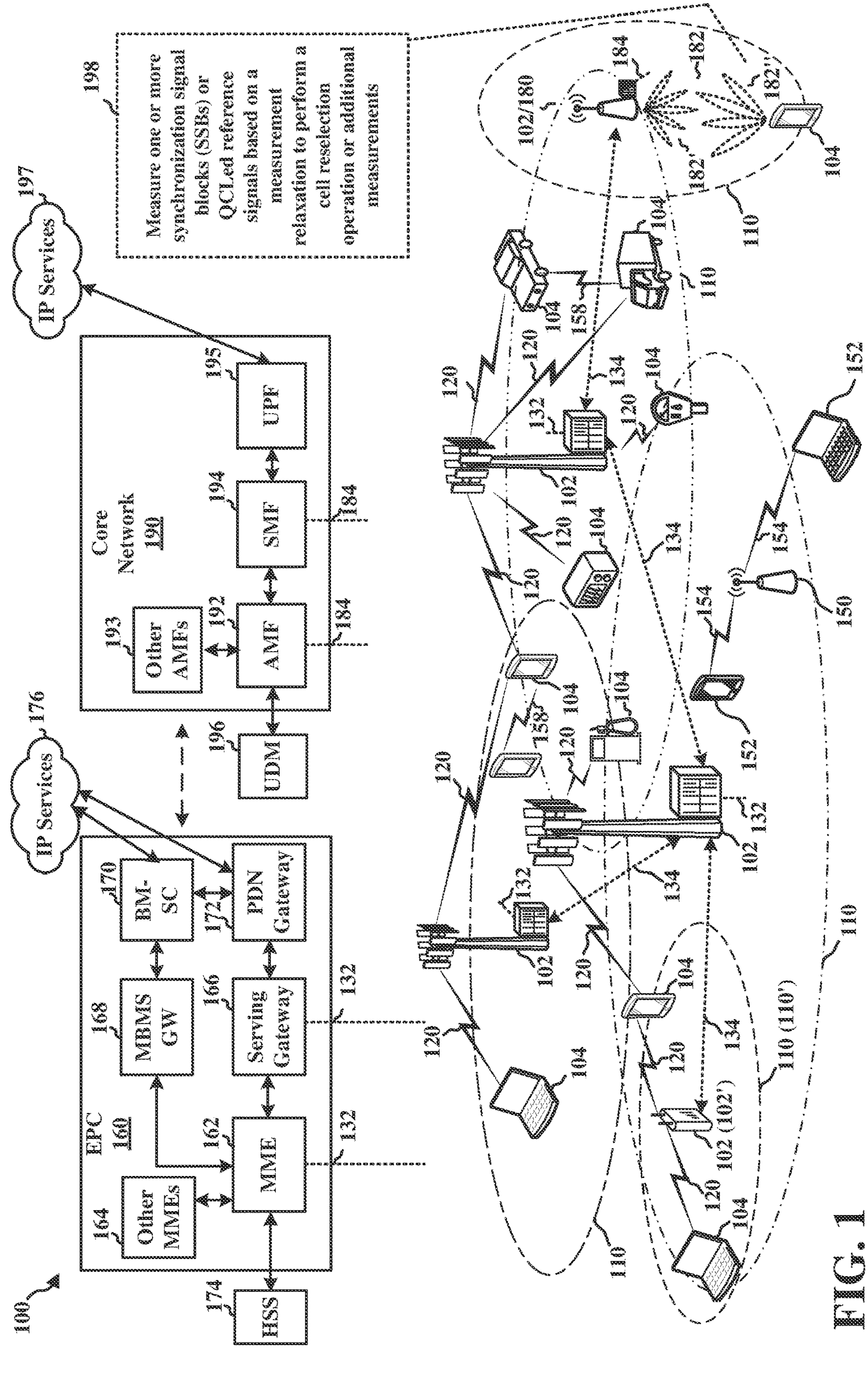
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ. WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHZ and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHZ and 30 GHz, also referred to as centimeter wave. Communications using the mmW/near mmW radio frequency band (e.g., 3 GHZ-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to measure one or more synchronization signal blocks (SSBs) or QCLed reference signals based on a measurement relaxation to perform a cell reselection operation or additional measurements (198).

Although the following description may be focused on 5G NR, the concepts described herein may be applicable to other similar areas, such as LTE, LTE-A, CDMA, GSM, and other wireless technologies.

Figure 2A:
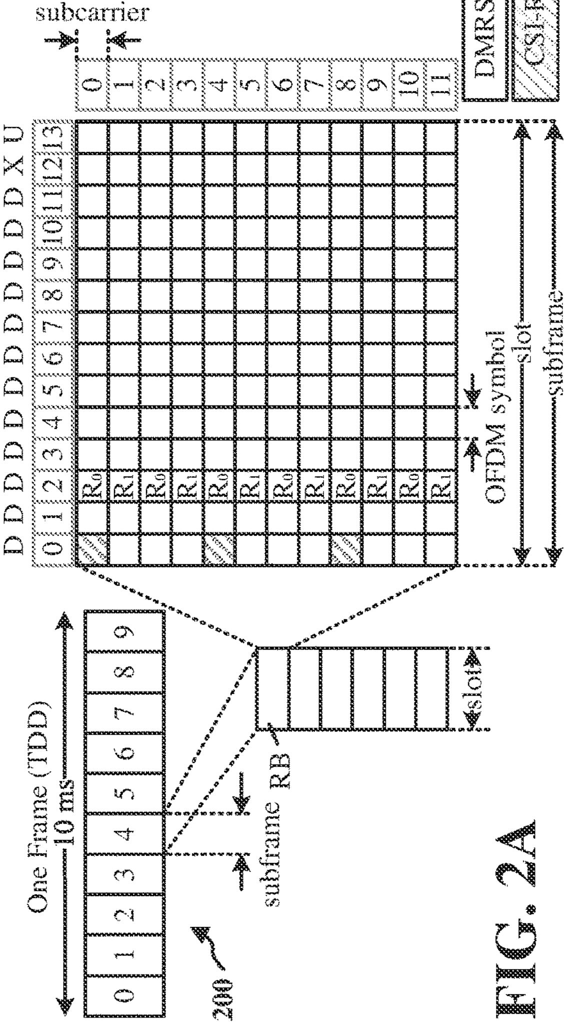
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figure 2B:
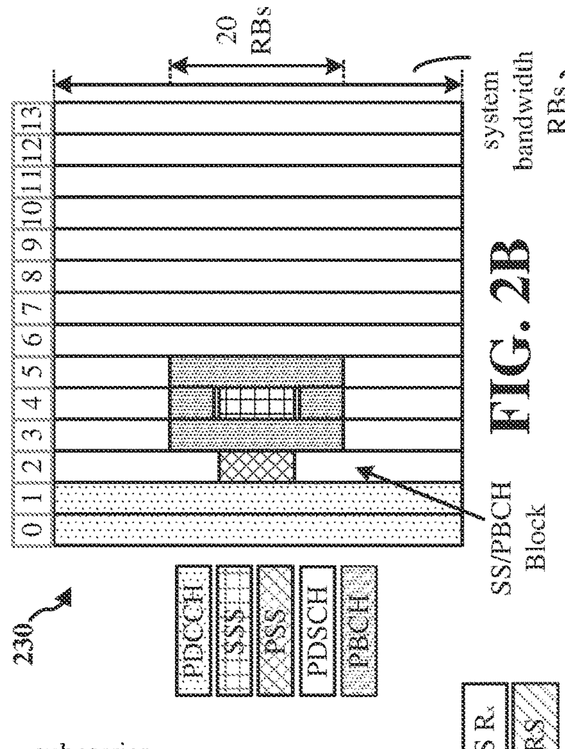
Figure 2C:
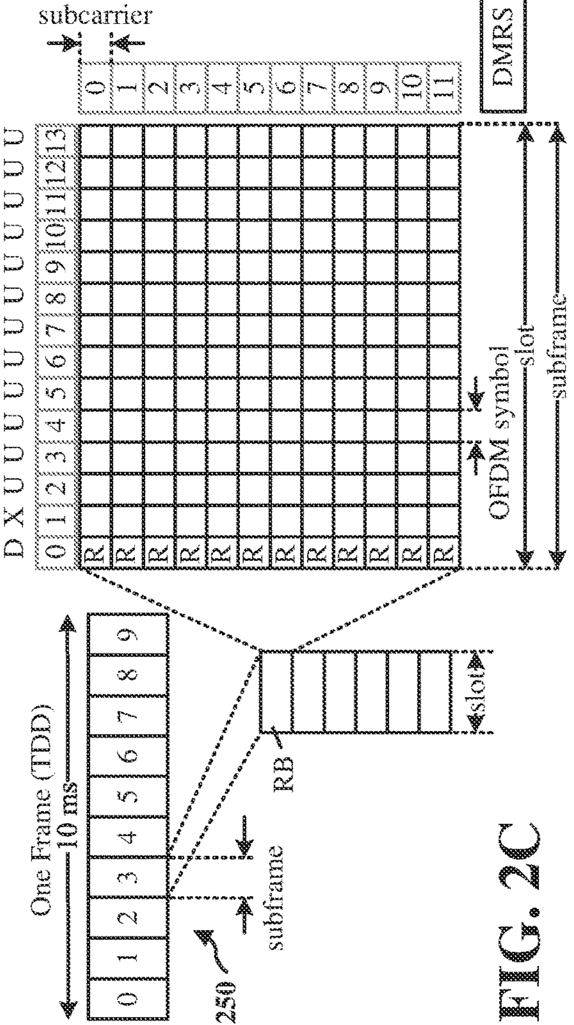
Figure 2D:
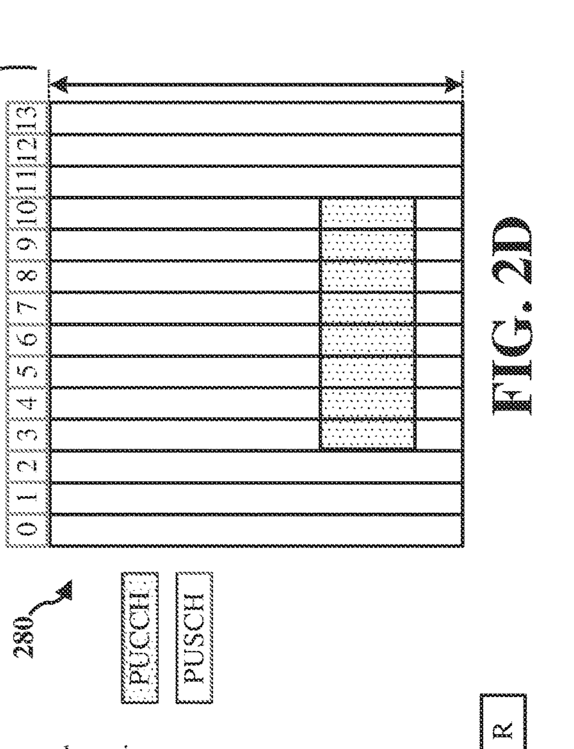

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 24 slots/subframe. The subcarrier spacing and symbol length/duration are a function of the numerology. The subcarrier spacing may be equal to $2^{\mu}*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100$x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also abbreviated herein as SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
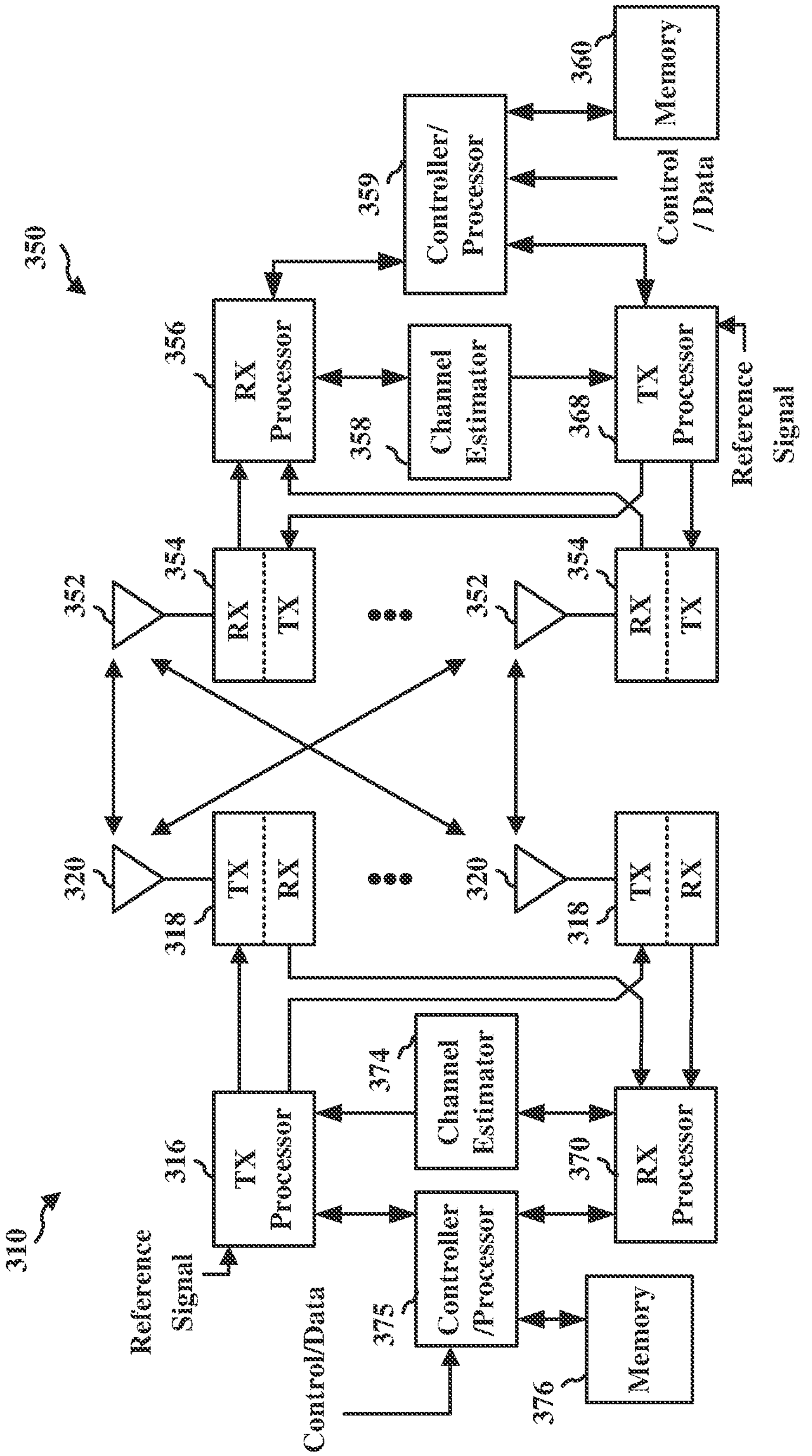
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 4:
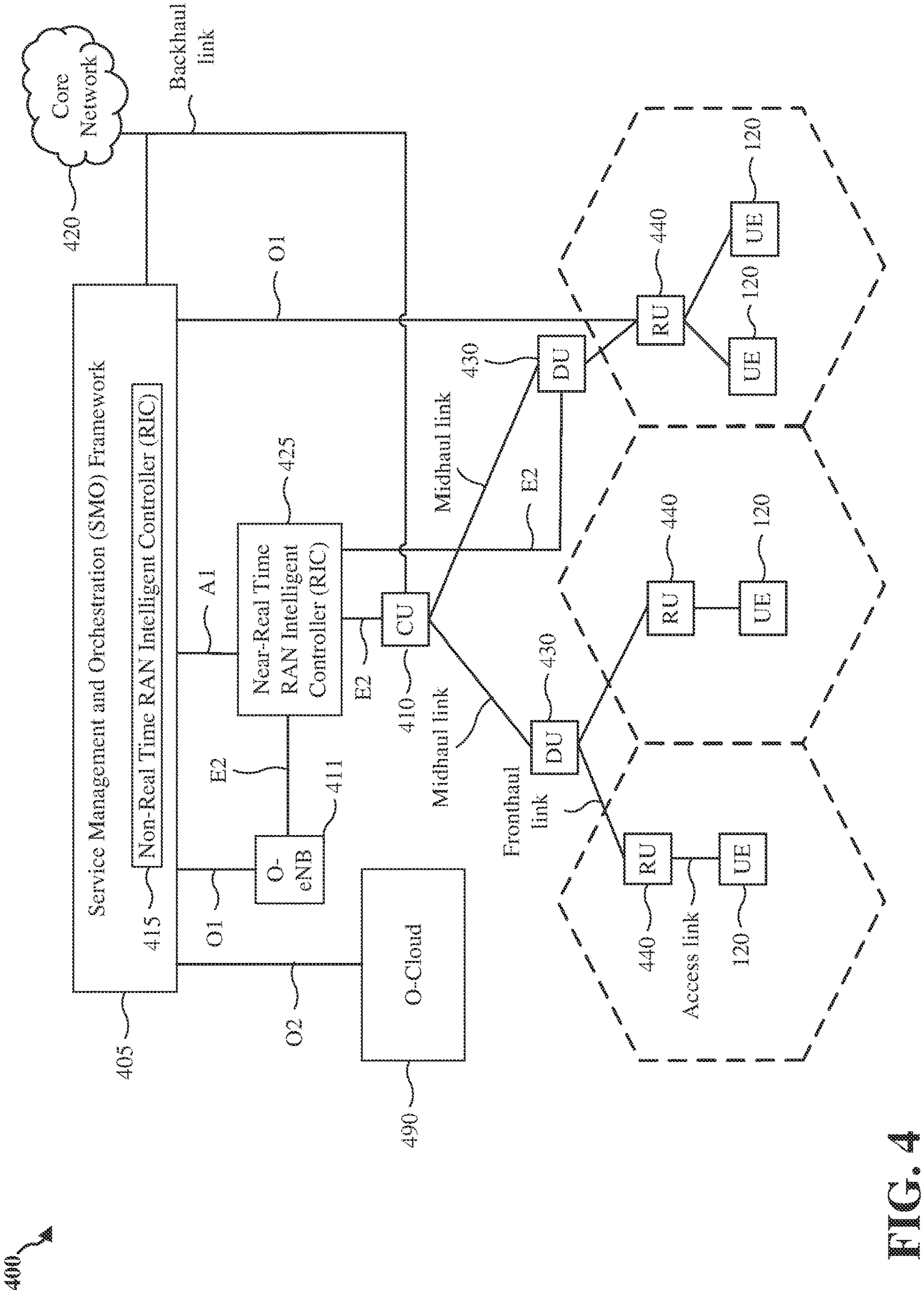
FIG. 4 shows a diagram illustrating an example disaggregated base station architecture.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 120 via one or more radio frequency (RF) access links. In some implementations, the UE 120 may be simultaneously served by multiple RUs 440.

Each of the units, i.e., the CUS 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 120. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-CNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

A wireless communication network (e.g., a base station) may support small data transmissions (SDTs) of a UE. For example, a base station may allow the UE to transmit uplink small data in an inactive mode of the UE (also referred to as an RRC_INACTIVE mode) without requiring the UE to transition to a connected mode of the UE (also referred to as an RRC_CONNECTED mode). An uplink small data transmission from the UE may be referred to as a mobile originated (MO) SDT (abbreviated herein as MO-SDT).

Examples of uplink small data transmissions may include a random access channel (RACH) based SDT procedure and a configured grant (CG) based SDT procedure. In some examples, the RACH-based SDT procedure may enable UL small data transmissions in a RACH-based scheme, such as a two-step RACH procedure or a four-step RACH procedure. In some examples, a CG-based MO-SDT procedure may enable UL small data transmissions on pre-configured PUSCH resources (e.g., reusing the configured grant type 1). Subsequent transmissions of small data in the UL and the DL and the state transition decisions (e.g., for a UE) may be controlled by a base station.

In some examples, NAS messages may be delivered within an SDT. For example, a signaling radio bearer (SRB), such as SRB1 and/or SRB2, may be configured for small data transmission in an inactive mode (e.g., RRC_INACTIVE mode) of the UE.

In some examples, this may enable transfer of NAS messages via SRB2. Small data transmissions may be further enhanced to support mobile terminated (MT) small data transmissions (MT-SDT), such as DL small data transmissions from a base station to a UE. A UE may support paging-triggered SDT (e.g., MT-SDT). MT-SDT triggering mechanisms for UEs in an inactive mode (e.g., RRC_INACTIVE) may be available, supporting RA-SDT and CG-SDT as a UL response. A UE may support MT-SDT procedures for initial DL data reception and subsequent UL/DL data transmission in the inactive mode of the UE (e.g., RRC_INACTIVE).

Figure 5:
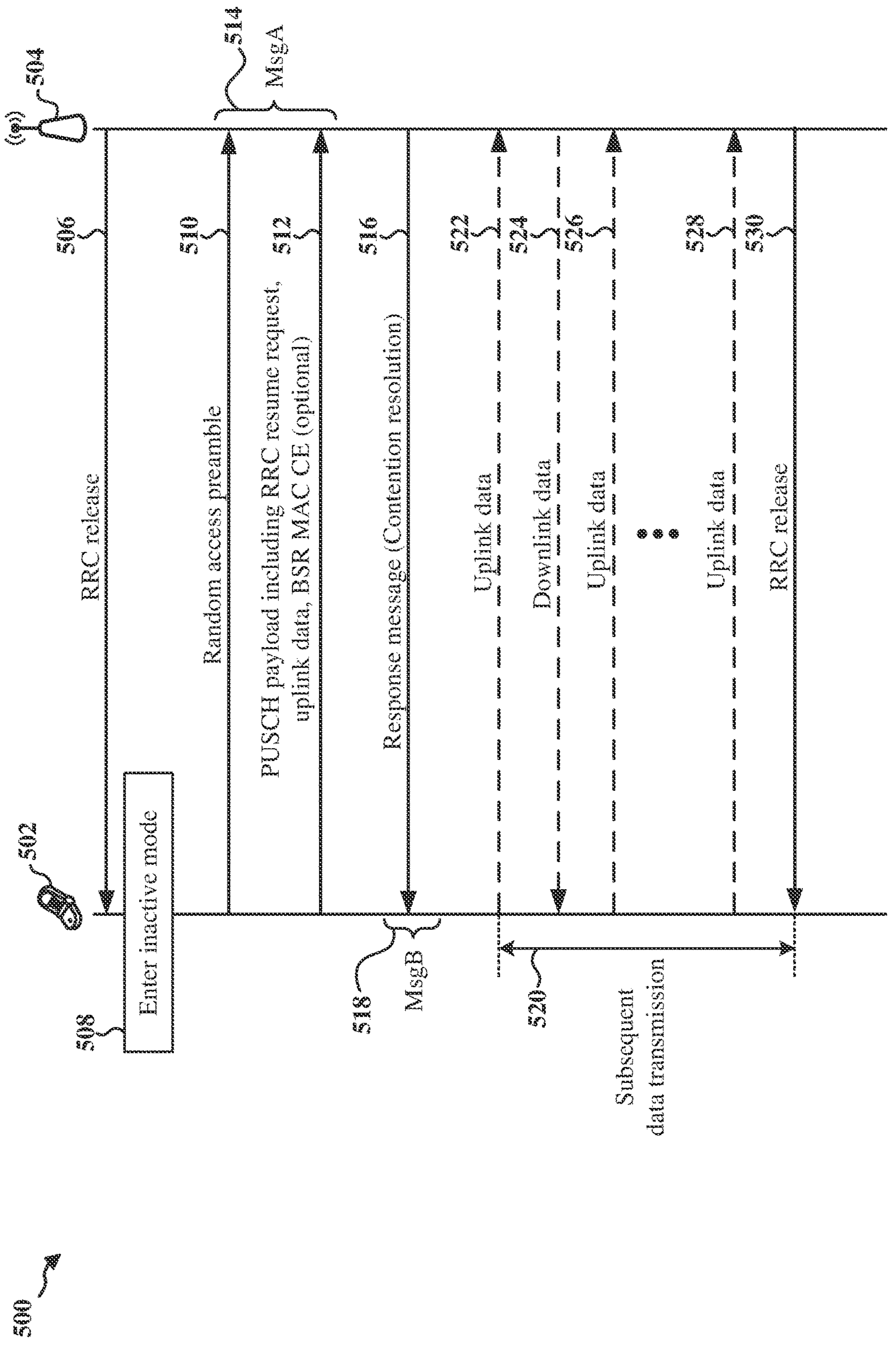
FIG. 5 is a signal flow diagram illustrating a two-step RACH based MO-SDT procedure.

FIG. 5 is a signal flow diagram 500 illustrating a two-step RACH based MO-SDT procedure. FIG. 5 includes a UE 502 and a base station 504.

The UE 502 may receive an RRC release message 506 including a suspendConfig information element (IE), which may provide the UE 502 with configuration information for an inactive mode (e.g., RRC_INACTIVE). At 508, the UE 502 may enter the inactive mode (e.g., RRC_INACTIVE) in response to the RRC release message 506.

The UE 502 may initiate the two-step RACH procedure by transmitting a random access preamble 510 to the base station 504. The random access preamble 510 may be transmitted on the PRACH. The UE 502 may transmit a payload 512 using the PUSCH. The payload 512 may carry an RRC resume request message (e.g., RRCResumeReq) and uplink data (e.g., uplink small data). The payload 512 may optionally include a BSR in a MAC control element (MAC-CE). The random access preamble 510 and the PUSCH payload 512 may be referred to as Message A (MsgA) 514 of a two-step RACH procedure. Therefore, transmissions of the random access preamble 510 and the payload 512 represent step 1 of the two-step RACH procedure.

The base station 504 processes the random access preamble 510. When the random access preamble 510 is detected, the base station 504 may process the payload 512.

The base station 504 responds by transmitting a response message 516 on the PDSCH. The response message may include a contention resolution. The response message 516 may be referred to as Message B (MsgB) 518 of the two-step RACH procedure. Therefore, transmission of the response message 516 may represent step 2 of the two-step RACH procedure.

If uplink data still remains in the buffer of the UE 502 after transmission of the payload 512, the UE 502 may proceed to transmit the remaining uplink data in a subsequent data transmission at 520. In one example, the UE 502 may optionally transmit a subsequent uplink small data transmission 522 and may receive downlink data 524 in response to the subsequent uplink small data transmission 522. In some examples, the UE 502 may continue to transmit other subsequent uplink small data transmissions 526, 528 until the buffer of the UE 502 is cleared.

The UE 502 may receive an RRC release message 530. The UE 502 may remain in the inactive mode after receiving the RRC release message 530.

Figure 6:
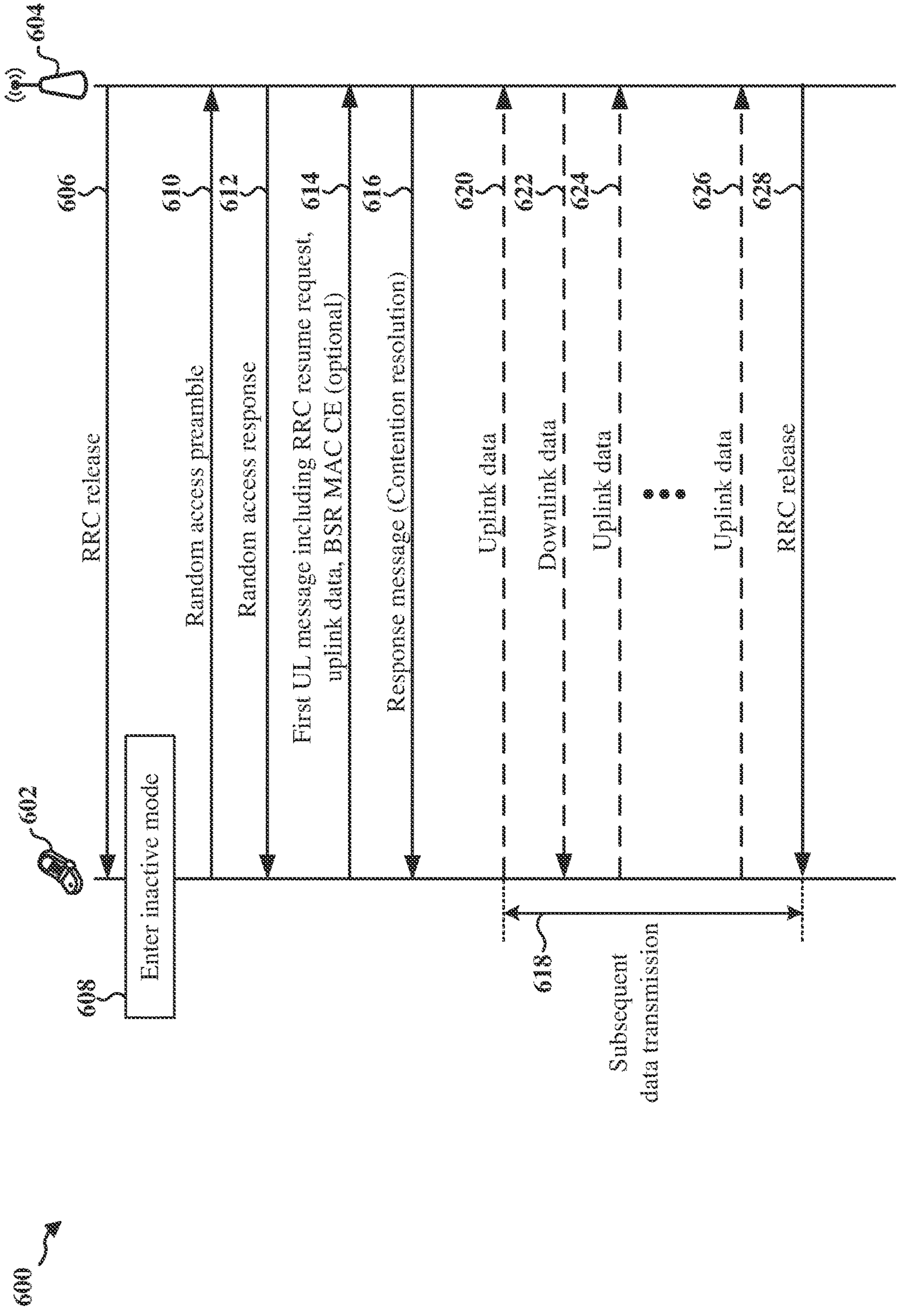
FIG. 6 is a signal flow diagram illustrating a four-step RACH based MO-SDT procedure.

FIG. 6 is a signal flow diagram 600 illustrating a four-step RACH based MO-SDT procedure. FIG. 6 includes a UE 602 and a base station 604. The four-step RACH procedure may be a contention-based random access procedure (CBRA) and may be initiated by the UE 602 for initial access to the network (e.g., to achieve UL synchronization with the base station 604).

The UE 602 may receive an RRC release message 606 including a suspendConfig information element (IE), which may provide the UE 602 with configuration information for an inactive mode (e.g., RRC_INACTIVE). At 608, the UE 602 may enter the inactive mode (e.g., RRC_INACTIVE) in response to the RRC release message 606.

The UE 602 may initiate the four-step RACH procedure by transmitting a random access preamble 610. The random access preamble 610 may be referred to as message 1 (Msg1) of the four-step RACH procedure. The random access preamble 610 may be transmitted on the PRACH.

If the base station detects the random access preamble 610, the base station 604 responds with a random access response (RAR) message 612. The random access response message 612 may be referred to as message 2 (Msg2) of the four-step RACH procedure. In some examples, the random access response message 612 may include a timing advance, a UL grant for transmission of message 3 (Msg3) of the four-step RACH procedure using the PUSCH, and a temporary cell radio network temporary identifier (TC-RNTI).

The UE 602 may transmit a first uplink message 614 (e.g., Msg3) using the PUSCH. The first uplink message 614 may carry an RRC resume request message (e.g., RRCResumeReq) and uplink data (e.g., uplink small data). The first uplink message 614 may optionally include a BSR in a MAC-CE.

The base station 604 may transmit a response message 616 including a contention resolution using the PDSCH. The response message 616 may be referred to as message 4 (Msg4) of the four-step RACH procedure.

If uplink data still remains in the buffer of the UE 602 after transmission of the first uplink message 614, the UE 602 may proceed to transmit the remaining uplink data in a subsequent data transmission at 618. In one example, the UE 602 may optionally transmit a subsequent uplink small data transmission 620 and may receive downlink data 622 in response to the subsequent uplink small data transmission 620. In some examples, the UE 602 may continue to transmit other subsequent uplink small data transmissions 624, 626 until the buffer of the UE 602 is cleared.

The UE 602 may receive an RRC release message 628. The UE 602 may remain in the inactive mode after receiving the RRC release message 628.

Figure 7:
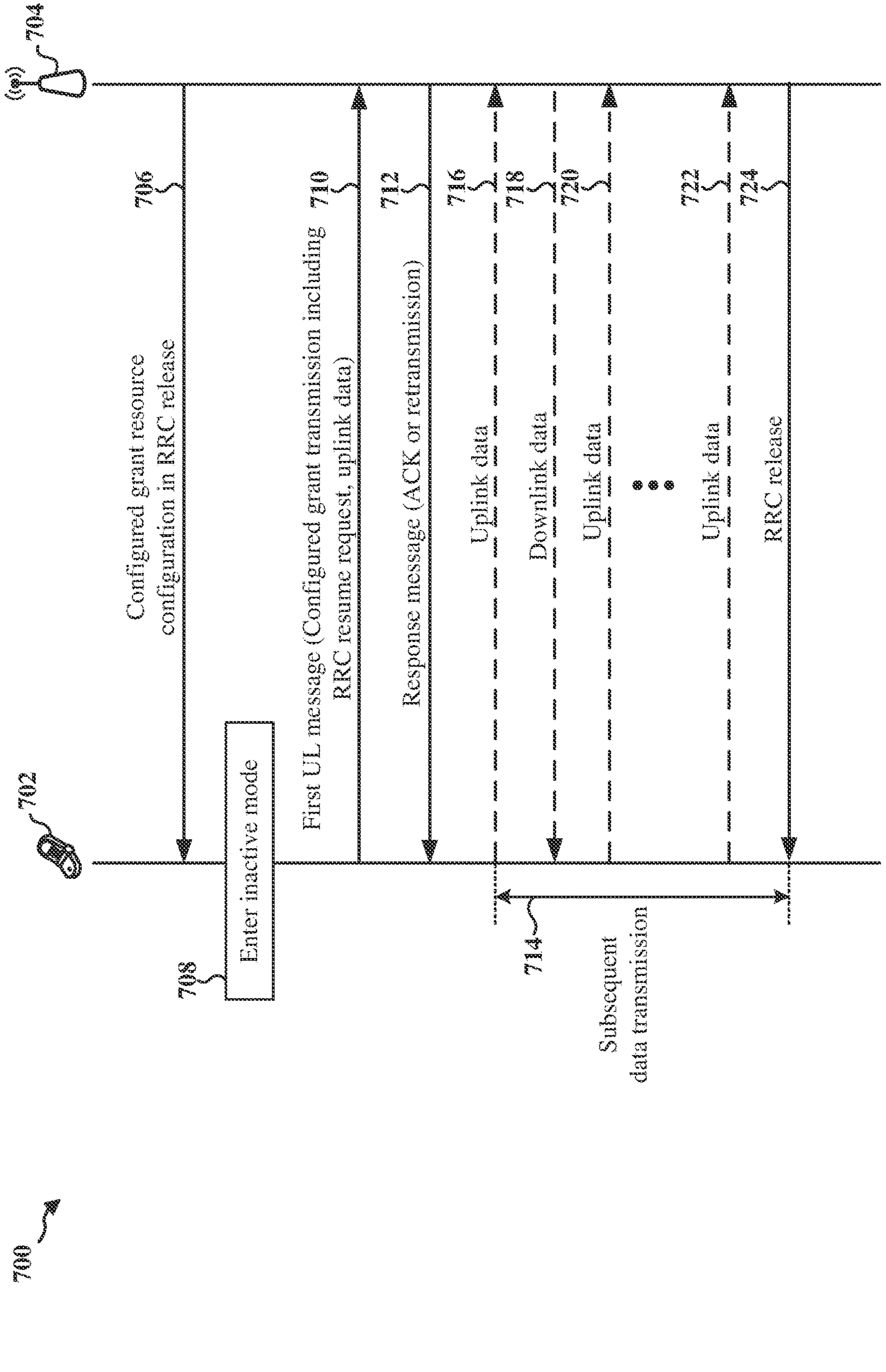
FIG. 7 is a signal flow diagram illustrating a CG-based MO-SDT procedure.

FIG. 7 is a signal flow diagram 700 illustrating a CG-based MO-SDT procedure. FIG. 7 includes a UE 702 and a base station 704. For example, the UE 702 may perform the CG-based MO-SDT procedure in scenarios where the UE 702 is stationary (or has low-mobility) and the UE 702 may reuse a previously obtained timing advance (TA) in a connected mode procedure. Reuse of the TA value may ensure that the UE 702 maintains UL synchronization with the base station 704 and that UL transmissions from the UE 702 will not interfere with UL transmissions of other UEs.

The UE 702 may receive a configured grant resource configuration in an RRC release message 706 including a suspendConfig information element (IE), which may provide the UE 702 with configuration information for an inactive mode (e.g., RRC_INACTIVE). The configured grant resource configuration may indicate preconfigured PUSCH resources. At 708, the UE 702 may enter the inactive mode (e.g., RRC_INACTIVE) in response to the RRC release message 706.

The UE 702 may transmit a first uplink message 710 (also referred to as a configured grant transmission) using the PUSCH resources indicated in the configured grant resource configuration. The first uplink message 710 may carry an RRC resume request message (e.g., RRCResumeReq) and uplink data (e.g., uplink small data).

The base station 704 may transmit a response message 712 using the PDSCH. The response message 712 may indicate an ACK if the first UL message was successfully received at the base station 704. Otherwise, the response message 712 may request retransmission of at least a portion of the first UL message.

If uplink data still remains in the buffer of the UE 702 after transmission of the first uplink message 710, the UE 702 may proceed to transmit the remaining uplink data in a subsequent data transmission at 714. In one example, the UE 702 may optionally transmit a subsequent uplink small data transmission 716 and may receive downlink data 718 in response to the subsequent uplink small data transmission 716. In some examples, the UE 702 may continue to transmit other subsequent uplink small data transmissions 720, 722 until the buffer of UE 702 is cleared.

The UE 702 may receive an RRC release message 724. The UE 702 may remain in the inactive mode after receiving the RRC release message 724.

One or more of the UEs described herein may be implemented as a reduced capacity UE (also referred to as a RedCap UE). For example, a RedCap UE may be a UE having reduced capabilities (also referred to as low-tier UEs as introduced in Release 17 of the 3GPP standard specification or RedCap UEs). RedCap UEs may include, for example, wearables (e.g., smart wearables, such as smartwatches), industrial wireless sensor networks (IWSN), surveillance cameras, low-end smartphones, and/or relaxed IoT devices. For example, RedCap UEs will typically have more capability (e.g., processing capacity, features, battery performance, etc.) than an IoT device (e.g., a Narrowband Internet of Things (NB-IOT) device) but less capability than regular UEs (e.g., regular UEs as defined in Release 17 of the 3GPP standard specification). For example, a regular UE may be an Enhanced Mobile Broadband (eMBB) smartphone. Moreover, RedCap UEs may typically be more sensitive to power consumption than regular UEs.

In some examples, a UE (e.g., a RedCap UE) may be configured with a bandwidth part (BWP) for UL and/or DL transmissions, where the BWP is smaller than the total bandwidth of a serving cell of the UE. In some scenarios, a UE may perform an RA-SDT without a subsequent transmission in the BWP, where the BWP does not include a cell-defining (CD) SSB (abbreviated herein as CD-SSB). In some scenarios, a UE may perform an RA-SDT with subsequent transmission in the BWP, where the BWP does not include the CD-SSB. In some scenarios, a UE may perform a CG-SDT in the BWP, where the BWP does not include the CD-SSB. In some scenarios, a UE may use an NCD-SSB to perform a CG-SDT.

A cell-defining SSB (CD-SSB), for example, may include four consecutive symbols and may include the PSS, the SSS, and the PBCH. The PBCH in the CD-SSB may include scheduling information for system information block 1 (SIB 1). SIB 1 includes cell-specific information. In some examples, SIB 1 (also referred to as remaining minimum system information (RMSI)) may include information that a UE requires to gain initial access to the network (e.g., a base station, TRP, etc.), such as cell selection parameters related to the current cell, general access control parameters, configuration parameters of the common physical channel related to the initial access process, etc.

The CD-SSB may be transmitted periodically and may be "always-on." In some examples, the period of the CD-SSB may be 20 ms (e.g., the CD-SSB may be repeated every 20 ms). Each periodic transmission of the CD-SSB may include multiple consecutive CD-SSB transmissions within a preconfigured time window. In some examples, the preconfigured time window for the CD-SSB may be five milliseconds (ms).

The 3GPP standard specification for 5G NR may also provide support for a non-cell-defining SSB (NCD-SSB). An NCD-SSB may include four consecutive symbols and may include the PSS, the SSS, and the PBCH. The PBCH in the NCD-SSB may not include scheduling information for SIB 1. Therefore, in some examples, SIB 1 may not be transmitted together with the NCD-SSB. One or more NCD-SSBs may be transmitted in a preconfigured time window. In some examples, the preconfigured time window for the NCD-SSB may be five ms. In some examples, the preconfigured time window for the NCD-SSB may be in a first or second half of a 10 ms radio frame.

A base station may indicate to the UE the frequency of the NCD-SSB in a serving cell and the periodicity of the NCD-SSB in the serving cell. For example, the base station may transmit a first parameter (also referred to as absoluteFrequencySSB) that includes a frequency value for the NCD-SSB (e.g., the frequency value to which the NCD-SSB will be mapped) and a second parameter (also referred to as ssb-PeriodicityServingCell) that includes a periodicity value for the NCD-SSB. The periodicity value for the NCD-SSB may indicate how often the NCD-SSB will be transmitted.

A base station may transmit both an NCD-SSB and a CD-SSB in the serving cell of a UE. In some examples, the NCD-SSB is transmitted at least in the serving cell configured initial DL BWP of a RedCap UE. In some examples, a UE (e.g., a RedCap UE) may use either or both of the NCD-SSB and the CD-SSB for layer 1 (L1), layer 2 (L2) and/or layer 3 (L3) measurements.

In some scenarios, a UE may perform a subsequent RA-SDT transmission in a RedCap-specific separate initial BWP, where the initial BWP does not include the CD-SSB. In some scenarios, a UE may perform a CG-SDT in a RedCap-specific separate initial BWP, where the initial BWP does not include any SSB. In some scenarios, a UE may perform a CG-SDT in a RedCap-specific separate initial BWP, where the initial BWP includes an NCD-SSB but does not include the CD-SSB.

Small data transmissions, such as a CG-SDT or an RA-SDT, can be supported as an optional feature for RedCap UEs. For a RedCap UE capable of SDT, DL resources for CG-SDT and/or RA-SDT may be configured in an initial DL BWP that is specific to the RedCap UE. In some cases, the initial DL BWP of the RedCap UE may not include the entire CORESET #0.

For the sake of reducing complexity at a RedCap UE, either a CD-SSB or an NCD-SSB can be configured in the RedCap-specific initial DL BWP used for small data transmission. This may enable the RedCap UE to perform operations based on a synchronization signal reference signal received power (SS-RSRP) (e.g., one or more reference signal received power (RSRP) measurements of an SSB, such as CD-SSB or an NCD-SSB).

In one example, a RedCap UE may use the SS-RSRP to validate a timing advance (TA) for CG-SDT. In another example, the RedCap UE may use the SS-RSRP to select and validate a CG-PUSCH occasion for CG-SDT. In another example, the RedCap UE may use the SS-RSRP to perform cell re-selection during a CG-SDT or an RA-SDT.

When a RedCap UE performing CG-SDT has a valid TA and a valid CG-PUSCH occasion, it typically has an adequate link budget with the serving cell and moves with low speed (or remains stationary), so that measurement relaxation can be considered in the RRC inactive state of the RedCap UE. In the aspects described herein, a RedCap UE may perform a CG-SDT or an RA-SDT in an initial DL BWP configured with NCD-SSB, which may allow the UE to achieve power savings, overhead reduction, and/or signaling reduction.

Figure 8:
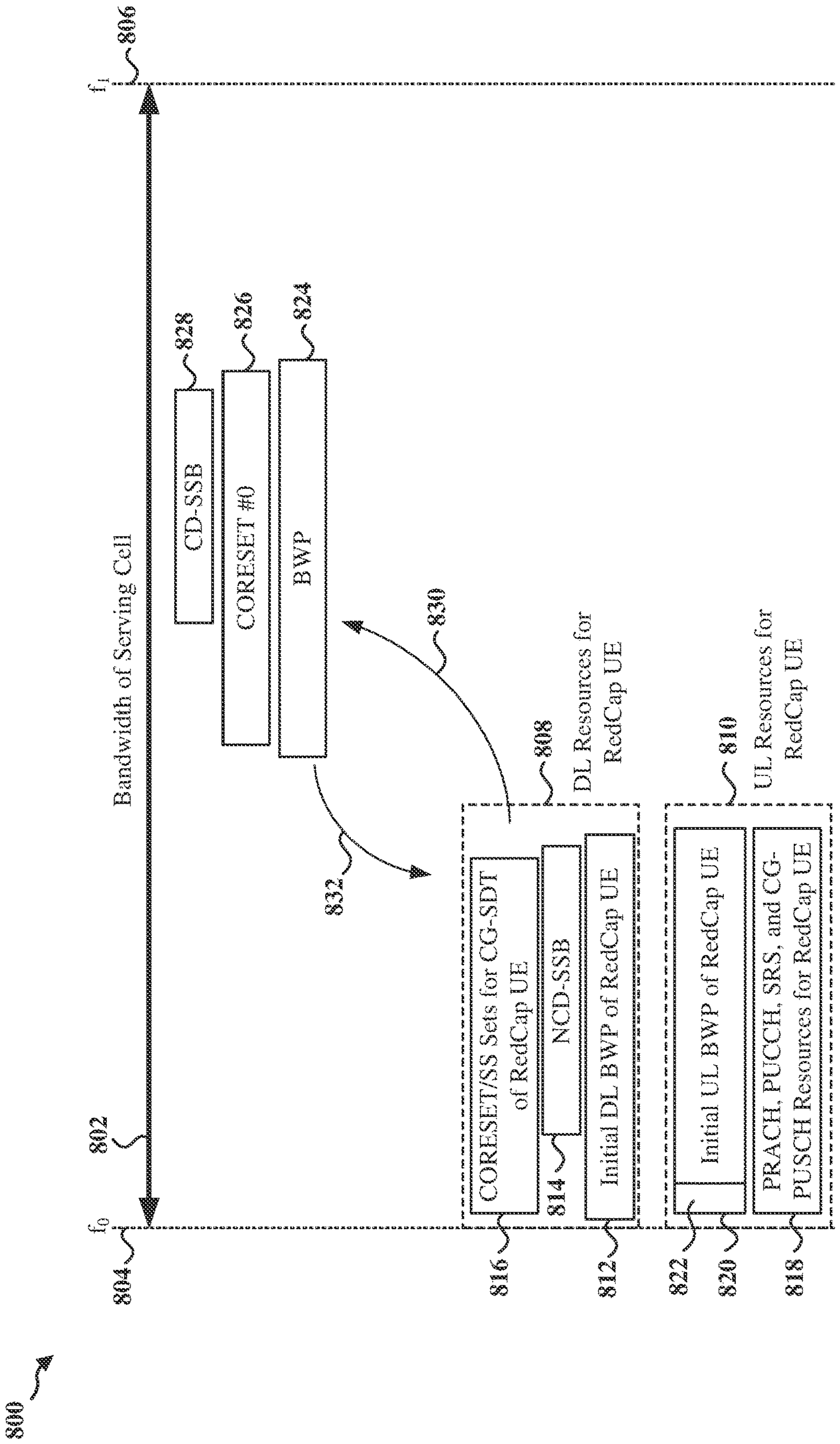
FIG. 8 illustrates an example bandwidth of a serving cell and initial BWPs configured for a UE.

FIG. 8 illustrates an example bandwidth of a serving cell and initial BWPs configured for a UE (e.g., a RedCap UE). In FIG. 8, the bandwidth 802 may represent the total bandwidth of a serving cell. For example, the bandwidth 802 may be defined between a first frequency ($f_0$) 804 and a second frequency ($f_1$) 806.

A RedCap UE may use DL resources 808 for receiving transmissions on the DL and may use UL resources 810 to perform transmissions on the UL. The DL resources 808 include an initial DL BWP 812 configured for the RedCap UE, and the UL resources 810 include an initial UL BWP 820 configured for the RedCap UE. The initial DL BWP 812 may partially or fully overlap the initial UL BWP 820. Each of the initial DL BWP 812 and the initial UL BWP 820 may be smaller than the bandwidth 802 of the serving cell. A portion 822 of the initial UL BWP 820 may be used for the PUCCH.

The initial DL BWP 812 may include the CORESET and search space (SS) sets 816 for a CG-SDT of the RedCap UE and an NCD-SSB 814. The initial UL BWP 820 may include the resources that the RedCap UE may use for PRACH, PUCCH, SRS, and CG-PUSCH.

In FIG. 8, it should be noted that the initial DL BWP 812 of the RedCap UE may not include a CD-SSB. A CD-SSB is typically used for a variety of purposes, such as synchronization, power control, cell selection and reselection. In some scenarios, the NCD-SSB 814 (if configured) may not be used for cell reselection.

For example, a RedCap UE may measure the NCD-SSB 814 and may determine that the quality (e.g., measured signal strength) of the serving cell is below a threshold. Therefore, the RedCap UE may need to reselect another cell to camp on. In the abovementioned scenarios where the NCD-SSB 814 may not be used for cell reselection, the RedCap UE may need to switch from the initial DL BWP 812 to a BWP that includes a CD-SSB. For example, the RedCap UE may switch 930 from the initial DL BWP 812 to the BWP 824 (e.g., which includes the CORESET #0) outside of the initial DL BWP 812 to measure the CD-SSB 828 for cell reselection purposes. The RedCap UE may then switch 932 back to the initial DL BWP 812.

Figure 9:
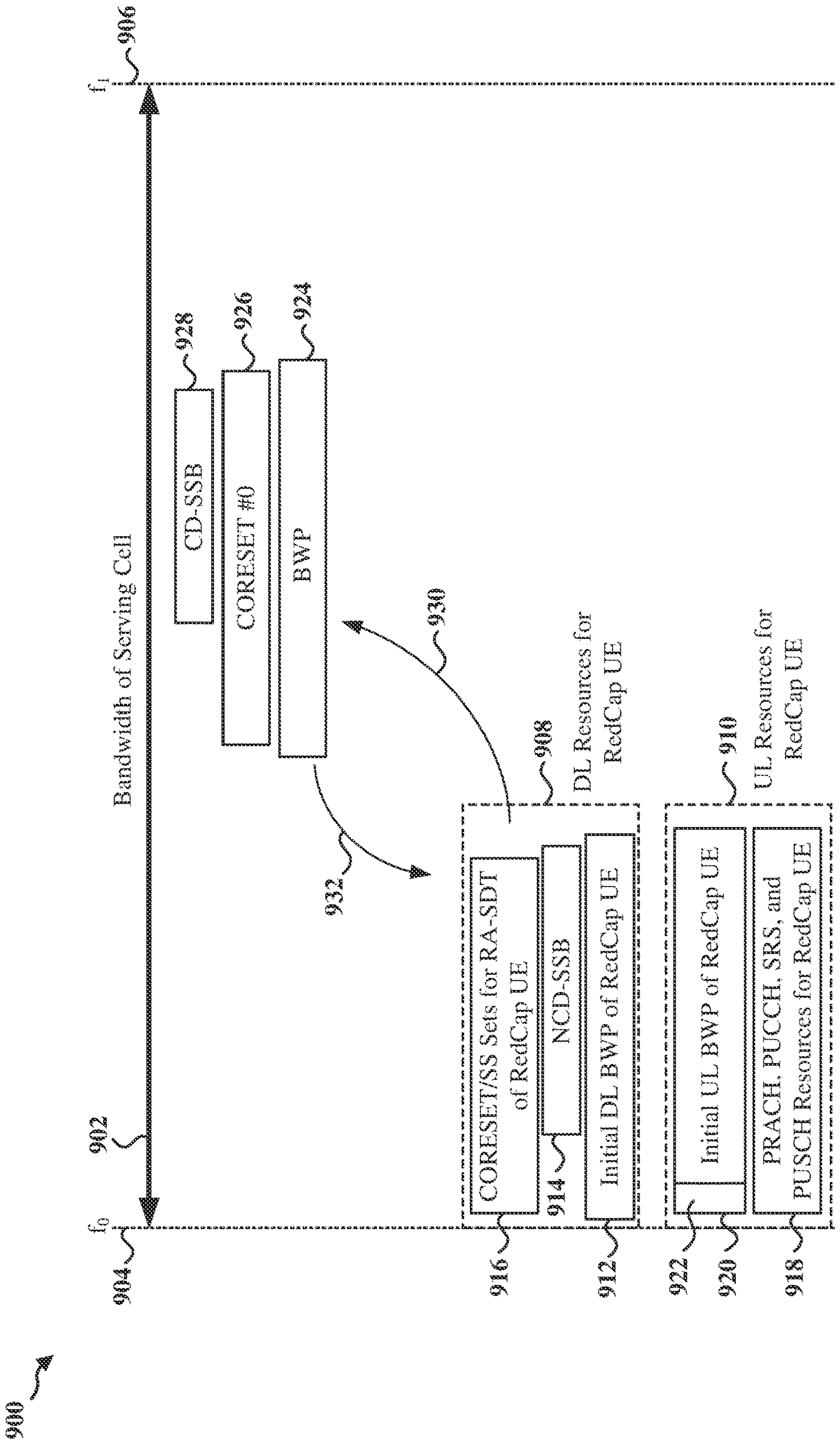
FIG. 9 illustrates an example bandwidth of a serving cell and initial BWPs configured for a UE.

FIG. 9 illustrates an example bandwidth of a serving cell and initial BWPs configured for a UE (e.g., a RedCap UE). In FIG. 9, the bandwidth 902 may represent the total bandwidth of a serving cell. For example, the bandwidth 902 may be defined between a first frequency ($f_0$) 904 and a second frequency ($f_1$) 906.

A RedCap UE may use DL resources 908 for receiving transmissions on the DL and may use UL resources 910 to perform transmissions on the UL. The DL resources 908 include an initial DL BWP 912 configured for the RedCap UE, and the UL resources 910 include an initial UL BWP 920 configured for the RedCap UE. The initial DL BWP 912 may partially or fully overlap the initial UL BWP 920. Each of the initial DL BWP 912 and the initial UL BWP 920 may be smaller than the bandwidth 802 of the serving cell. A portion 922 of the initial UL BWP 920 may be used for the PUCCH.

The initial DL BWP 912 may include the CORESET and search space (SS) sets 916 for a RA-SDT of the RedCap UE and an NCD-SSB 914. The initial UL BWP 920 may include the resources that the RedCap UE may use for PRACH, PUCCH, SRS, and PUSCH.

In FIG. 9, it should be noted that the initial DL BWP 912 of the RedCap UE may not include a CD-SSB. As previously described, the CD-SSB is typically used for a variety of purposes, such as synchronization, power control, cell selection and reselection. In some scenarios, the NCD-SSB 914 (if configured) may not be used for cell reselection.

For example, a RedCap UE may measure the NCD-SSB 914 and may determine that the quality (e.g., measured signal strength) of the serving cell is below a threshold. Therefore, the RedCap UE may need to reselect another cell to camp on. In the abovementioned scenarios where the NCD-SSB 914 may not be used for cell reselection, the RedCap UE may need to switch from the initial DL BWP 912 to a BWP that includes a CD-SSB. For example, the RedCap UE may switch 930 from the initial DL BWP 912 to the BWP 924 (e.g., which includes the CORESET #0) outside of the initial DL BWP 912 to measure the CD-SSB 928 for cell reselection purposes. The RedCap UE may then switch 932 back to the initial DL BWP 912.

In some aspects of the disclosure, a UE (e.g., a RedCap UE) may apply a measurement relaxation for cell-reselection. In some examples, the UE may be configured with an initial DL BWP for CG-SDT (e.g., the initial DL BWP 812 in FIG. 8) or RA-SDT (e.g., the initial DL BWP 912 in FIG. 9), where the initial DL BWP includes an NCD-SSB (e.g., NCD-SSB 914) but does not include a CD-SSB. In the aspects described herein, an NCD-SSB may be configured by RRC or system information (SI). In these examples, the UE may apply the measurement relaxation for cell-reselection by performing a cell re-selection operation based on one or more measurements of the NCD-SSB.

In some aspects of the disclosure, the UE may obtain a measurement of the NCD-SSB transmitted by a serving cell (e.g., a cell the UE is currently camped on) of the UE within the initial DL BWP configured for CG-SDT or RA-SDT. In some examples, the measurement of the NCD-SSB may be a reference signal received power measurement (RSRP) and/or other appropriate measurements that may be used to determine a quality of the serving cell. In some examples, the UE may perform the cell reselection operation based on the measurement of the NCD-SSB of the serving cell. In some examples, the UE may be in the inactive mode when obtaining the measurement and performing the cell reselection operation.

In some aspects of the disclosure, the UE may obtain a measurement of the NCD-SSB transmitted by a non-serving cell (e.g., a neighbor cell of the serving cell) of the UE within the initial DL BWP configured for CG-SDT or RA-SDT. In some examples, the measurement of the NCD-SSB may be a reference signal received power measurement (RSRP) and/or other appropriate measurements that may be used to determine a quality of the non-serving cell. In some examples, the UE may perform the cell reselection operation based on the measurement of the NCD-SSB of the non-serving cell. In some examples, the UE may be in the inactive mode when obtaining the measurement and performing the cell reselection operation.

In some aspects of the disclosure, the UE may perform the cell reselection operation based on a measurement of the NCD-SSB of the serving cell and the measurement of the NCD-SSB of the non-serving cell.

In some aspects of the disclosure, the UE (e.g., a RedCap UE) may apply a measurement relaxation for cell-reselection based on an event-triggered measurement of a CD-SSB. For example, if the UE is configured with an initial DL BWP for CG-SDT (e.g., the initial DL BWP 812 in FIG. 8) or RA-SDT (e.g., the initial DL BWP 912 in FIG. 9) and the initial DL BWP includes an NCD-SSB (e.g., NCD-SSB 814 or NCD-SSB 914) but does not include a CD-SSB (e.g., the CD-SSB 828, 928), the UE may measure a CD-SSB in a BWP outside of the bandwidth of the initial DL BWP for CG-SDT or RA-SDT in response to an event trigger. In some examples, the CD-SSB may be transmitted by the serving cell of the UE outside the initial DL BWP, or by non-serving cell(s) of the UE outside the BWP of the initial DL BWP configured for CG-SDT or RA-SDT.

In some aspects, the event trigger may be based on one or more conditions. For example, to satisfy a first condition of the event trigger, the UE (e.g., a RedCap UE) may perform Layer-1 (L1) and/or Layer-3 (L3) measurements based on an NCD-SSB transmitted by the serving cell in the initial DL BWP for CG-SDT (e.g., the initial DL BWP 812 in FIG. 8) or RA-SDT (e.g., the initial DL BWP 912 in FIG. 9). To satisfy a second condition of the event trigger, the UE may determine that a decision metric based on the L1 and/or L3 measurements of the NCD-SSB is below a set of thresholds pre-configured by RRC or SI for CG-SDT or RA-SDT. To satisfy a third condition of the event trigger, the UE may have a valid timing advance (TA) and a valid CG-PUSCH occasion for CG-SDT.

In some examples, if the UE is configured for a CG-SDT, the event trigger may occur if the UE satisfies the previously described first, second, and third conditions. It should be noted that the previously described third condition is associated with a CG-SDT. Therefore, in other examples, if the UE is configured for an RA-SDT and is not configured for a CG-SDT, the event trigger may occur if the UE satisfies the first and second conditions. In some aspects, the UE may apply the measurement relaxation for cell-reselection based on the event-triggered measurement of the CD-SSB in situations where the UE cannot support the measurement relaxation for cell-reselection based on the one or more measurements of the NCD-SSB.

Figure 10:
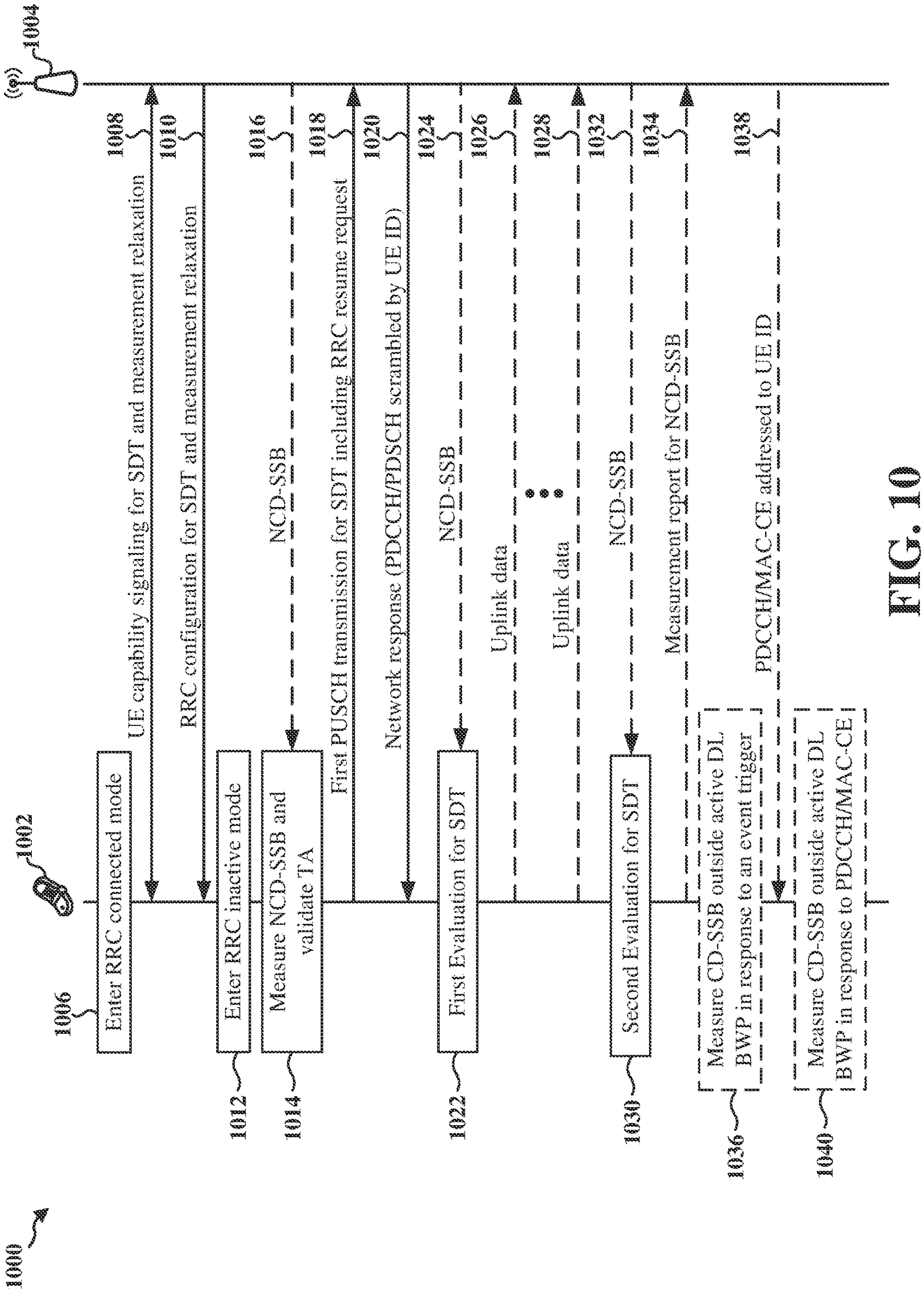
FIG. 10 is a signal flow diagram illustrating a measurement relaxation for cell-reselection based on the event-triggered measurement of a CD-SSB in accordance with various aspects of the disclosure.

An example of the measurement relaxation for cell-reselection based on the event-triggered measurement of a CD-SSB for RA-SDT or CG-SDT is described with reference to FIG. 10. FIG. 10 is a signal flow diagram 1000 illustrating a measurement relaxation for cell-reselection based on the event-triggered measurement of a CD-SSB in accordance with various aspects of the disclosure. FIG. 10 includes a UE 1002 and a base station 1004. In some aspects, the UE 1002 may be a RedCap UE.

At 1006, the UE 1002 enters an RRC connected mode. At 1008, the UE 1002 and the base station 1004 may exchange UE capability signaling for a small data transmission and a measurement relaxation (e.g., the measurement relaxation for cell-reselection based on the event-triggered measurement as described herein). For example, the set of capabilities may indicate that the UE is capable of small data transmission (SDT), performing relaxed measurements during SDT, or other suitable capability. As another example, the UAI may indicate the UE relaxation state for performing different types of measurements (e.g., radio resource management (RRM), radio link monitoring (RLM), bidirectional forwarding detection (BFD)) while SDT is ongoing, the availability of data and/or signaling mapped to radio bearers not configured for SDT, or other suitable UAI. In some examples, the UAI may further include reports (e.g., CSI reports or other suitable reports) associated with measurement of CD-SSBs and/or NCD-SSBs in the serving cell and non-serving cell.

At 1010, the UE 1002 may receive an RRC configuration for the small data transmission and the measurement relaxation based on the UE capability. For example, all or part of the RRC configuration may be included in an RRC release message. The RRC message may indicate, for example, a number of SSBs (e.g., CD-SSBs and/or NCD-SSBs) associated with the serving cell and a non-serving cell (e.g., a neighbor or target cell for cell reselection) for the UE to measure. For example, the configured measurement relaxation can include a reduced duty cycle for measurements of serving/neighbor cells or a fewer number of neighbor cells to measure. At 1012, the UE 1002 may enter an RRC inactive mode.

At 1014, the UE 1002 may measure an NCD-SSB, such as the NCD-SSB 1016 from the base station 1004. In some examples, the UE 1002 may obtain L1 and/or L3 measurements of the NCD-SSB 1016. In some examples, the UE 1002 may further perform a TA validation for a CG-SDT. The NCD-SSB measurements may further be used for one or more evaluations or for measurement reporting, as further described in more detail below.

At 1018, the UE 1002 may transmit a first PUSCH transmission for a small data transmission including an RRC resume request. In some examples, the first PUSCH transmission may be a Msg3 of the four-step RACH procedure described herein or MsgA of the two-step RACH procedure described herein. In other examples, the first PUSCH transmission may be a CG-SDT.

The UE 1002 may receive a network response 1020 from the base station 1004. In some examples, the network response 1020 may acknowledge the RRC resume request received at the base station 1004 from the UE 1002. The PDDCH and/or PDSCH used for transmission of the network response 1020 may be scrambled by a UE ID associated with the UE 1002. For example, the network response may include an ACK/NACK of the first PUSCH transmission for a CG-SDT. In other examples, the network response may be Msg4 of the four-step RACH procedure described herein or Msg B of the two-step RACH procedure described herein.

At 1022, the UE 1002 may perform a first evaluation for a small data transmission based on the NCD-SSB 1024 from the base station 1004. In some examples, the first evaluation for a small data transmission may include a validation of a CG-PUSCH occasion for a CG-SDT, as well as time/frequency tracking and automatic gain control (AGC), based on the NCD-SSB 1024 and/or NCD-SSB 1016. In some examples, the first evaluation for a small data transmission may include measurements for PRACH resource selection for a RA-SDT, as well as time/frequency tracking and AGC, based on the NCD-SSB 1024. In some examples, the UE 1002 may receive the NCD-SSB 1024 in the initial DL BWP for CG-SDT (e.g., the initial DL BWP 812 in FIG. 8). The UE 1002 may perform one or more small data uplink transmissions 1026, 1028 based on the first evaluation.

At 1030, the UE 1002 may perform a second evaluation based on the NCD-SSB 1032 from the base station 1004. The second evaluation may be performed for various purposes, including, for example, cell reselection, link quality measurements, and other suitable purposes. In some examples, the second evaluation may include a determination as to whether one or more conditions for the previously described event trigger are met. For example, to satisfy a first condition of the event trigger, the UE 1002 may perform L1 and/or L3 measurements based on the NCD-SSB 1032 transmitted by the base station 1004 (e.g., the serving cell) in the initial DL BWP for CG-SDT (e.g., the initial DL BWP 812 in FIG. 8) or RA-SDT (e.g., the initial DL BWP 912 in FIG. 9). To satisfy a second condition of the event trigger, the UE may determine that a decision metric based on the L1 and/or L3 measurements of the NCD-SSB 1032 is below a set of one or more thresholds pre-configured by RRC or SI for CG-SDT or RA-SDT. To satisfy a third condition of the event trigger, the UE may have a valid timing advance (TA) and a valid CG-PUSCH occasion for CG-SDT, as described above.

The UE 1002 may optionally transmit a measurement report 1034 for the NCD-SSB (e.g., the NCD-SSB 1032). For example, the measurement report may be an L1 or L3 measurement report including one or more measurements (e.g., SS-RSRPs) obtained by the UE of the NCD-SSB (e.g., the NCD-SSB 1032). In some examples, the measurements included in an L3 measurement report may be collected by L1, but filtered and reported by L3 to remove the effect of fast fading and ignore short-term variations.

In one scenario, at 1036, if the previously described conditions of the event trigger for the CG-SDT or RA-SDT are met, the UE 1002 may switch to one or more BWPs that are not the initial DL BWP of the UE 1002. For example, the UE 1002 may switch to a BWP (e.g., the BWP 824 or the BWP 924) outside of the bandwidth of the initial BWP of the UE 1002 to measure a CD-SSB in response to the event trigger. In other words, the UE 1002 may switch to a BWP that is not the active DL BWP (initial DL BWP) of the UE 1002.

Therefore, in the measurement relaxation for cell-reselection based on an event-triggered measurement of a CD-SSB described herein, a UE performing a small data transmission in its initial BW part may measure an NCD-SSB in the initial BW part and may determine that a cell re-selection operation is needed. For example, the UE may determine that a cell re-selection operation is needed if the measurement of the NCD-SSB is below at least one set of predefined thresholds. The UE may switch to a BWP outside the initial BWP of the UE to measure the CD-SSB of its serving cell and/or a CD-SSB of a neighbor cell. Therefore, the measurement relaxation for cell-reselection based on the event-triggered measurement of a CD-SSB allows the UE to avoid periodic switching out of the initial BWP of the UE for purposes of measuring a CD-SSB. This may enable the UE to reduce operation complexity, achieve power saving and a reduction in signaling overhead.

In another scenario, the UE 1002 may receive a message 1038 that commands the UE 1002 to measure a CD-SSB or other DL reference signal (RS) of the serving cell (e.g., the base station 1004), a CD-SSB or other DL reference signal of a non-serving cell, and/or any other measurements for the serving cell or non-serving cell.

At 1040, the UE 1002 measures a CD-SSB or other DL reference signal of the serving cell (e.g., the base station 1004), a CD-SSB or other DL reference signal of a non-serving cell, and/or any other measurements for the serving cell or non-serving cell in response to the message 1038. The UE 1002 may use one or more of these measurements for cell reselection or for purposes other than cell reselection. In some examples, the message 1038 may be a PDCCH or a MAC-CE addressed to an identifier (e.g., a UE ID) of the UE 1002. In some examples, the UE 1002 (e.g., at 1040) may perform L1, L2, and/or L3 measurements of the CD-SSB or other DL reference signal of the serving cell, the CD-SSB or other DL reference signal of the non-serving cell, and/or any other measurements for the serving cell or the non-serving cell.

In some aspects, the message 1038 (e.g., PDCCH or a MAC-CE) commands the UE 1002 to measure a CD-SSB or other DL reference signal of the serving cell (e.g., the base station 1004), a CD-SSB or other DL reference signal of a non-serving cell, and/or any other measurements for the serving cell or non-serving cell in one or more BWPs that is not the initial DL BWP of the UE 1002 (e.g., outside the active DL BWP of the UE 1002).

Therefore, in the measurement relaxation for cell-reselection based on a message commanding a UE to measure a CD-SSB described herein, a UE (e.g., a RedCap UE) performing a small data transmission in its initial BW part may apply a measurement relaxation for cell-reselection based on the message received at the UE. For example, if the UE is configured with an initial DL BWP for CG-SDT (e.g., the initial DL BWP 812 in FIG. 8) or RA-SDT (e.g., the initial DL BWP 912 in FIG. 9) and the initial DL BWP includes an NCD-SSB (e.g., NCD-SSB 814 or NCD-SSB 914) but does not include a CD-SSB (e.g., the CD-SSB 828, 928), the UE may measure a CD-SSB in a BWP outside the bandwidth of the initial DL BWP for CG-SDT or RA-SDT in response to a MAC-CE message or a message (e.g., DCI) received in the PDCCH. In some aspects, the MAC-CE message or the message received in the PDCCH requests or commands the UE to measure a CD-SSB in a BWP outside the bandwidth of the initial DL BWP for CG-SDT or RA-SDT.

In some aspects, the payload, a demodulation reference signal (DMRS), or CRC of the MAC-CE message or the message (e.g., DCI) received in the PDCCH may be scrambled by a sequence associated with the UE ID and may be transmitted in the initial DL BWP of the UE. In some examples, the sequence associated with the UE ID may be a radio network temporary identifier (RNTI), such as a cell RNTI (C-RNTI), a configured scheduling RNTI (CS-RNTI), an inactive RNTI (I-RNTI), or a modulation and coding scheme (MCS) RNTI (MCS-RNTI).

Additional Features for Enabling Measurement Relaxation at a UE

A UE may support one or more additional features for enabling L1/L3 measurement relaxation at a UE. In some aspects, these additional features can be supported by a RedCap UE for enabling L1/L3 measurement relaxation during a small data transmission.

A first additional feature may allow the UE to support RRC configured, MAC-CE activated or PDCCH ordered SRS transmission in a UE-specific initial UL BWP (e.g., a RedCap UE-specific initial UL BWP) configured for a small data transmission. In some examples, the RRC configuration, MAC-CE, or DCI may be transmitted in the UE-specific initial DL BWP and the payload or CRC of the RRC configuration, MAC-CE, or DCI may be scrambled by a sequence associated with the UE ID (e.g., C-RNTI, CS-RNTI, I-RNTI, MCS-RNTI). An example implementation of the first additional feature is described with reference to FIG. 11.

Figure 11:
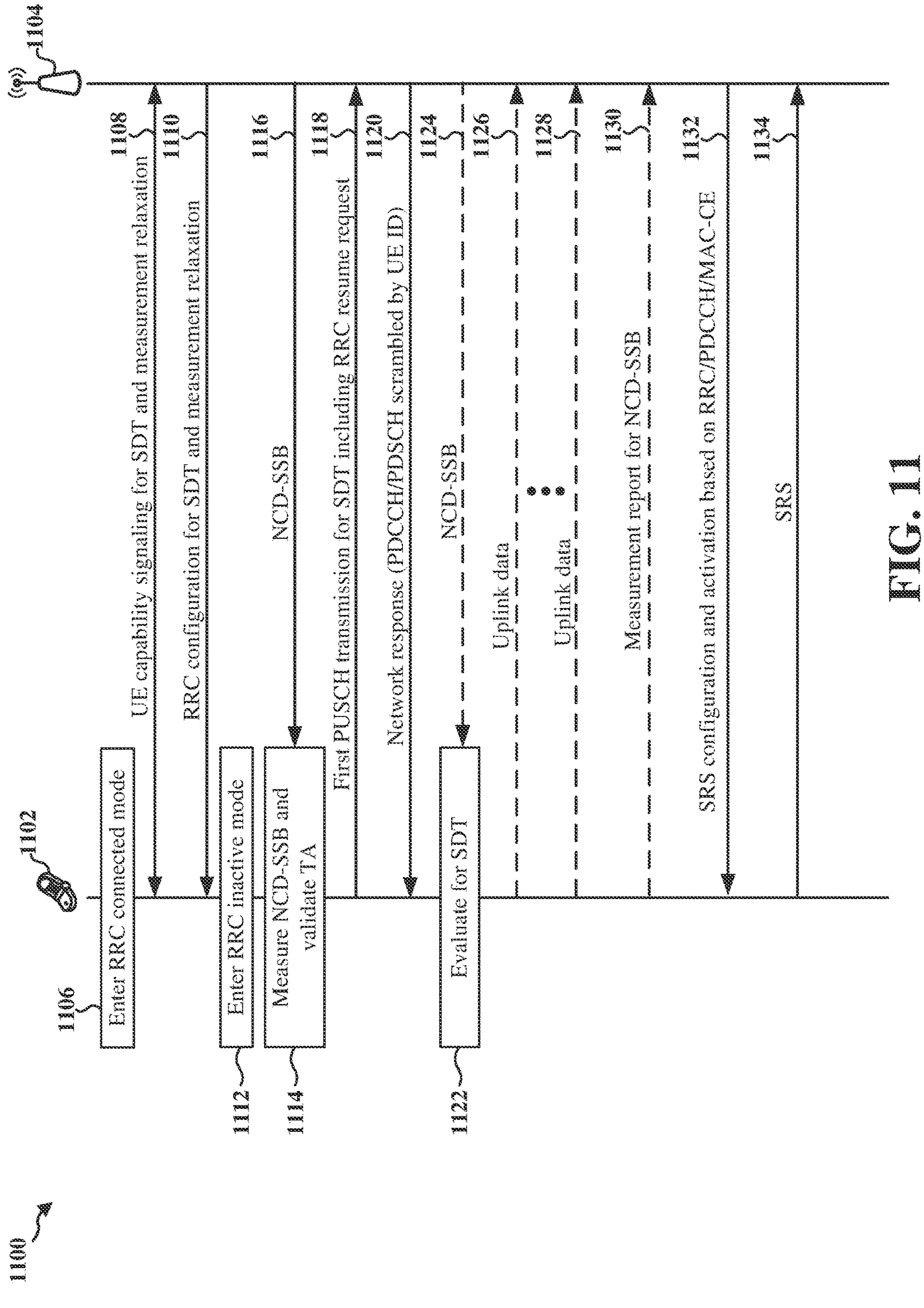
FIG. 11 is a signal flow diagram illustrating an RRC configured, MAC-CE activated or PDCCH ordered SRS transmission in a UE-specific initial UL BWP configured for a small data transmission in accordance with various aspects of the disclosure.

FIG. 11 is a signal flow diagram 1100 illustrating an RRC configured, MAC-CE activated or PDCCH ordered SRS transmission in a UE-specific initial UL BWP (e.g., a RedCap UE-specific initial UL BWP) configured for a small data transmission in accordance with various aspects of the disclosure. FIG. 11 includes a UE 1102 and a base station 1104. In some aspects, the UE 1102 may be a RedCap UE.

At 1106, the UE 1102 enters an RRC connected mode. At 1108, the UE 1102 and the base station 1104 may exchange UE capability signaling for a small data transmission and a measurement relaxation (e.g., a measurement relaxation for cell-reselection as described herein). For example, the set of capabilities may indicate that the UE is capable of small data transmission (SDT), performing relaxed measurements during SDT, or other suitable capability. As another example, the UAI may indicate the UE relaxation state for performing different types of measurements (e.g., radio resource management (RRM), radio link monitoring (RLM), bidirectional forwarding detection (BFD)) while SDT is ongoing, the availability of data and/or signaling mapped to radio bearers not configured for SDT, or other suitable UAI. In some examples, the UAI may further include reports (e.g., CSI reports or other suitable reports) associated with measurement of CD-SSBs and/or NCD-SSBs in the serving cell and non-serving cell.

At 1110, the UE 1102 may receive an RRC configuration for the small data transmission and the measurement relaxation based on the UE capability. The RRC configuration may include an RRC release message. The RRC message may indicate, for example, a number of SSBs (e.g., CD-SSBs and/or NCD-SSBs) associated with the serving cell and a non-serving cell (e.g., a neighbor or target cell for cell reselection) for the UE to measure. For example, the configured measurement relaxation can include a reduced duty cycle for measurements of serving/neighbor cells or a fewer number of neighbor cells to measure. At 1112, the UE 1102 may enter an RRC inactive mode.

At 1114, the UE 1102 may measure an NCD-SSB 1116 from the base station 1104. In some examples, the UE 1102 may obtain L1 and/or L3 measurements of the NCD-SSB 1116. In some examples, the UE 1102 may perform a TA validation for a CG-SDT. The NCD-SSB measurements may further be used for one or more evaluations or for measurement reporting, as further described in more detail below.

At 1118, the UE 1102 may transmit a first PUSCH transmission for a small data transmission including an RRC resume request. In some examples, the first PUSCH transmission may be a Msg3 of the four-step RACH procedure described herein or MsgA of the two-step RACH procedure described herein. In other examples, the first PUSCH transmission may be a CG-SDT.

The UE 1102 may receive a network response 1120 from the base station 1104. In some examples, the network response 1120 may acknowledge the RRC resume request received at the base station 1104 from the UE 1102. The PDDCH and/or PDSCH used for transmission of the network response 1120 may be scrambled by a UE ID associated with the UE 1102. For example, the network response may include an ACK/NACK of the first PUSCH transmission for a CG-SDT. In other examples, the network response may be Msg4 of the four-step RACH procedure described herein or Msg B of the two-step RACH procedure described herein.

At 1122, the UE 1102 may perform an evaluation for a small data transmission based on the NCD-SSB 1124 from the base station 1104. In some examples, the first evaluation for a small data transmission may include a validation of a CG-PUSCH occasion for a CG-SDT, as well as time/frequency tracking and automatic gain control (AGC), based on the NCD-SSB 1124 and/or NCD-SSB 1116. In some examples, the first evaluation for a small data transmission may include measurements for PRACH resource selection for a RA-SDT, as well as time/frequency tracking and AGC, based on the NCD-SSB 1024. In some examples, the UE 1102 may receive the NCD-SSB 1124 in the initial DL BWP for CG-SDT (e.g., the initial DL BWP 812 in FIG. 8). The UE 1102 may perform one or more small data uplink transmissions 1126, 1128.

The UE 1102 may optionally transmit a measurement report 1130 (e.g., CSI report) including one or more measurements of the NCD-SSB (e.g., NCD-SSB 1116, 1124). The base station 1104 may perform an evaluation of the link quality based on a CSI report sent from the UE 1102 to the base station 1104. In other examples, the base station 1104 may perform an evaluation of the link quality based on the UL small data transmissions 1126, 1128.

The UE 1102 may receive a message 1130 including an SRS configuration and activation. For example, the UE 1102 may receive the message in response to the link quality evaluation performed by the base station 1104. In an example, the UE 1102 may receive the message if, for example, a measurement (e.g., an RSRP) of the NCD-SSB is below one or more thresholds. In some examples, the message 1130 may include an RRC configuration for the SRS configuration. In some examples, the message 1130 may include the PDCCH (e.g., DCI) that orders an SRS transmission at the UE 1102. In some examples, the message 1130 may include a MAC-CE that activates a previously RRC-configured SRS transmission at the UE 1102.

The UE 1102 may transmit the SRS 1132 in response to the message 1130. In some examples, the UE 1102 transmits the SRS 1132 in an initial UL BWP of the UE 1102 configured for a small data transmission (e.g., the initial UL BWP 820 in FIG. 8 or the initial UL BWP 920 in FIG. 9).

A second additional feature may allow the UE to support a MAC-CE ordered or PDCCH ordered BWP switching to measure a CD-SSB outside the bandwidth of the UE-specific initial DL BWP configured for a small data transmission. In some examples, the MAC-CE or DCI may be transmitted in the UE-specific initial DL BWP and the payload or CRC of the MAC-CE or DCI may be scrambled by a sequence associated with the UE ID (e.g., C-RNTI, CS-RNTI, I-RNTI, MCS-RNTI). An example implementation of the second optional feature is described with reference to FIG. 12.

Figure 12:
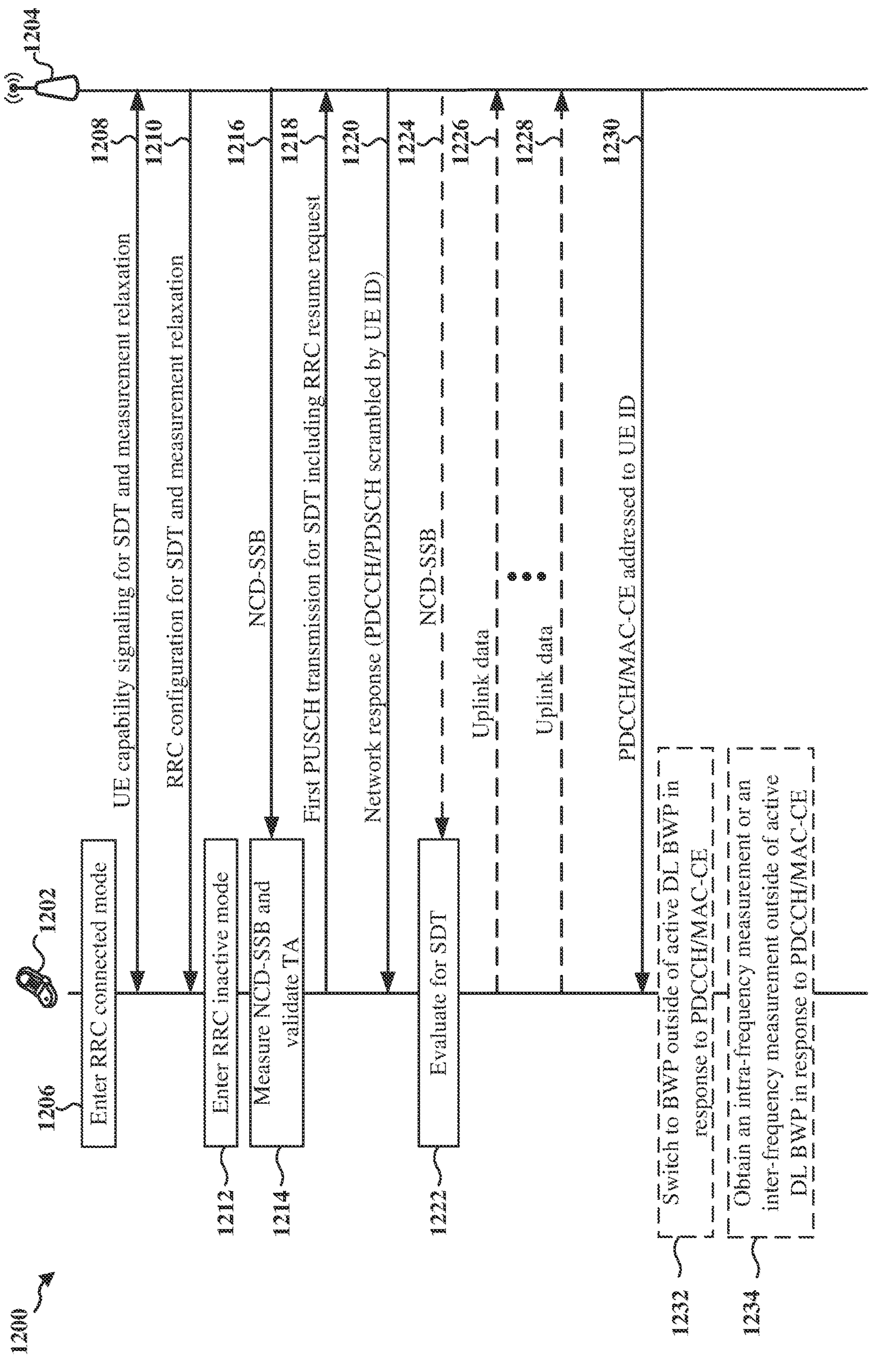
FIG. 12 is a signal flow diagram illustrating a MAC-CE ordered or PDCCH ordered BWP switching to measure a CD-SSB outside a UE-specific initial DL BWP configured for a small data transmission in accordance with various aspects of the disclosure.

FIG. 12 is a signal flow diagram 1200 illustrating a MAC-CE ordered or PDCCH ordered BWP switching to measure a CD-SSB outside a UE-specific initial DL BWP (e.g., a RedCap UE-specific initial DL BWP) configured for a small data transmission in accordance with various aspects of the disclosure. FIG. 12 includes a UE 1202 and a base station 1204. In some aspects, the UE 1202 may be a RedCap UE.

At 1206, the UE 1202 enters an RRC connected mode. At 1208, the UE 1202 and the base station 1204 may exchange UE capability signaling for a small data transmission and a measurement relaxation (e.g., the measurement relaxation for cell-reselection based on the event-triggered measurement as described herein). For example, the set of capabilities may indicate that the UE is capable of small data transmission (SDT), performing relaxed measurements during SDT, or other suitable capability. As another example, the UAI may indicate the UE relaxation state for performing different types of measurements (e.g., radio resource management (RRM), radio link monitoring (RLM), bidirectional forwarding detection (BFD)) while SDT is ongoing, the availability of data and/or signaling mapped to radio bearers not configured for SDT, or other suitable UAI. In some examples, the UAI may further include reports (e.g., CSI reports or other suitable reports) associated with measurement of CD-SSBs and/or NCD-SSBs in the serving cell and non-serving cell.

At 1210, the UE 1202 may receive an RRC configuration for the small data transmission and the measurement relaxation. For example, all or part of the RRC configuration may be included in an RRC release message. The RRC message may indicate, for example, a number of SSBs (e.g., CD-SSBs and/or NCD-SSBs) associated with the serving cell and a non-serving cell (e.g., a neighbor or target cell for cell reselection) for the UE to measure. For example, the configured measurement relaxation can include a reduced duty cycle for measurements of serving/neighbor cells or a fewer number of neighbor cells to measure. At 1212, the UE 1202 may enter an RRC inactive mode.

At 1214, the UE 1202 may measure an NCD-SSB 1216 from the base station 1204. In some examples, the UE 1202 may obtain L1 and/or L3 measurements of the NCD-SSB 1216. In some examples, the UE 1202 may perform a TA validation for a CG-SDT. The NCD-SSB measurements may further be used for one or more evaluations or for measurement reporting, as further described in more detail below.

At 1218, the UE 1202 may transmit a first PUSCH transmission for a small data transmission including an RRC resume request. In some examples, the first PUSCH transmission may be a Msg3 of the four-step RACH procedure described herein or MsgA of the two-step RACH procedure described herein.

The UE 1202 may receive a network response 1220 from the base station 1204. In some examples, the network response 1220 may acknowledge the RRC resume request received at the base station 1204 from the UE 1202. The PDDCH and/or PDSCH used for transmission of the network response 1220 may be scrambled by a UE ID associated with the UE 1202. For example, the network response may include an ACK/NACK of the first PUSCH transmission for a CG-SDT. In other examples, the network response may be Msg4 of the four-step RACH procedure described herein or Msg B of the two-step RACH procedure described herein.

At 1222, the UE 1202 may perform an evaluation for a small data transmission based on the NCD-SSB 1224 from the base station 1204. In some examples, the first evaluation for a small data transmission may include a validation of a CG-PUSCH occasion for a CG-SDT, as well as time/frequency tracking and automatic gain control (AGC), based on the NCD-SSB 1224 and/or NCD-SSB 1216. In some examples, the evaluation for a small data transmission may include measurements for PRACH resource selection for a RA-SDT, as well as time/frequency tracking and AGC, based on the NCD-SSB 1024. In some examples, the UE 1202 may receive the NCD-SSB 1224 in the initial DL BWP for CG-SDT (e.g., the initial DL BWP 812 in FIG. 8). The UE 1202 may perform one or more small data uplink transmissions 1226, 1228.

The UE 1202 may receive a message 1230 (e.g., a PDCCH or MAC-CE) addressed to the identifier (e.g., UE ID) of the UE 1202. The message 1230 may order or command the UE 1202 to switch to a BWP outside the bandwidth of the initial DL BWP of the UE 1202 (e.g., outside of the active DL BWP of the UE 1202).

At 1232, the UE 1202 switches to a BWP outside the bandwidth of the initial DL BWP of the UE 1202 (e.g., outside of the active DL BWP of the UE 1202) in response to the message 1230. In some aspects, the message 1230 may include a PDCCH or MAC-CE that orders or commands the UE 1202 to obtain an intra-frequency measurement or an inter-frequency measurement outside the bandwidth of the initial DL BWP (e.g., outside of the active DL BWP of the UE 1202) in response to message 1230 (e.g., a PDCCH or MAC-CE).

At 1234, the UE 1202 obtains an intra-frequency measurement or an inter-frequency measurement outside the bandwidth of the initial DL BWP (e.g., outside of the active DL BWP of the UE 1202) in response to message 1230 (e.g., a PDCCH or MAC-CE). In some examples, the UE 1202 at 1234 may measure a CD-SSB or other DL reference signal of the serving cell (e.g., the base station 1204), a CD-SSB or other DL reference signal of a non-serving cell, and/or any other measurements for the serving cell or non-serving cell in response to the message 1230. The UE 1202 may use one or more of these measurements for cell reselection or for purposes other than cell reselection. In some examples, the UE 1202 (e.g., at 1234) may perform L1, L2, and/or L3 measurements of a CD-SSB or other DL reference signal of the serving cell, a CD-SSB or other DL reference signal of the non-serving cell, and/or any other measurements for the serving cell or the non-serving cell.

A third additional feature may allow the UE to support CSI reporting on PUSCH or CSI reporting requested or activated by DCI or a MAC-CE. In some examples, the DCI or MAC-CE may be transmitted in the UE-specific initial DL BWP and the payload or CRC of the DCI or MAC-CE may be scrambled by a sequence associated with the UE ID (e.g., C-RNTI, CS-RNTI, I-RNTI, MCS-RNTI). An example implementation of the third optional feature is described with reference to FIG. 13.

Figure 13:
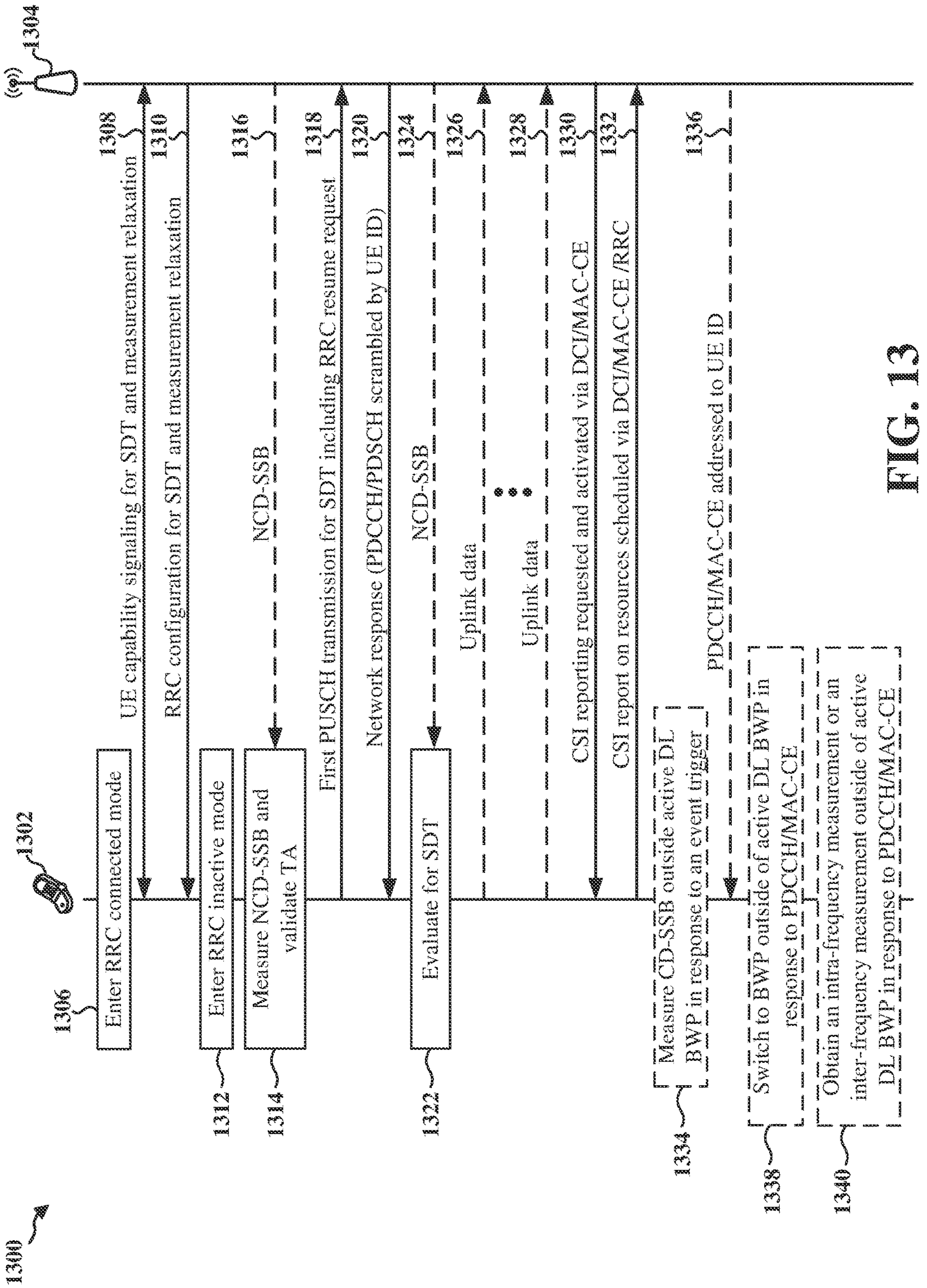
FIG. 13 is a signal flow diagram illustrating CSI reporting on PUSCH or CSI reporting requested or activated by DCI or a MAC-CE in accordance with various aspects of the disclosure.

FIG. 13 is a signal flow diagram 1300 illustrating CSI reporting on PUSCH or CSI reporting requested or activated by DCI or a MAC-CE in accordance with various aspects of the disclosure. FIG. 13 includes a UE 1302 and a base station 1304. In some aspects, the UE 1302 may be a RedCap UE.

At 1306, the UE 1302 enters an RRC connected mode. At 1308, the UE 1302 and the base station 1304 may exchange UE capability signaling for a small data transmission and a measurement relaxation (e.g., the measurement relaxation for cell-reselection based on the event-triggered measurement as described herein). For example, the set of capabilities may indicate that the UE is capable of small data transmission (SDT), performing relaxed measurements during SDT, or other suitable capability. As another example, the UAI may indicate the UE relaxation state for performing different types of measurements (e.g., radio resource management (RRM), radio link monitoring (RLM), bidirectional forwarding detection (BFD)) while SDT is ongoing, the availability of data and/or signaling mapped to radio bearers not configured for SDT, or other suitable UAI. In some examples, the UAI may further include reports (e.g., CSI reports or other suitable reports) associated with measurement of CD-SSBs and/or NCD-SSBs in the serving cell and non-serving cell.

At 1310, the UE 1302 may receive an RRC configuration for the small data transmission and the measurement relaxation. For example, all or part of the RRC configuration may be included in an RRC release message. The RRC message may indicate, for example, a number of SSBs (e.g., CD-SSBs and/or NCD-SSBs) associated with the serving cell and a non-serving cell (e.g., a neighbor or target cell for cell reselection) for the UE to measure. For example, the configured measurement relaxation can include a reduced duty cycle for measurements of serving/neighbor cells or a fewer number of neighbor cells to measure. At 1312, the UE 1302 may enter an RRC inactive mode.

At 1314, the UE 1302 may measure an NCD-SSB 1316 from the base station 1304. In some examples, the UE 1302 may obtain L1 and/or L3 measurements of the NCD-SSB 1316. In some examples, the UE 1302 may perform a TA validation for a CG-SDT. The NCD-SSB measurements may further be used for one or more evaluations or for measurement reporting, as further described in more detail below.

At 1318, the UE 1302 may transmit a first PUSCH transmission for a small data transmission including an RRC resume request. In some examples, the first PUSCH transmission may be a Msg3 of the four-step RACH procedure described herein or MsgA of the two-step RACH procedure described herein. In other examples, the first PUSCH transmission may be a CG-SDT.

The UE 1302 may receive a network response 1320 from the base station 1304. In some examples, the network response 1320 may acknowledge the RRC resume request received at the base station 1304 from the UE 1302. The PDDCH and/or PDSCH used for transmission of the network response 1320 may be scrambled by a UE ID associated with the UE 1302. For example, the network response may include an ACK/NACK of the first PUSCH transmission for a CG-SDT. In other examples, the network response may be Msg4 of the four-step RACH procedure described herein or Msg B of the two-step RACH procedure described herein.

At 1322, the UE 1302 may perform an evaluation for a small data transmission based on the NCD-SSB 1324 from the base station 1304. In some examples, the first evaluation for a small data transmission may include a validation of a CG-PUSCH occasion for a CG-SDT, as well as time/frequency tracking and automatic gain control (AGC), based on the NCD-SSB 1324 and/or NCD-SSB 1316. In some examples, the first evaluation for a small data transmission may include measurements for PRACH resource selection for a RA-SDT, as well as time/frequency tracking and AGC, based on the NCD-SSB 1324. In some examples, the UE 1302 may receive the NCD-SSB 1324 in the initial DL BWP for CG-SDT (e.g., the initial DL BWP 812 in FIG. 8). The UE 1302 may perform one or more small data uplink transmissions 1326, 1328.

The UE 1302 may receive a message 1330 (also referred to as a CSI report request control message) that requests and/or activates a CSI report transmission based on the NCD-SSB measurements obtained at 1314, 1322. In some examples, the message 1332 may include the PDCCH (e.g., DCI) that requests a CSI report from the UE 1302. In some examples, the message 1330 may include a MAC-CE that activates a CSI report transmission at the UE 1302.

The UE 1302 may transmit a CSI report (e.g., via the message 1332) on resources scheduled via the PDCCH (e.g., DCI), MAC-CE, or RRC. For example, the CSI report may be an L1 or L3 report including one or more measurements (e.g., SS-RSRPs) obtained by the UE of the NCD-SSB (e.g., the NCD-SSB 1316, 1324). In some examples, the measurements included in an L3 measurement report may be collected by L1, but filtered and reported by L3 to remove the effect of fast fading and ignore short-term variations. In some examples, the CSI report can be transmitted in the UAI, multiplexed with UL data, or separately scheduled via the DCI (as shown in FIG. 13). In one scenario, at 1334, if the previously described conditions of the event trigger for the CG-SDT or RA-SDT are met, the UE 1302 may switch to one or more BWPs that is not the initial DL BWP of the UE 1302 to measure a CD-SSB in response to the event trigger. In other words, the UE 1302 may switch to a BWP outside the bandwidth of the initial DL BWP of the UE 1302 (e.g., outside of the active DL BWP of the UE 1302) to measure the CD-SSB.

In another scenario, the UE 1302 may receive a message 1336 (e.g., a PDCCH or MAC-CE) addressed to the identifier (e.g., UE ID) of the UE 1302. The message 1336 may order or command the UE 1302 to switch to a BWP outside the bandwidth of the initial DL BWP of the UE 1302 (e.g., outside of the active DL BWP of the UE 1302). At 1338, the UE 1302 switches to a BWP outside the initial DL BWP of the UE 1302 (e.g., outside of the active DL BWP of the UE 1302) in response to the message 1336.

In some aspects, the message 1336 may include a PDCCH or MAC-CE that orders or commands the UE 1302 to obtain an intra-frequency measurement or an inter-frequency measurement outside the initial DL BWP (e.g., outside of the active DL BWP of the UE 1302) in response to the message 1336 (e.g., a PDCCH or MAC-CE). The message 1336 may be sent, for example, based on an evaluation of the link quality by the base station 1304. For example, the base station 1304 may send the message 1336 if, for example, a measurement (e.g., an RSRP) of the NCD-SSB 1316, 1324 is below one or more thresholds. However, the base station 1304 may not send the message if the measurement is equal to or greater than one or more thresholds. In this example, the UE 1302 may skip the intra/inter-frequency measurements for neighbor cells (e.g., if the CSI report of the serving cell indicates an acceptable link quality of the serving cell), thus saving UE power.

In some examples, the UE 1302 at 1340 may measure a CD-SSB or other DL RS of the serving cell (e.g., the base station 1304), a CD-SSB or other DL RS of a non-serving cell, and/or any other measurements for the serving cell or non-serving cell in response to the message 1336. The UE 1302 may use one or more of these measurements for cell reselection or for purposes other than cell reselection. In some examples, the UE 1302 (e.g., at 1340) may perform L1, L2, and/or L3 measurements of a CD-SSB or other DL RS of the serving cell, a CD-SSB or other DL RS of the non-serving cell, and/or any other measurements for the serving cell or the non-serving cell.

In some aspects, DCI supporting one or more of the operations described herein (e.g., measurement relaxation associated with a small data transmission) can be transmitted in a UE-specific search space set or a common search space set configured for MO-SDT or MT-SDT. In some aspects, the size of a DCI format supporting the operations described herein, such as the PDCCH ordering an SRS transmission, a CSI report, BWP switching, CD-SSB measurement, or a PDCCH scheduling MAC-CE, can be aligned with the size of a fallback DCI format (e.g., DCI format 1_0 or DCI format 0_0) or a compact DCI format (e.g., DCI format 1_2 or DCI format 2_2).

The payload or CRC of DCI supporting one or more of the operations described herein can be scrambled by a sequence associated with an identifier (e.g., the UE ID) of the UE. For example, the UE ID may include the C-RNTI, CS-RNTI, I-RNTI, or MCS-RNTI.

In some aspects, the DCI can include one or more fields for indicating PDCCH ordered intra-frequency and/or inter-frequency measurements in a BWP that is not the initial DL BWP of the UE (e.g., for intra-frequency and/or inter-frequency measurements to performed outside the bandwidth of the bandwidth of a RedCap-specific initial DL BWP) and one or more fields for indicating BWP switching to re-acquire updated SI in the BWP that is not the initial DL BWP of the UE (e.g., to re-acquire updated SI outside the bandwidth of a RedCap-specific initial DL BWP) when the initial DL BWP of the UE does not contain a CD-SSB and common search space (CSS) sets for paging, SIB 1, other SI (OSI).

Figure 14:
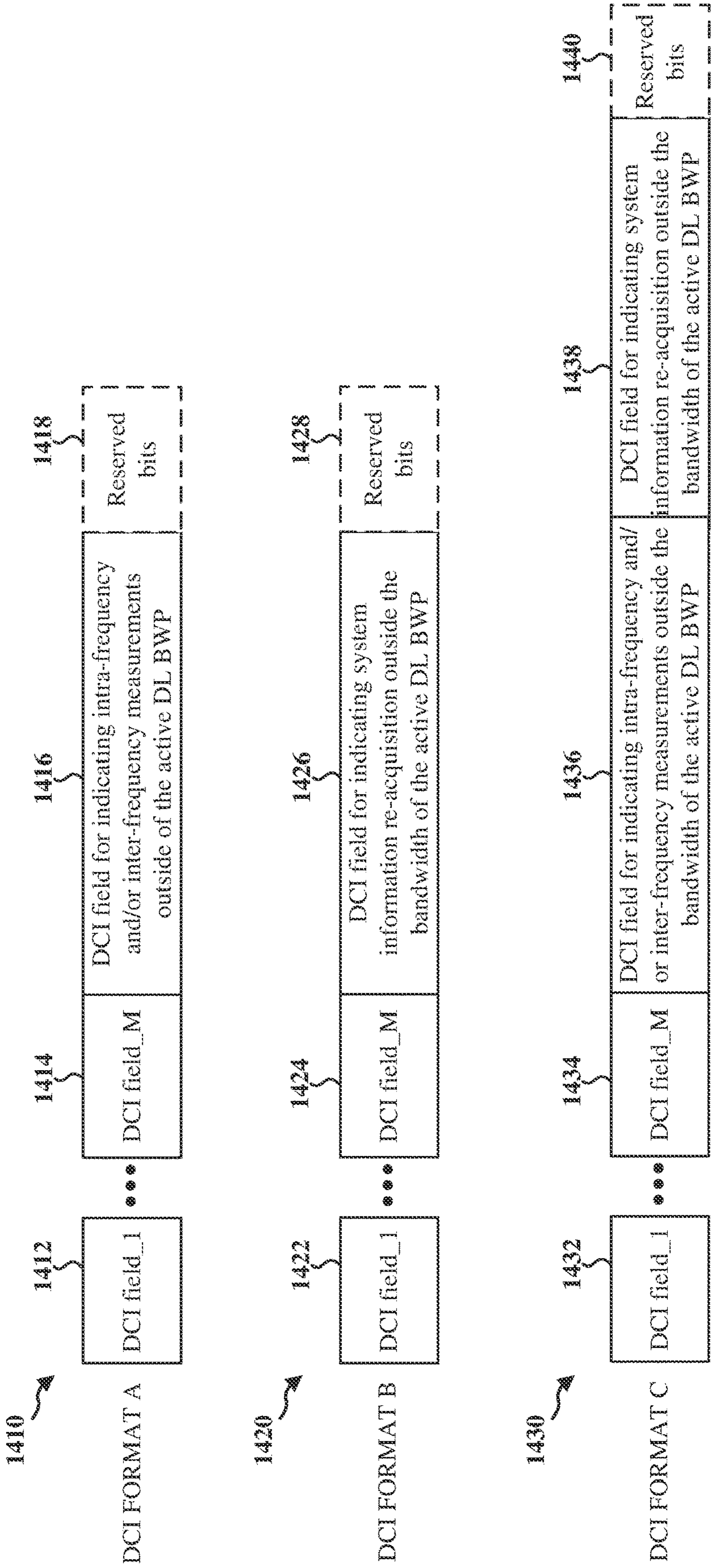
FIG. 14 illustrates example DCI formats for supporting the operations described herein in accordance with various aspects.

FIG. 14 illustrates example DCI formats for supporting the operations described herein in accordance with various aspects. FIG. 14 includes a first DCI format 1410 (e.g., DCI format A), a second DCI format 1420 (e.g., DCI format B), and a third DCI format 1430 (e.g., DCI format C). The first DCI format 1410 may include a DCI field 1416 for indicating intra-frequency and/or inter-frequency measurements outside the bandwidth of the active DL BWP of the UE in addition to one or more other DCI fields (e.g., DCI field_1 1412 to DCI field_M 1414, where M is an integer greater than two). In other aspects, the DCI field 1416 may be for indicating measurements for synchronization, channel state reporting, interference management, radio link monitoring, beam management, beam failure detection, power control, positioning, or radio resource management outside the bandwidth of the active DL BWP of the UE. The first DCI format 1410 may include reserved bits 1418.

The second DCI format 1420 may include a DCI field 1426 for indicating system information re-acquisition outside the bandwidth of the active DL BWP of the UE in addition to one or more other DCI fields (e.g., DCI field_1 1422 to DCI field_M 1424, where M is an integer greater than two). For example, the DCI field 1426. In other aspects, the DCI field 1426 may be for indicating monitoring of paging information outside the bandwidth of the active DL BWP of the UE. The second DCI format 1420 may include reserved bits 1428.

The third DCI format 1430 may include a DCI field 1436 for indicating intra-frequency and/or inter-frequency measurements outside the bandwidth of the active DL BWP and a DCI field 1438 for indicating system information re-acquisition outside the bandwidth of the active DL BWP of the UE in addition to one or more other DCI fields (e.g., DCI field_1 1432 to DCI field_M 1434, where M is an integer greater than two). In other aspects, the DCI field 1436 may be for indicating measurements for synchronization, channel state reporting, interference management, radio link monitoring, beam management, beam failure detection, power control, positioning, or radio resource management outside the bandwidth of the active DL BWP of the UE. In other aspects, the DCI field 1438 may be for indicating monitoring of paging information outside the bandwidth of the active DL BWP of the UE. The third DCI format 1430 may include reserved bits 1440.

Figure 15A:
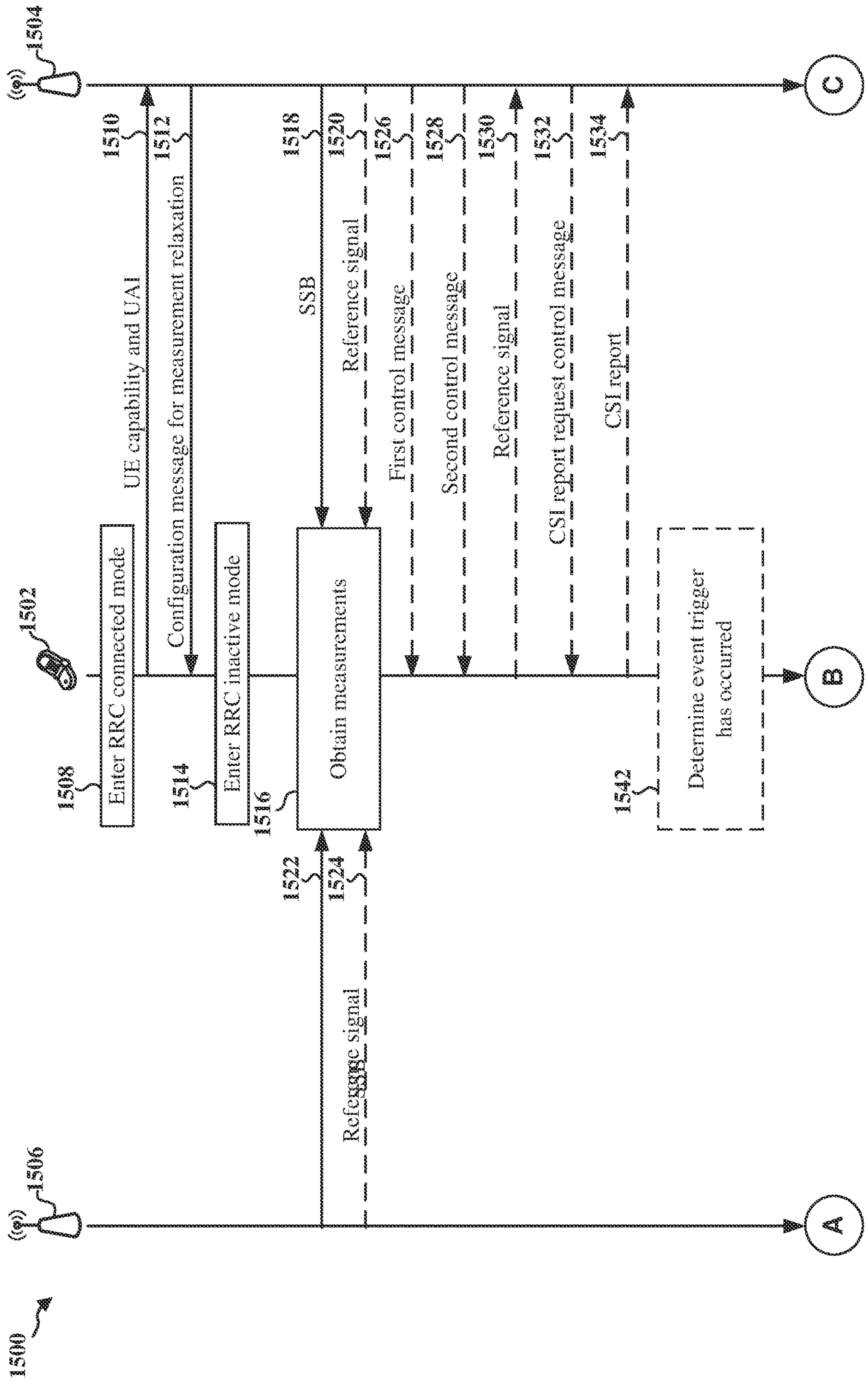
FIGS. 15A and 15B are a signal flow diagram in accordance with various aspects of the disclosure.
Figure 15B:
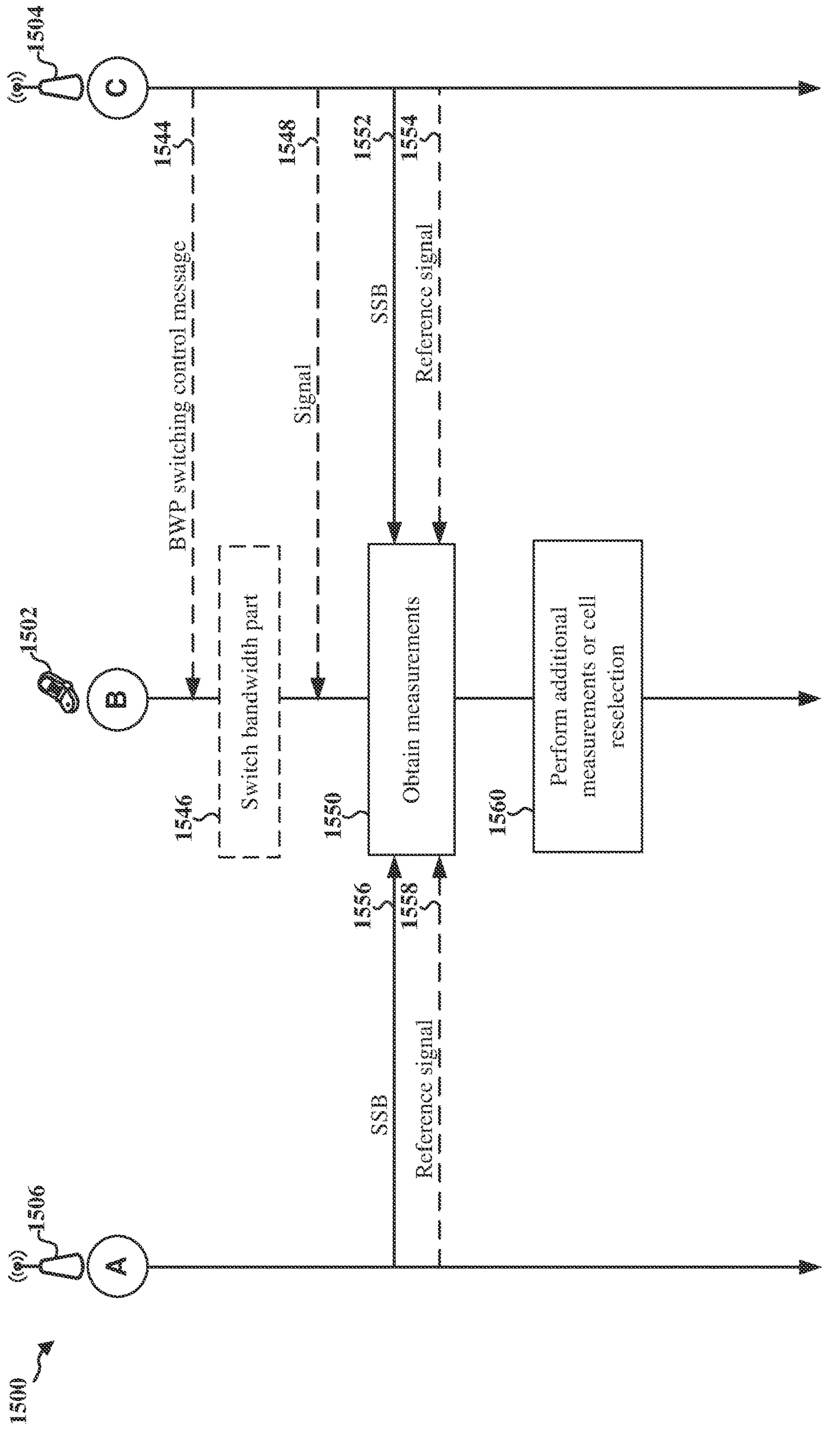

FIGS. 15A and 15B are a signal flow diagram 1500 in accordance with various aspects of the disclosure. FIGS. 15A and 15B include a UE 1502, a first base station 1504 (also referred to as a serving cell of the UE 1502), and a second base station 1506 (also referred to as a non-serving cell of the UE 1502). In some aspects, the UE 1502 may be a RedCap UE.

At 1508, the UE 1502 enters an RRC connected mode.

The UE 1502 transmits a message 1510 indicating a set of capabilities of the UE 1502 and UAI associated with at least one of a measurement relaxation, a cell reselection operation, a small data transmission, or a small data reception of the UE in an inactive state or an idle state. For example, the set of capabilities may indicate that the UE is capable of small data transmission (SDT), performing relaxed measurements during SDT, or other suitable capability. As another example, the UAI may indicate the UE relaxation state for performing different types of measurements (e.g., radio resource management (RRM), radio link monitoring (RLM), bidirectional forwarding detection (BFD)) while SDT is ongoing, the availability of data and/or signaling mapped to radio bearers not configured for SDT, or other suitable UAI. In some examples, the UAI may further include reports (e.g., CSI reports or other suitable reports) associated with measurement of CD-SSBs and/or NCD-SSBs in the serving cell and non-serving cell.

The UE 1502 receives a configuration message 1512 (e.g., in response to the message 1510) for the measurement relaxation associated with the cell reselection operation. For example, the UE may receive an RRC message configuring the UE for measurement relaxation for cell reselection. The RRC message may indicate, for example, a number of SSBs (e.g., CD-SSBs and/or NCD-SSBs) associated with the serving cell and a non-serving cell (e.g., a neighbor or target cell for cell reselection) for the UE to measure. For example, the configured measurement relaxation can include a reduced duty cycle for measurements of serving/neighbor cells or a fewer number of neighbor cells to measure.

At 1514, the UE 1502 enters an RRC inactive mode.

At 1516, the UE 1502 obtains one or more measurements of the serving cell (e.g., the first base station 1504) and/or the non-serving cell (e.g., the second base station 1506) of the UE 1502 in the initial DL BWP configured for the UE 1502 by the serving cell (e.g., the base station 1504). The initial DL BWP may support a small data transmission of the UE 1502 in an inactive mode or an idle mode. For example, the UE 1502 may obtain a measurement of an SSB 1518 or a DL reference signal 1520 (e.g., a tracking RS, a positioning RS, a CSI-RS, or a cross link interference reference signal (CLI-RS)) that is quasi-colocated with the SSB 1518 from the serving cell in the initial DL BWP, and/or may obtain a measurement of an SSB 1522 or a DL reference signal 1524 (e.g., a tracking RS, a positioning RS, a CSI-RS, a CLI-RS) that is quasi-colocated with the SSB 1522 from the non-serving cell in the initial DL BWP. For example, each of the SSBs 1518, 1522 may be an NCD-SSB.

The UE 1502 may optionally receive a first control message 1526 requesting the UE 1502 to modify resources configured for a small data transmission or a small data reception in the serving cell; pre-empt, cancel or terminate the small data reception in the serving cell; cancel or terminate the small data transmission in the serving cell; or release the resources configured for the small data transmission or the small data reception in the serving cell. In some examples, the first control message 1514 may include an RRC message, a MAC-CE or DCI. In some examples, the first control message 1514 may be sent in response to a CSI report of the serving cell provided by the UE (e.g., based on measurements of the NCD-SSB 1518 or DL reference signal 1520 of the serving cell).

The UE 1502 may further optionally receive a second control message 1528 in an initial DL BWP associated with configuration (e.g., an RRC), activation (e.g., via a MAC-CE) or ordering (e.g., via the PDCCH, such as DCI) of a reference signal transmission of the UE. The control message may indicate, for example, the particular beam(s) on which to transmit an UL-RS, such as an SRS. For example, the UE 1502 may receive the second control message 1528 in response to the link quality evaluation performed by the base station 1504 (e.g., based on a CSI report or on UL small data transmissions). In an example, the UE 1502 may receive the second control message if, for example, a measurement (e.g., an RSRP) of the NCD-SSB 1518 is below one or more thresholds. In some examples, the second control message 1528 may include an RRC configuration for an SRS configuration. In some examples, the second control message 1528 may include the PDCCH (e.g., DCI) that orders an SRS transmission at the UE 1502. In some examples, the second control message 1528 may include a MAC-CE that activates a previously RRC-configured SRS transmission at the UE 1502.

The UE 1502 may transmit a reference signal 1530 (e.g., SRS) in the initial UL BWP of the UE 1502 in response to the second control message 1518. In some examples, the UE 1502 transmits the SRS 1530 in the initial UL BWP of the UE 1502 configured for a small data transmission (e.g., the initial UL BWP 820 in FIG. 8 or the initial UL BWP 920 in FIG. 9).

The UE 1502 may further optionally receive a CSI report request control message 1532 in the initial DL BWP that requests and/or activates a CSI report transmission based on the measurements obtained at 1516. In some examples, the CSI report request control message 1532 may include the PDCCH (e.g., DCI) that requests a CSI report from the UE 1502. In some examples, the CSI report request control message 1532 may include a MAC-CE that activates a CSI report transmission at the UE 1502. The UE 1502 may transmit a CSI report 1534 based on measurements performed at 1516 of the SSB 1518 and/or DL reference signal 1520 received in the initial DL BWP in response to the CSI report request control message 1532. In some examples, the CSI report can be transmitted in the UAI, multiplexed with UL data, or separately scheduled via the DCI.

At 1542, the UE 1502 may determine that an event trigger has occurred. In some examples, the UE 1502 determines that the event trigger has occurred when a first metric associated with the measurement of the SSB 1518 or the DL reference signal 1520 is less than at least one set of thresholds configured for the serving cell (e.g., the first base station 1504), or when a second metric associated with the measurement of the SSB 1522 or the DL reference signal 1524 is less than at least one set of thresholds configured for the non-serving cell (e.g., the second base station 1506). The first metric and/or the second metric used for cell reselection can be a function of the raw measurement of the SSB (e.g., filtered, scaled, or offset by a heuristic value).

In some examples, the UE 1502 determines that the event trigger has occurred when a first metric associated with the measurement of the SSB 1518 or the DL reference signal 1520 is less than at least one set of thresholds configured for the serving cell (e.g., the first base station 1504), or when a second metric associated with the measurement of the SSB 1522 or the DL reference signal 1524 is less than at least one set of thresholds configured for the non-serving cell (e.g., the second base station 1506), and the UE 1502 has a valid timing advance (TA) and a valid configured grant physical uplink shared channel (CG-PUSCH) occasion for a configured grant small data transmission (CG-SDT).

The UE 1502 may receive a BWP switching control message 1544 in the initial DL BWP. In some examples, the BWP switching control message 1544 may command the UE 1502 to measure a CD-SSB or other DL reference signal of the serving cell (e.g., the first base station 1504), a CD-SSB or other DL reference signal (RS) of the non-serving cell (e.g., the second base station 1506), and/or any other measurements for the serving cell or non-serving cell. In some examples, the BWP switching control message 1544 may include a PDCCH (e.g., DCI) or a MAC-CE to command the UE 1502 to measure a CD-SSB or other DL reference signal of the serving cell (e.g., the first base station 1504), a CD-SSB or other DL reference signal of the non-serving cell (e.g., the second base station 1506), and/or any other measurements for the serving cell or non-serving cell in one or more BWPs that is not the initial DL BWP of the UE 1502 (e.g., outside the bandwidth the active DL BWP of the UE 1502).

At 1546, the UE 1502 may switch to one or more BWPs that is not the initial DL BWP in response to the BWP switching control message 1544. The one or more BWPs includes at least a control resource set (also referred to as a CORESET) associated with system information or paging.

The UE 1502 may receive a signal 1548 in the one or more BWPs that is not the initial DL bandwidth. The signal 1548 may include system information, paging information, or may be a DL reference signal in the one or more BWPs.

At 1550, the UE 1502 obtains one or more measurements of the serving cell (e.g., the first base station 1504) and/or the non-serving cell (e.g., the second base station 1506) of the UE 1502. In some examples, the UE 1502 obtains a measurement of an SSB 1552 or a DL reference signal that is quasi-colocated with the SSB 1552, or a measurement of an SSB 1556 or a DL reference signal 1558 that is quasi-colocated with the SSB 1556 in one or more BWPs that is not an initial DL BWP configured by a serving cell (e.g., the first base station 1504) of the UE 1502 in response to an event trigger (e.g., if the event trigger has occurred at 1542) or a message (e.g. the BWP switching control message 1544) received at the UE 1502. For example, each of the SSBs 1552, 1556 may be a CD-SSB.

At 1554, the UE performs additional measurements or a cell reselection operation based the measurement of an SSB 1552 (e.g., a CD-SSB) or the DL reference signal 1554 from the serving cell or a measurement of the SSB 1556 (e.g., a CD-SSB) or the DL reference signal 1558 from the non-serving cell. In some examples, the additional measurements may be measurements of different beams of non-serving cells (e.g., neighbor cells) of the UE and the serving cell of the UE. In some cases, these additional measurements may be made for cell reselection, positioning, validation of CGPUSCH occasion, and other suitable purposes.

Figure 16:
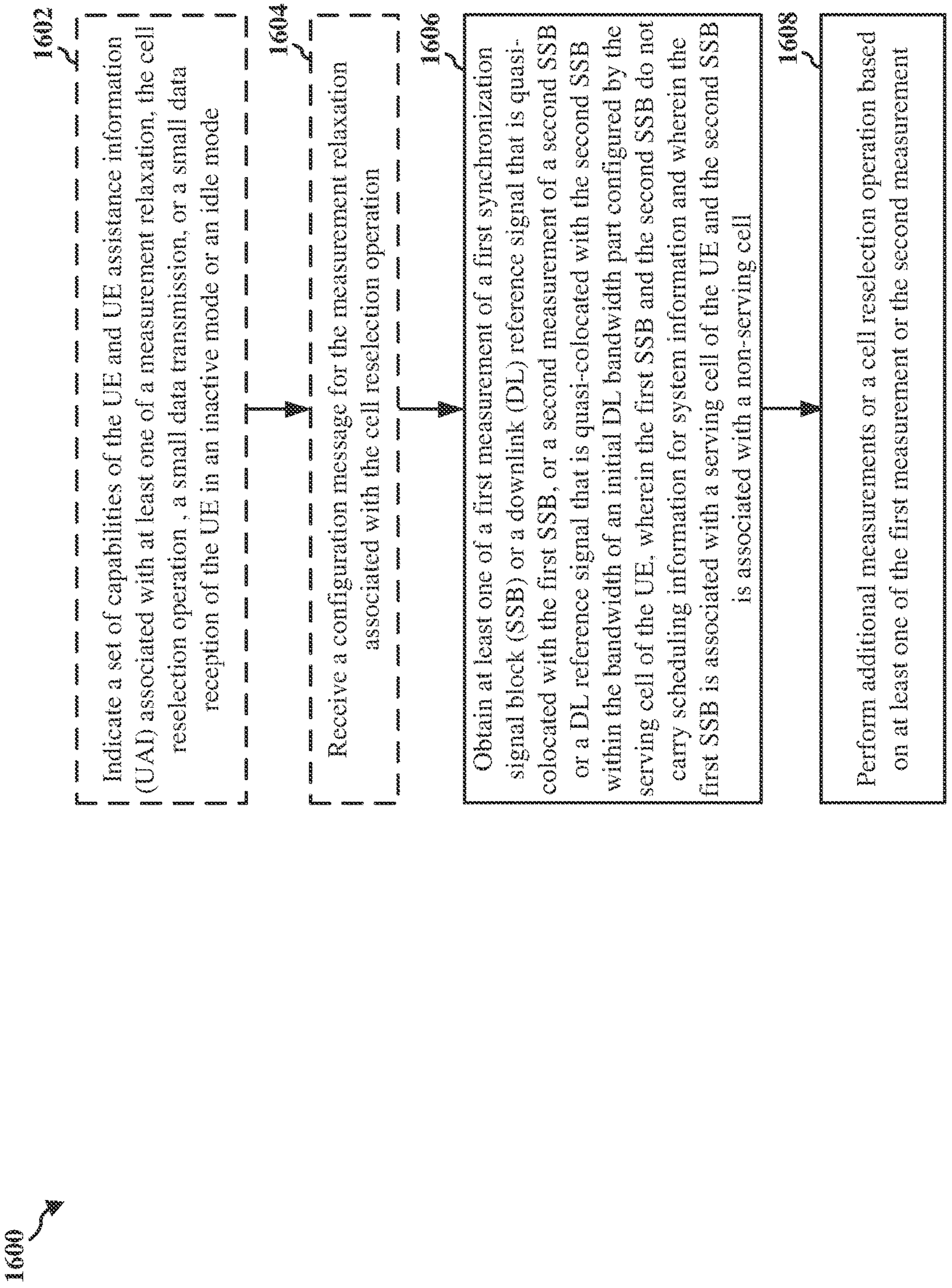
FIG. 16 is a flowchart of a method of wireless communication.

FIG. 16 is a flowchart 1600 of a method of wireless communication. The method may be performed by a UE (e.g., the UE 104, 1002, 1102, 1202, 1302, 1502; the apparatus 1802/1802'; the processing system 1914, which may include the memory 360 and which may be the entire UE 104, 1002, 1102, 1202, 1302, 1502 or a component of the UE 104, 1002, 1102, 1202, 1302, 1502, such as the TX processor 368, the RX processor 356, and/or the controller/processor 359).

At 1602, the UE indicates a set of capabilities of the apparatus and user equipment (UE) assistance information (UAI) associated with at least one of a measurement relaxation, the cell reselection operation, a small data transmission, or a small data reception of the apparatus in an inactive mode or an idle mode. For example, the set of capabilities may indicate that the UE is capable of small data transmission (SDT), performing relaxed measurements during SDT, or other suitable capability. As another example, the UAI may indicate the UE relaxation state for performing different types of measurements (e.g., radio resource management (RRM), radio link monitoring (RLM), bidirectional forwarding detection (BFD)) while SDT is ongoing, the availability of data and/or signaling mapped to radio bearers not configured for SDT, or other suitable UAI. In some examples, the UAI may further include reports (e.g., CSI reports or other suitable reports) associated with measurement of CD-SSBs and/or NCD-SSBs in the serving cell and non-serving cell.

At 1604, the UE receives a configuration message for the measurement relaxation associated with the cell reselection operation. For example, the UE may receive an RRC message configuring the UE for measurement relaxation for cell reselection. The RRC message may indicate, for example, a number of SSBs (e.g., CD-SSBs and/or NCD-SSBs) associated with the serving cell and a non-serving cell (e.g., a neighbor or target cell for cell reselection) for the UE to measure. For example, the configured measurement relaxation can include a reduced duty cycle for measurements of serving/neighbor cells or a fewer number of neighbor cells to measure.

At 1606, the UE obtains at least one of a first measurement of a first synchronization signal block (SSB) or a downlink (DL) reference signal that is quasi-colocated with the first SSB, or a second measurement of a second SSB or a DL reference signal that is quasi-colocated with the second SSB within the bandwidth of an initial DL BWP configured by the serving cell of the UE, wherein the first SSB and the second SSB do not carry scheduling information for system information and wherein the first SSB is associated with a serving cell of the UE and the second SSB is associated with a non-serving cell. For example, the UE may obtain a first measurement of a first NCD-SSB/DL-RS (e.g., a tracking RS, a positioning RS, a CSI-RS, a cross link interference reference signal (CLI-RS), or other suitable reference signal) in the serving cell and/or obtain a second measurement of a second NCD-SSB/DL-RS (e.g., CSI-RS or other suitable reference signal) in the non-serving cell. The first NCD-SSB/DL-RS and the second NCD-SSB/DL-RS may each be within an initial DL BWP configured by the serving cell.

At 1608, the UE performs additional measurements or a cell reselection operation (e.g., handover to the non-serving cell, which may be considered a neighbor or target cell) based on at least one of the first measurement or the second measurement. In some examples, the additional measurements may be measurements of different beams of non-serving cells (e.g., neighbor cells) of the UE and the serving cell of the UE. In some cases, these additional measurements may be made for cell reselection, positioning, validation of CGPUSCH occasion, and/or other suitable purposes.

Figure 17A:
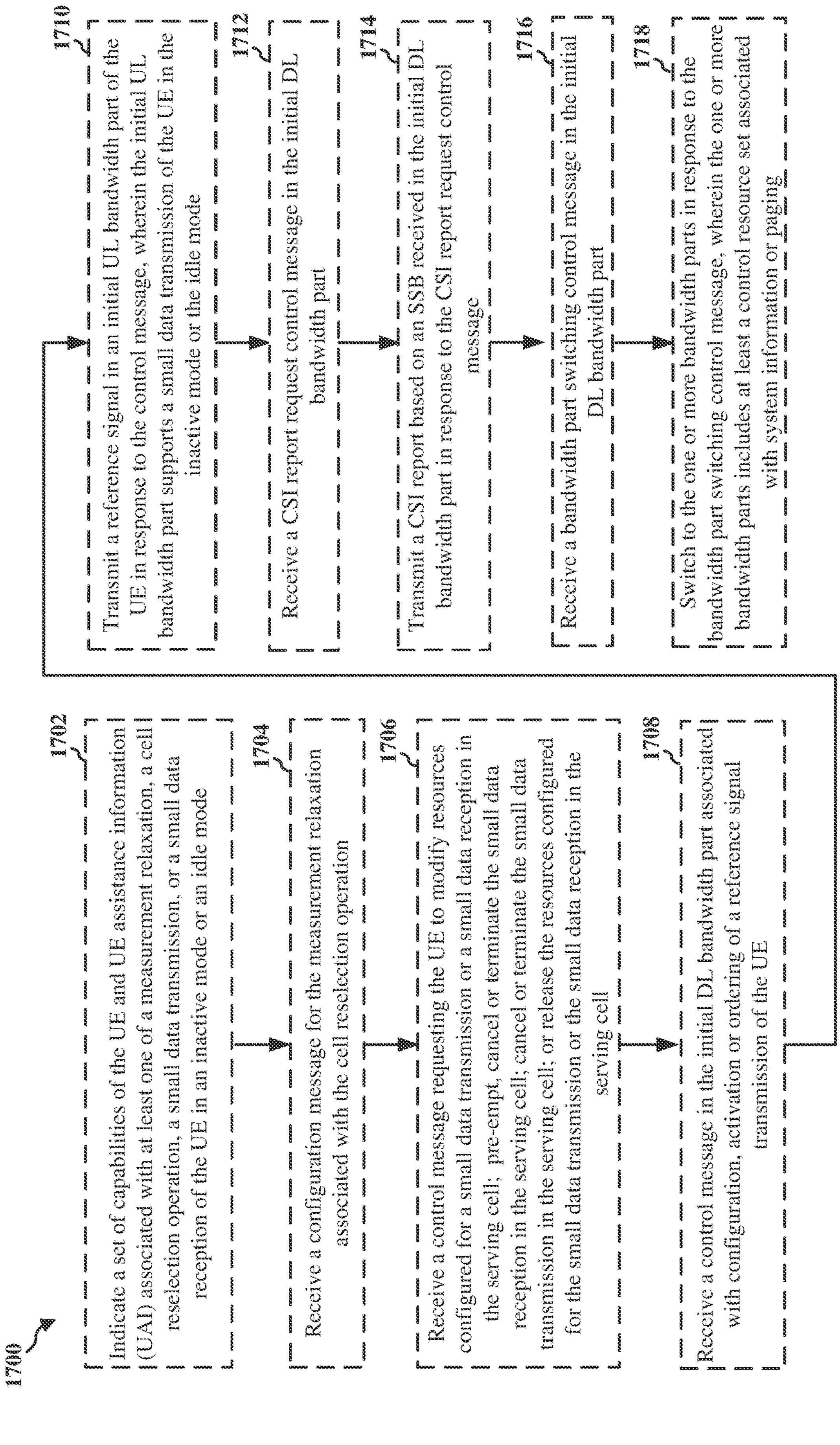
FIGS. 17A and 17B are a flowchart of a method of wireless communication.
Figure 17B:
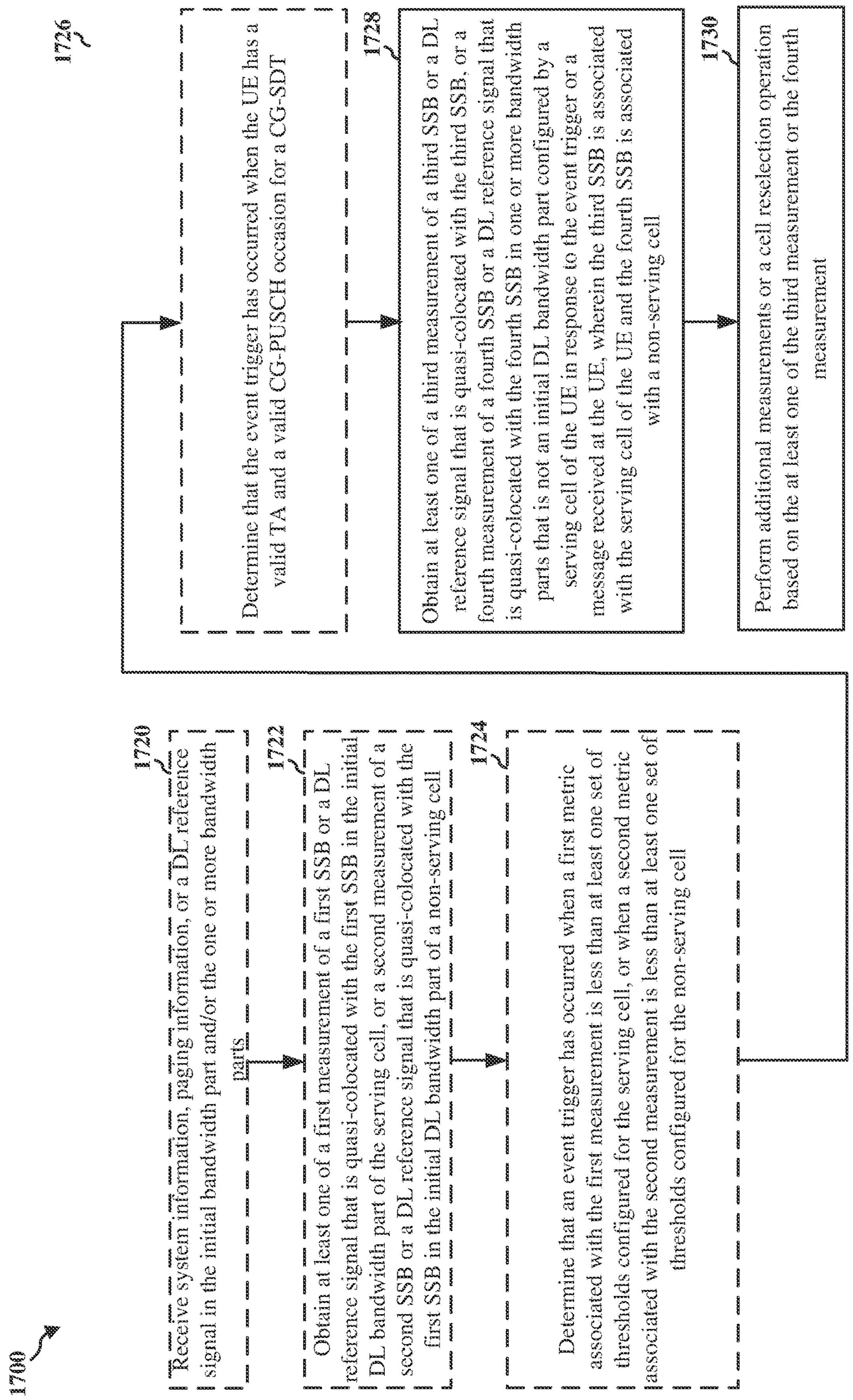

FIGS. 17A and 17B are a flowchart 1700 of a method of wireless communication. The method may be performed by a UE (e.g., the UE 104, 1002, 1102, 1202, 1302, 1502; the apparatus 1802/1802'; the processing system 1914, which may include the memory 360 and which may be the entire UE 104, 1002, 1102, 1202, 1302, 1502 or a component of the UE 104, 1002, 1102, 1202, 1302, 1502, such as the TX processor 368, the RX processor 356, and/or the controller/processor 359).

At 1702, the UE indicates a set of capabilities of the UE and UE assistance information (UAI) associated with at least one of a measurement relaxation, the cell reselection operation, a small data transmission, or a small data reception of the UE in an inactive state or an idle state. For example, the set of capabilities may indicate that the UE is capable of small data transmission (SDT), performing relaxed measurements during SDT, or other suitable capability. As another example, the UAI may indicate the UE relaxation state for performing different types of measurements (e.g., radio resource management (RRM), radio link monitoring (RLM), bidirectional forwarding detection (BFD)) while SDT is ongoing, the availability of data and/or signaling mapped to radio bearers not configured for SDT, or other suitable UAI. In some examples, the UAI may further include reports (e.g., CSI reports or other suitable reports) associated with measurement of CD-SSBs and/or NCD-SSBs in the serving cell and non-serving cell.

At 1704, the UE receives a configuration message for the measurement relaxation associated with the cell reselection operation. For example, the UE may receive an RRC message configuring the UE for measurement relaxation for cell reselection. The RRC message may indicate, for example, a number of SSBs (e.g., CD-SSBs and/or NCD-SSBs) associated with the serving cell and a non-serving cell (e.g., a neighbor or target cell for cell reselection) for the UE to measure. For example, the configured measurement relaxation can include a reduced duty cycle for measurements of serving/neighbor cells or a fewer number of neighbor cells to measure.

At 1706, the UE receives a control message requesting the UE to modify resources configured for a small data transmission or a small data reception in the serving cell; preempt, cancel or terminate the small data reception in the serving cell; cancel or terminate the small data transmission in the serving cell; or release the resources configured for the small data transmission or the small data reception in the serving cell. In some examples, the first control message may include an RRC message, a MAC-CE or DCI. In some examples, the control message may be sent in response to a CSI report of the serving cell provided by the UE (e.g., based on measurements of the NCD-SSB or DL reference signal of the serving cell).

At 1708, the UE receives a control message in the initial DL bandwidth part associated with associated with configuration (e.g., an RRC), activation (e.g., via a MAC-CE) or ordering (e.g., via the PDCCH, such as DCI) of a reference signal transmission of the UE. The control message may indicate, for example, the particular beam(s) on which to transmit an UL-RS, such as an SRS. For example, the UE may receive the control message in response to a link quality evaluation performed by the base station (e.g., based on a CSI report or on UL small data transmissions). In an example, the UE may receive the second control message if, for example, a measurement (e.g., an RSRP) of the NCD-SSB of the serving cell is below one or more thresholds. In some examples, the control message may include an RRC configuration for an SRS configuration. In some examples, the control message may include the PDCCH (e.g., DCI) that orders an SRS transmission at the UE. In some examples, the control message may include a MAC-CE that activates a previously RRC-configured SRS transmission at the UE.

At 1710, the UE transmits a reference signal in an initial uplink (UL) bandwidth part of the UE in response to the control message, wherein the initial UL bandwidth part enables a small data transmission of the UE in inactive or idle state. The reference signal may be, for example, an SRS.

At 1712, the UE receives a channel state information (CSI) report request control message in the initial DL bandwidth part. The CSI report request control message requests and/or activates a CSI report transmission based on the measurements of the NCD-SSB of the serving cell. In some examples, the CSI report request control message may include the PDCCH (e.g., DCI) that requests a CSI report from the UE2. In some examples, the CSI report request control message may include a MAC-CE that activates a CSI report transmission at the UE.

At 1714, the UE transmits a CSI report based on an SSB (e.g., NCD-SSB) received in the initial DL bandwidth part in response to the CSI report request control message.

For example, the UE may obtain a measurement of an NCD-SSB and generate the CSI report based on the NCD-SSB measurement. In some examples, the CSI report can be transmitted in the UAI, multiplexed with UL data, or separately scheduled via the DCI.

At 1716, the UE receives a bandwidth part switching control message in the initial DL bandwidth part. The bandwidth part switching control message may indicate to the UE to switch from the initial DL bandwidth part to one or more bandwidth parts (e.g., different than the initial DL bandwidth part). In some examples, the BWP switching control message may command the UE to measure a CD-SSB or other DL reference signal of the serving cell, a CD-SSB or other DL reference signal (RS) of the non-serving cell, and/or any other measurements for the serving cell or non-serving cell. In some examples, the BWP switching control message may include a PDCCH (e.g., DCI) or a MAC-CE to command the UE to measure a CD-SSB or other DL reference signal of the serving cell, a CD-SSB or other DL reference signal of the non-serving cell, and/or any other measurements for the serving cell or non-serving cell in one or more BWPs that is not the initial DL BWP of the UE (e.g., outside the bandwidth the active DL BWP of the UE).

At 1718, the UE switches to the one or more bandwidth parts in response to the bandwidth part switching control message, wherein the one or more bandwidth parts includes at least a control resource set associated with system information or paging. In some aspects, the bandwidth part switching control message may include a PDCCH or MAC-CE that orders or commands the UE to obtain an intra-frequency measurement or an inter-frequency measurement outside the bandwidth of the initial DL BWP (e.g., outside of the active DL BWP of the UE). In examples in which the initial DL BWP of the serving cell overlaps with the initial DL BWP of the non-serving (e.g., neighbor cell), for intra-frequency measurements, no BWP switching is needed. In some examples, the UE may measure a CD-SSB or other DL reference signal of the serving cell, a CD-SSB or other DL reference signal of a non-serving cell, and/or any other measurements for the serving cell or non-serving cell in response to the bandwidth part switching control message. The UE may use one or more of these measurements for cell reselection or for purposes other than cell reselection. In some examples, the UE may perform L1, L2, and/or L3 measurements of a CD-SSB or other DL reference signal of the serving cell, a CD-SSB or other DL reference signal of the non-serving cell, and/or any other measurements for the serving cell or the non-serving cell.

With reference to FIG. 17B, at 1720, the UE receives system information, paging information, or a DL reference signal in the initial bandwidth part and/or the one or more bandwidth parts. The system information and/or paging information may be received, for example, within a CD-SSB and/or SIB. The DL reference signal may be an NCD-SSB, CD-SSB, or other DL reference signal (e.g., CSI-RS).

At 1722, the UE obtains at least one of a first measurement of a first SSB or a downlink (DL) reference signal (RS) that is quasi-colocated with the first SSB in the initial DL bandwidth part of the serving cell, or a second measurement of a second SSB or a downlink (DL) reference signal (RS) that is quasi-colocated with the second SSB in the initial DL bandwidth part of a non-serving cell.

At 1724, the UE determines that an event trigger has occurred when a first metric associated with the first measurement of the first SSB or the downlink (DL) reference signal (RS) (e.g., tracking RS, positioning RS, CSI-RS, CLI-RS) that is quasi-colocated with the first SSB is less than at least one set of thresholds configured for the serving cell, or when a second metric associated with the second measurement of the second SSB or the downlink (DL) reference signal (RS) (e.g., tracking RS, positioning RS, CSI-RS, CLI-RS) that is quasi-colocated with the second SSB is less than at least one set of thresholds configured for the non-serving cell.

At 1726, the UE determines that the event trigger has occurred when the UE has a valid timing advance (TA) and a valid configured grant physical uplink shared channel (CG-PUSCH) occasion for a configured grant small data transmission (CG-SDT).

At 1728, the UE obtains at least one of a third measurement of a third SSB or a DL reference signal that is quasi-colocated with the third SSB, or a fourth measurement of a fourth SSB or a DL reference signal that is quasi-colocated with the fourth SSB in one or more bandwidth parts that is not an initial DL bandwidth part configured by a serving cell of the UE in response to the event trigger or a message received at the UE, wherein the third SSB is associated with the serving cell of the UE and the fourth SSB is associated with a non-serving cell. For example, the message may be a bandwidth part switching control message.

At 1730, the UE performs additional measurements or a cell reselection operation based on the at least one of the third measurement or the fourth measurement.

Figure 18:
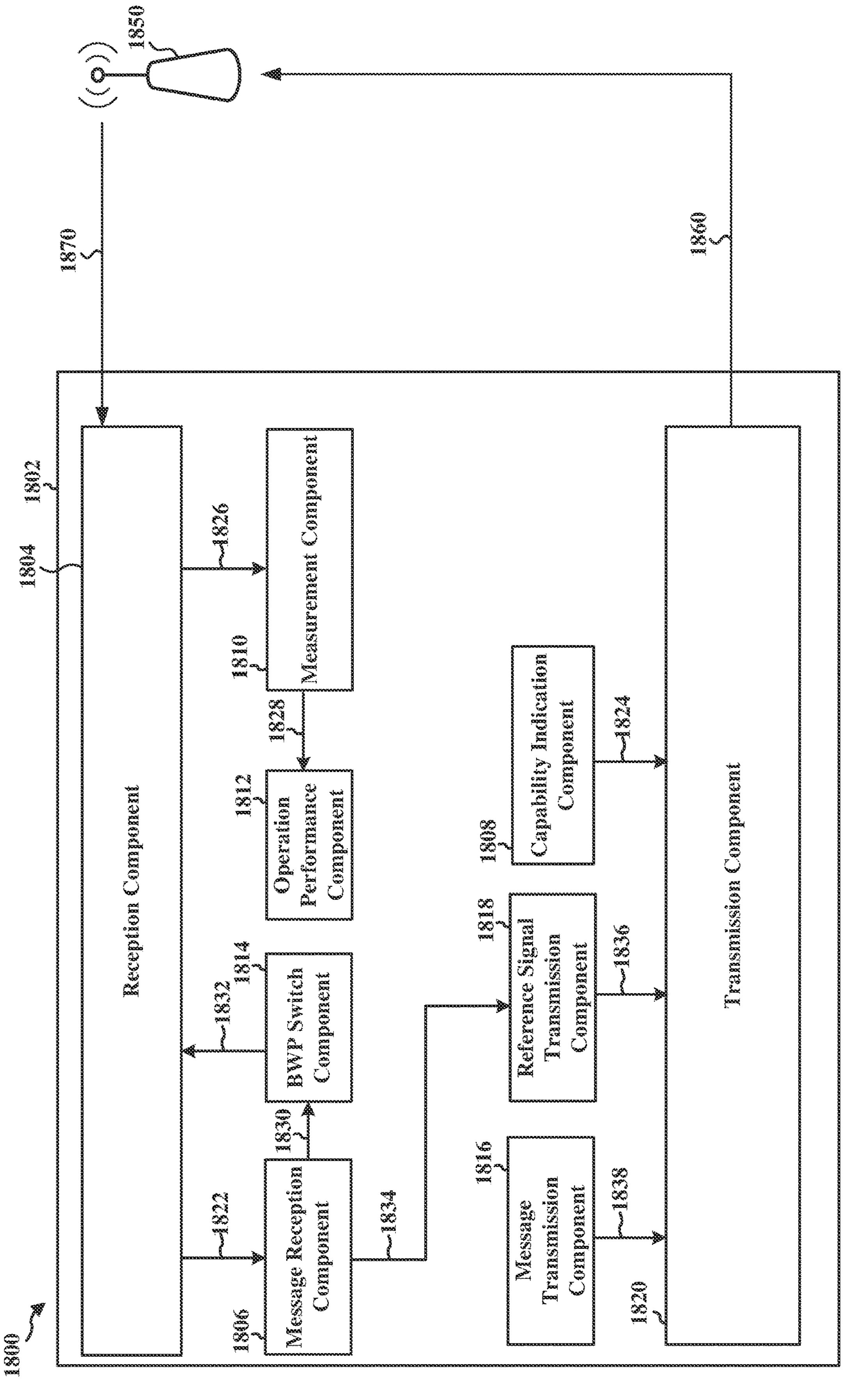
FIG. 18 is a conceptual data flow diagram illustrating the data flow between different means/components in an example apparatus.

FIG. 18 is a conceptual data flow diagram 1800 illustrating the data flow between different means/components in an example apparatus 1802. The apparatus may be a UE.

The apparatus includes a reception component 1804 that receives signals 1870 from the base station 1850 (e.g., a serving cell) on the DL. The signals 1870 may include one or more of the signals 1822, 1826.

The apparatus includes a message reception component 1806 that receives (e.g., via a signal 1822) a configuration message for the measurement relaxation associated with the cell reselection operation, receives a bandwidth part switching control message in the initial DL bandwidth part, receives a control message in the initial DL bandwidth part associated with configuration, activation or ordering of a reference signal transmission of the apparatus, receives a channel state information (CSI) report request control message in the initial DL bandwidth part, and receives a control message requesting the apparatus to modify resources configured for a small data transmission or a small data reception in the serving cell; pre-empt, cancel or terminate the small data reception in the serving cell; cancel or terminate the small data transmission in the serving cell; or release the resources configured for the small data transmission or the small data reception in the serving cell.

The apparatus includes a capability indication component 1808 that indicates a set of capabilities (e.g., via a signal 1824) of the apparatus and user equipment (UE) assistance information (UAI) associated with at least one of a measurement relaxation, a cell reselection operation, a small data transmission, or a small data reception of the apparatus in an inactive mode or an idle mode.

The apparatus includes a measurement component 1810 that obtains at least one of a first measurement of a first synchronization signal block (SSB) or a downlink (DL) reference signal that is quasi-colocated with the first SSB, or a second measurement of a second SSB or a DL reference signal that is quasi-colocated with the second SSB within a bandwidth of an initial DL bandwidth part configured by a serving cell of the apparatus, wherein the first SSB and the second SSB do not carry scheduling information for system information and wherein the first SSB is associated with a serving cell of the apparatus and the second SSB is associated with a non-serving cell, obtain at least one of a first measurement of a first synchronization signal block (SSB) or a downlink (DL) reference signal that is quasi-colocated with the first SSB, or a second measurement of a second SSB or a DL reference signal that is quasi-colocated with the second SSB in one or more bandwidth parts that is not an initial DL bandwidth part configured by a serving cell of the apparatus in response to an event trigger or a message received at the apparatus, wherein the first SSB is associated with the serving cell of the apparatus and the second SSB is associated with a non-serving cell, obtains at least one of a third measurement of a third SSB or a downlink (DL) reference signal that is quasi-colocated with the third SSB in the initial DL bandwidth part, or a fourth measurement of a fourth SSB or a DL reference signal that is quasi-colocated with the fourth SSB in the initial DL bandwidth part, wherein the third SSB is associated with the serving cell of the apparatus and the fourth SSB is associated with the non-serving cell, and performs additional measurements. The measurement component 1810 may receive signals (e.g., signal 1826) to be measured from the reception component 1804 after being received (e.g., from the base station 1850) via signals 1870.

The apparatus includes an operation performance component 1812 that performs a cell reselection operation based on at least one of the first measurement or the second measurement received via a signal 1828 from the measurement component 1810. The operation performance component 1812 determines that an event trigger has occurred.

The apparatus includes a BWP switch component 1814 that switches (e.g., via a control signal 1832 to the reception component 1804) to the one or more bandwidth parts in response to the bandwidth part switching control message (e.g., received via a signal 1830), wherein the one or more bandwidth parts includes at least a control resource set associated with system information or paging.

The apparatus includes a message transmission component 1816 that transmits a CSI report (e.g., via a signal 1838) based on a third SSB received in the initial DL bandwidth part in response to the CSI report request control message.

The apparatus includes a reference signal transmission component 1818 that transmits a reference signal (e.g., via a signal 1836) in an initial uplink (UL) bandwidth part of the apparatus in response to the control message (e.g., received via a signal 1834 from the message reception component 1806), wherein the initial UL bandwidth part supports a small data transmission of the apparatus in an inactive mode or an idle mode.

The apparatus includes a transmission component 1820 that transmits signals 1860 to the base station 1850 on the UL. The signals 1860 may include one or more of the signals 1824, 1836, 1838.

The apparatus may include additional components that perform each of the blocks of the algorithm in the aforementioned flowcharts of FIGS. 16, 17A, 17B. As such, each block in the aforementioned flowcharts of FIGS. 16, 17A, 17B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
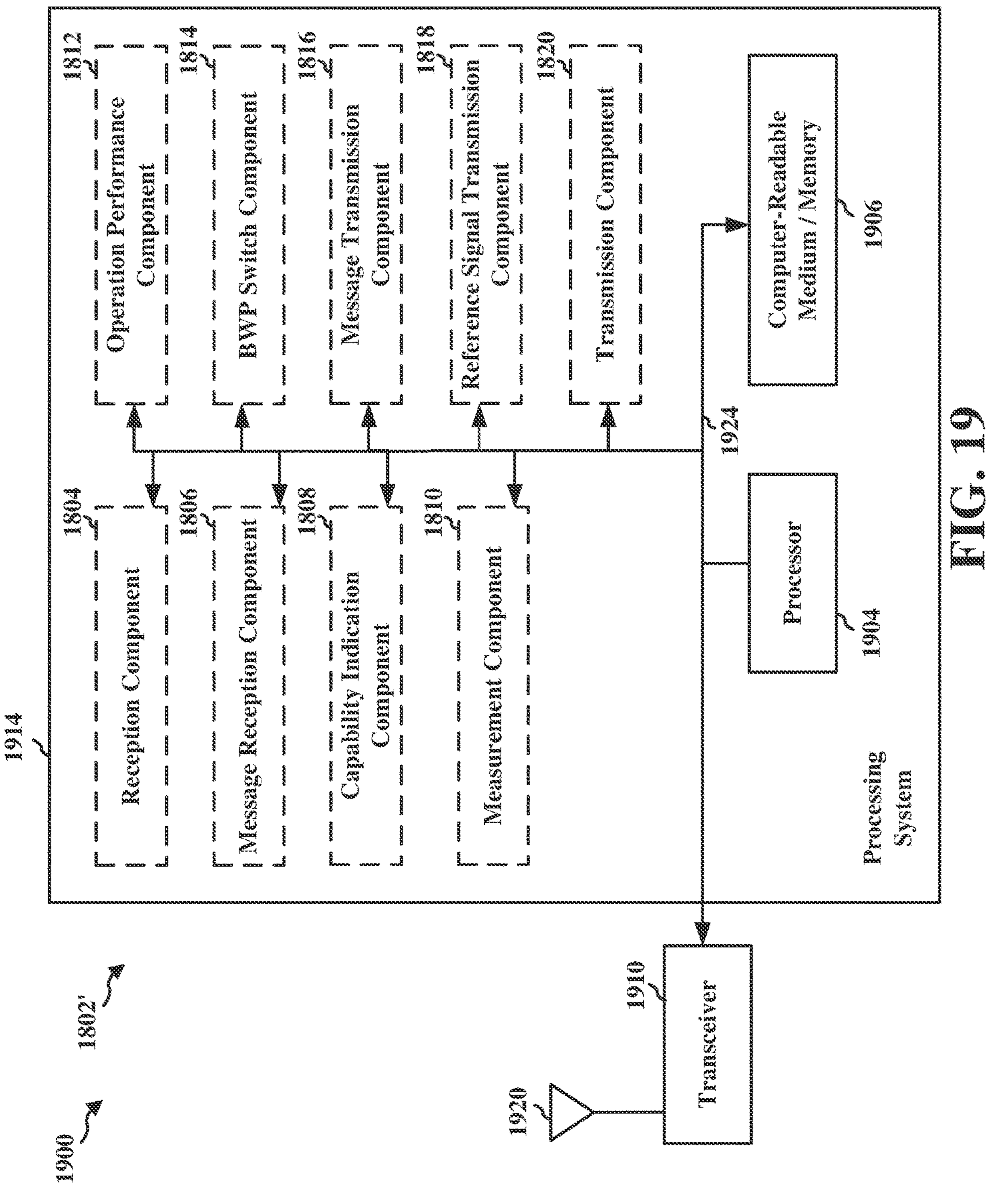
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, 1810, 1812, 1814, 1816, 1818, 1820 and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1820, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1806, 1808, 1810, 1812, 1814, 1816, 1818, 1820. The components may be software components running in the processor 1904, resident/stored in the computer readable medium/memory 1906, one or more hardware components coupled to the processor 1904, or some combination thereof. The processing system 1914 may be a component of the UE 350 and may include the memory 360 and/or at least one of the TX processor 368, the RX processor 356, and the controller/processor 359. Alternatively, the processing system 1914 may be the entire UE (e.g., sec 350 of FIG. 3).

In one configuration, the apparatus 1802/1802' for wireless communication includes means for performing each of the operations described with reference to FIGS. 16, 17A, 17B. The aforementioned means may be one or more of the aforementioned components of the apparatus 1802 and/or the processing system 1914 of the apparatus 1802' configured to perform the functions recited by the aforementioned means. As described supra, the processing system 1914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 20:
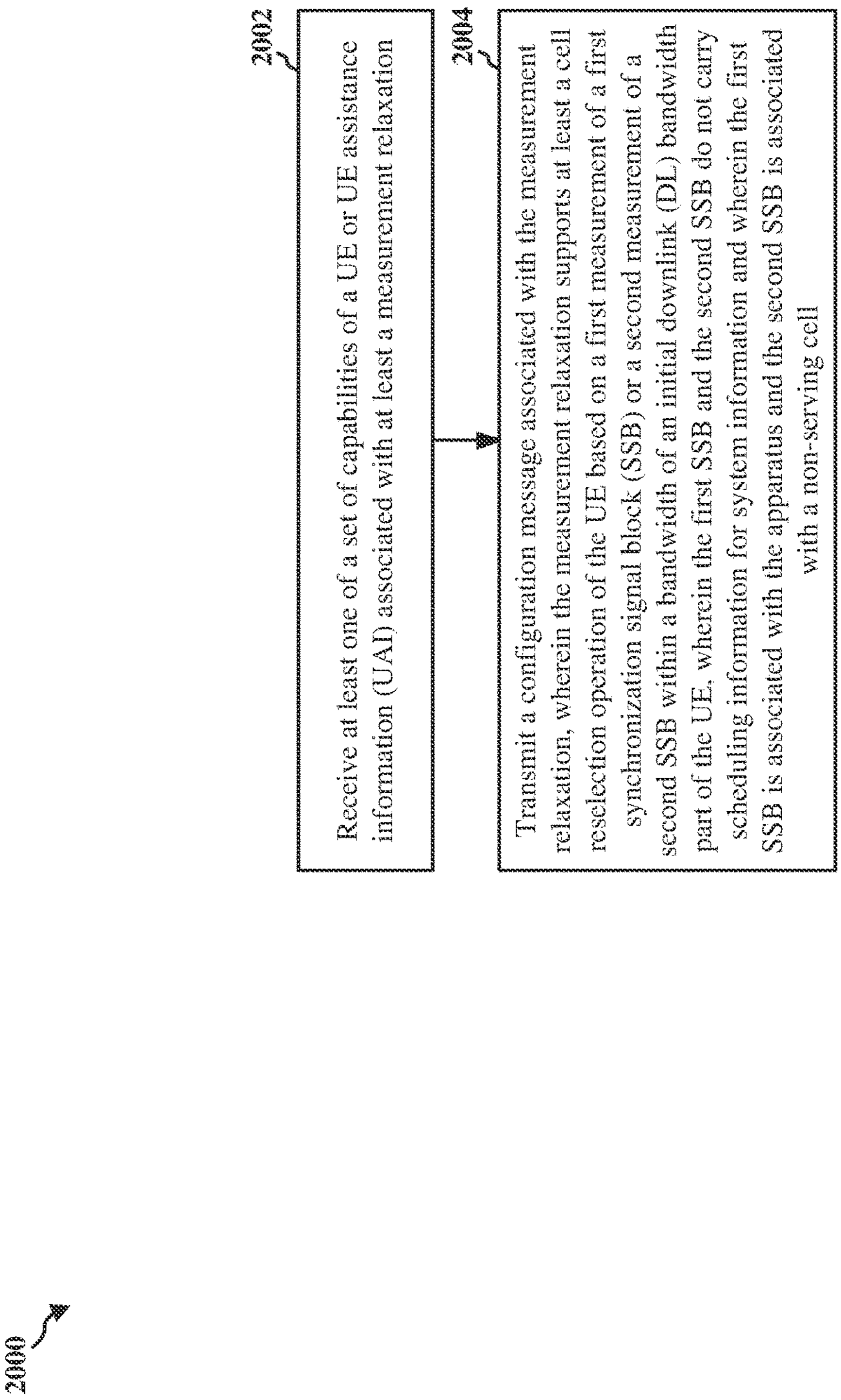
FIG. 20 is a flowchart of a method of wireless communication.

FIG. 20 is a flowchart 2000 of a method of wireless communication. The method may be performed by a base station (e.g., the base station 102, 1004, 1104, 1204, 1304, 1504; the apparatus 2202/2202'; the processing system 2314, which may include the memory 376 and which may be the entire base station 102, 1004, 1104, 1204, 1304, 1504 or a component of the base station 102, 1004, 1104, 1204, 1304, 1504, such as the TX processor 316, the RX processor 370, and/or the controller/processor 375).

At 2002, the base station receives at least one of a set of capabilities of a UE or UE assistance information (UAI) associated with at least a measurement relaxation. For example, the set of capabilities may indicate that the UE is capable of small data transmission (SDT), performing relaxed measurements during SDT, or other suitable capability. As another example, the UAI may indicate the UE relaxation state for performing different types of measurements (e.g., radio resource management (RRM), radio link monitoring (RLM), bidirectional forwarding detection (BFD)) while SDT is ongoing, the availability of data and/or signaling mapped to radio bearers not configured for SDT, or other suitable UAI. In some examples, the UAI may further include reports (e.g., CSI reports or other suitable reports) associated with measurement of CD-SSBs and/or NCD-SSBs in the serving cell and non-serving cell.

At 2004, the base station transmits a configuration message associated with the measurement relaxation, wherein the measurement relaxation supports at least a cell reselection operation of the UE based on a first measurement of a first synchronization signal block (SSB) or a second measurement of a second SSB within a bandwidth of an initial downlink (DL) bandwidth part of the UE, wherein the first SSB and the second SSB do not carry scheduling information for system information and wherein the first SSB is associated with the apparatus and the second SSB is associated with a non-serving cell. For example, the SSBs may be NCD-SSBs and the non-serving cell may be a neighbor cell that is a target cell for the cell reselection operation. In some examples, the first and second measurements may be RSRP measurements.

In some examples, all or part of the RRC configuration may be included in an RRC release message. The RRC message may indicate, for example, a number of SSBs (e.g., CD-SSBs and/or NCD-SSBs) associated with the serving cell and a non-serving cell (e.g., a neighbor or target cell for cell reselection) for the UE to measure. For example, the configured measurement relaxation can include a reduced duty cycle for measurements of serving/neighbor cells or a fewer number of neighbor cells to measure.

Figure 21:
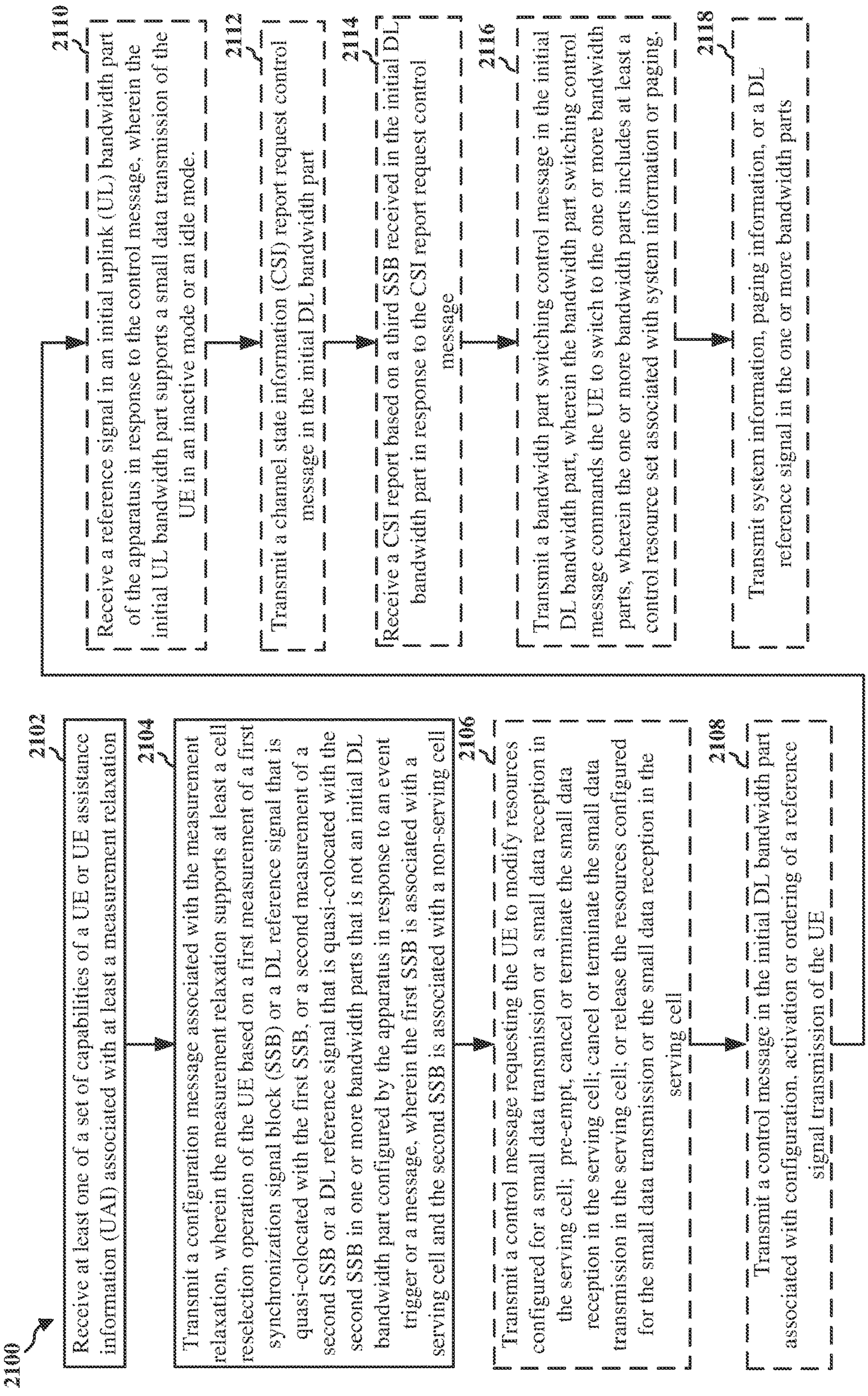
FIG. 21 is a flowchart of a method of wireless communication.

FIG. 21 is a flowchart 2100 of a method of wireless communication. The method may be performed by a base station (e.g., the base station 102, 1004, 1104, 1204, 1304, 1504; the apparatus 2202/2202'; the processing system 2314, which may include the memory 376 and which may be the entire base station 102, 1004, 1104, 1204, 1304, 1504 or a component of the base station 102, 1004, 1104, 1204, 1304, 1504, such as the TX processor 316, the RX processor 370, and/or the controller/processor 375).

At 2102, the base station receives at least one of a set of capabilities of a UE or UE assistance information (UAI) associated with at least a measurement relaxation. For example, the set of capabilities may indicate that the UE is capable of small data transmission (SDT), performing relaxed measurements during SDT, or other suitable capability. As another example, the UAI may indicate the UE relaxation state for performing different types of measurements (e.g., radio resource management (RRM), radio link monitoring (RLM), bidirectional forwarding detection (BFD)) while SDT is ongoing, the availability of data and/or signaling mapped to radio bearers not configured for SDT, or other suitable UAI. In some examples, the UAI may further include reports (e.g., CSI reports or other suitable reports) associated with measurement of CD-SSBs and/or NCD-SSBs in the serving cell and non-serving cell.

At 2104, the base station transmits a configuration message associated with the measurement relaxation, wherein the measurement relaxation supports at least a cell reselection operation of the UE based on a first measurement of a first SSB or a DL reference signal that is quasi-colocated with the first SSB, or a second measurement of a second SSB or a DL reference signal that is quasi-colocated with the second SSB in one or more bandwidth parts that is not an initial DL bandwidth part configured by the apparatus in response to an event trigger or a message, wherein the first SSB is associated with a serving cell and the second SSB is associated with a non-serving cell. For example, the SSBs may be NCD-SSBs and the non-serving cell may be a neighbor cell that is a target cell for the cell reselection operation. In some examples, the first and second measurements may be RSRP measurements.

In some examples, all or part of the RRC configuration may be included in an RRC release message. The RRC message may indicate, for example, a number of SSBs (e.g., CD-SSBs and/or NCD-SSBs) associated with the serving cell and a non-serving cell (e.g., a neighbor or target cell for cell reselection) for the UE to measure. For example, the configured measurement relaxation can include a reduced duty cycle for measurements of serving/neighbor cells or a fewer number of neighbor cells to measure.

At 2106, the base station transmits a control message requesting the UE to modify resources configured for a small data transmission or a small data reception in the serving cell; pre-empt, cancel or terminate the small data reception in the serving cell; cancel or terminate the small data transmission in the serving cell; or release the resources configured for the small data transmission or the small data reception in the serving cell. In some examples, the control message may include an RRC message, a MAC-CE or DCI. In some examples, the first control message 1514 may be sent in response to a CSI report of the serving cell provided by the UE (e.g., based on measurements of the NCD-SSB 1518 or DL reference signal 1520 of the serving cell).

At 2108, the base station transmits a control message in the initial DL bandwidth part associated with configuration, activation or ordering of a reference signal transmission of the UE. The control message may indicate, for example, the particular beam(s) on which to transmit an UL-RS, such as an SRS. For example, the base station may transmit the control message in response to a link quality evaluation performed by the base station (e.g., based on a CSI report or on UL small data transmissions). In an example, the base station may transmit the control message if, for example, a measurement (e.g., an RSRP) of an NCD-SSB of the serving cell is below one or more thresholds. In some examples, the control message may include an RRC configuration for an SRS configuration. In some examples, the control message may include a PDCCH (e.g., DCI) that orders an SRS transmission at the UE. In some examples, the control message may include a MAC-CE that activates a previously RRC-configured SRS transmission at the UE.

At 2110, the base station receives a reference signal in an initial uplink (UL) bandwidth part of the apparatus in response to the control message, wherein the initial UL bandwidth part supports a small data transmission of the UE in an inactive mode or an idle mode. The reference signal may be, for example, an SRS.

At 2112, the base station transmits a channel state information (CSI) report request control message in the initial DL bandwidth part. In some examples, the message may include a PDCCH (e.g., DCI) that requests a CSI report from the UE. In some examples, the message may include a MAC-CE that activates a CSI report transmission at the UE.

At 2114, the base station receives a CSI report based on a third SSB received in the initial DL bandwidth part in response to the CSI report request control message. For example, the CSI report may be an L1 or L3 report including one or more measurements (e.g., SS-RSRPs) obtained by the UE of the third SSB (e.g., an NCD-SSB of the serving cell). In some examples, the measurements included in an L3 measurement report may be collected by L1, but filtered and reported by L3 to remove the effect of fast fading and ignore short-term variations. In some examples, the CSI report can be transmitted in the UAI, multiplexed with UL data, or separately scheduled via the DCI.

At 2116, the base station transmits a bandwidth part switching control message in the initial DL bandwidth part, wherein the bandwidth part switching control message commands the UE to switch to the one or more bandwidth parts, wherein the one or more bandwidth parts includes at least a control resource set associated with system information or paging. In some examples, the BWP switching control message may command the UE to measure a CD-SSB or other DL reference signal of the serving cell, a CD-SSB or other DL reference signal (RS) of the non-serving cell, and/or any other measurements for the serving cell or non-serving cell. In some examples, the BWP switching control message may include a PDCCH (e.g., DCI) or a MAC-CE to command the UE to measure a CD-SSB or other DL reference signal of the serving cell, a CD-SSB or other DL reference signal of the non-serving cell, and/or any other measurements for the serving cell or non-serving cell in one or more BWPs that is not the initial DL BWP of the UE (e.g., outside the bandwidth the active DL BWP of the UE).

At 2118, the base station transmits system information, paging information, or a DL reference signal in the one or more bandwidth parts. The system information and/or paging information may be transmitted, for example, within a CD-SSB and/or SIB. The DL reference signal may be a CD-SSB or other DL reference signal (e.g., CSI-RS).

Figure 22:
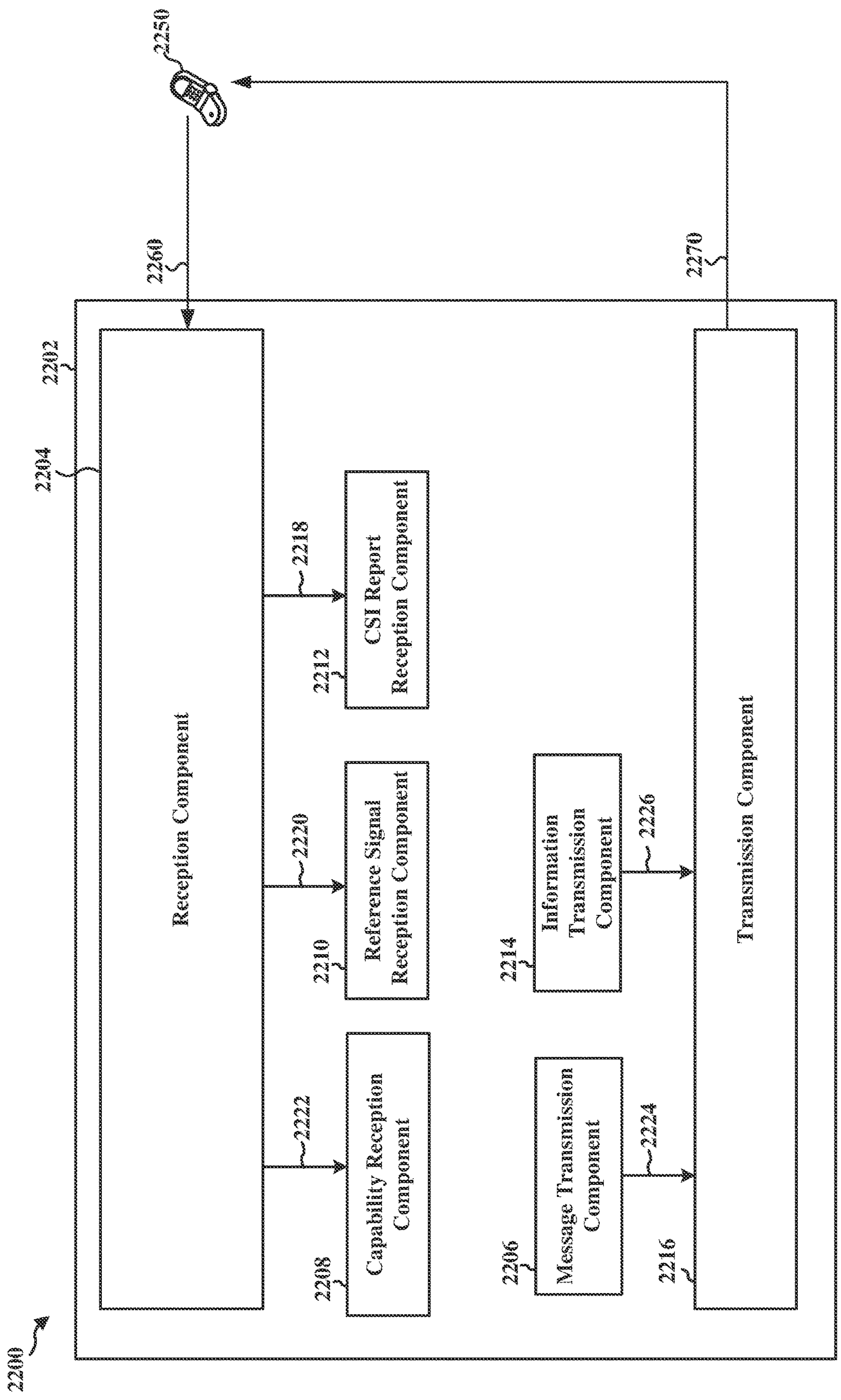
FIG. 22 is a conceptual data flow diagram illustrating the data flow between different means/components in an example apparatus.

FIG. 22 is a conceptual data flow diagram 2200 illustrating the data flow between different means/components in an example apparatus 2202. The apparatus may be a base station.

The apparatus includes a reception component 2204 that receives signals 2260 on the UL from a UE 2250.

The apparatus includes a message transmission component 2206 that transmits a configuration message (e.g., via a signal 2224) associated with the measurement relaxation, wherein the measurement relaxation supports at least a cell reselection operation of the UE based on a first measurement of a first SSB or a DL reference signal that is quasi-colocated with the first SSB, or a second measurement of a second SSB or a DL reference signal that is quasi-colocated with the second SSB in one or more bandwidth parts that is not an initial DL bandwidth part configured by the apparatus in response to an event trigger or a message, wherein the first SSB is associated with a serving cell and the second SSB is associated with a non-serving cell. The message transmission component 2206 further transmits a control message (e.g., via a signal 2224) requesting the UE to modify resources configured for a small data transmission or a small data reception in the serving cell; pre-empt, cancel or terminate the small data reception in the serving cell; cancel or terminate the small data transmission in the serving cell; or release the resources configured for the small data transmission or the small data reception in the serving cell. The message transmission component 2206 further transmits a control message (e.g., via a signal 2224) in the initial DL bandwidth part associated with configuration, activation or ordering of a reference signal transmission of the UE. The message transmission component 2206 further transmits a channel state information (CSI) report request control message (e.g., via a signal 2224) in the initial DL bandwidth part. The message transmission component 2206 further transmits a bandwidth part switching control message (e.g., via a signal 2224) in the initial DL bandwidth part, wherein the bandwidth part switching control message commands the UE to switch to the one or more bandwidth parts, wherein the one or more bandwidth parts includes at least a control resource set associated with system information or paging.

The apparatus includes a capability reception component 2208 that receives (e.g., via a signal 2222) at least one of a set of capabilities of a UE or UE assistance information (UAI) associated with at least a measurement relaxation.

The apparatus includes a reference signal reception component 2210 that receives a reference signal (e.g., via a signal 2220) in an initial uplink (UL) bandwidth part of the apparatus in response to the control message, wherein the initial UL bandwidth part supports a small data transmission of the UE in an inactive mode or an idle mode.

The apparatus includes a CSI report reception component 2212 that receives a CSI report (e.g., via a signal 2218) based on a third SSB received in the initial DL bandwidth part in response to the CSI report request control message.

The apparatus includes an information transmission component 2214 transmits (e.g., via a signal 2226) system information, paging information, or a DL reference signal in the one or more bandwidth parts.

The apparatus includes a transmission component 2216 that transmits signals 2270 to the UE 2250 on the DL.

The apparatus may include additional components that perform each of the blocks of the algorithm in the aforementioned flowcharts of FIGS. 20 and 21. As such, each block in the aforementioned flowcharts of FIGS. 20 and 21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 23:
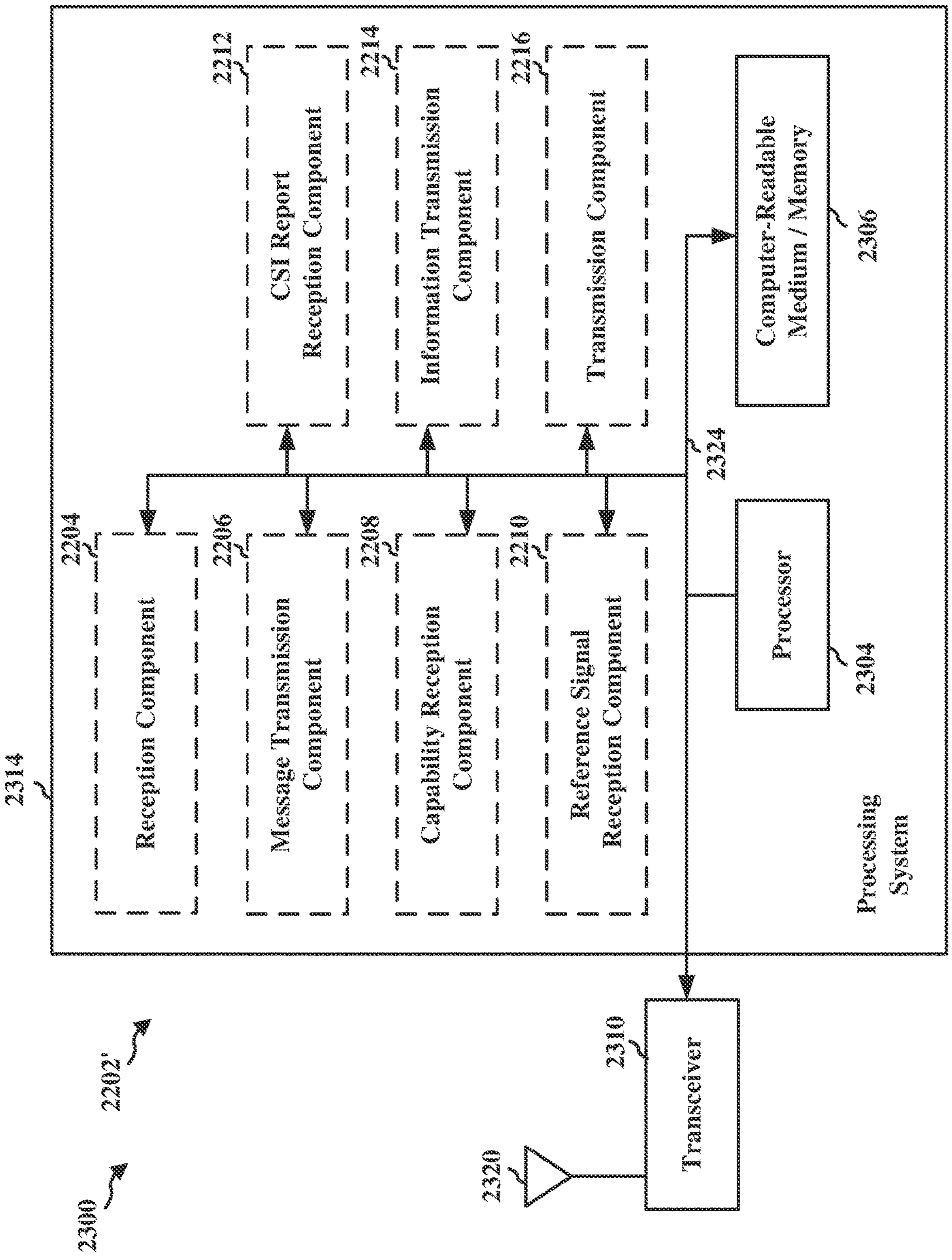
FIG. 23 is a diagram illustrating an example of a hardware implementation for an apparatus employing a processing system.

FIG. 23 is a diagram 2300 illustrating an example of a hardware implementation for an apparatus 2202' employing a processing system 2314. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors and/or hardware components, represented by the processor 2304, the components 2204, 2206, 2208, 2210, 2212, 2214, 2216 and the computer-readable medium/memory 2306. The bus 2324 may also link various other circuits such as timing sources, peripherals, voltage regulators, and power management circuits, which are well known in the art, and therefore, will not be described any further.

The processing system 2314 may be coupled to a transceiver 2310. The transceiver 2310 is coupled to one or more antennas 2320. The transceiver 2310 provides a means for communicating with various other apparatus over a transmission medium. The transceiver 2310 receives a signal from the one or more antennas 2320, extracts information from the received signal, and provides the extracted information to the processing system 2314, specifically the reception component 2204. In addition, the transceiver 2310 receives information from the processing system 2314, specifically the transmission component 2216, and based on the received information, generates a signal to be applied to the one or more antennas 2320. The processing system 2314 includes a processor 2304 coupled to a computer-readable medium/memory 2306. The processor 2304 is responsible for general processing, including the execution of software stored on the computer-readable medium/memory 2306. The software, when executed by the processor 2304, causes the processing system 2314 to perform the various functions described supra for any particular apparatus. The computer-readable medium/memory 2306 may also be used for storing data that is manipulated by the processor 2304 when executing software. The processing system 2314 further includes at least one of the components 2204, 2206, 2208, 2210, 2212, 2214, 2216. The components may be software components running in the processor 2304, resident/stored in the computer readable medium/memory 2306, one or more hardware components coupled to the processor 2304, or some combination thereof. The processing system 2314 may be a component of the base station 310 and may include the memory 376 and/or at least one of the TX processor 316, the RX processor 370, and the controller/processor 375. Alternatively, the processing system 2314 may be the entire base station (e.g., see 310 of FIG. 3).

In one configuration, the apparatus 2202/2202' for wireless communication includes means for performing each of the operations described with reference to FIGS. 20, 21, and 25. The aforementioned means may be one or more of the aforementioned components of the apparatus 2202 and/or the processing system 2314 of the apparatus 2202' configured to perform the functions recited by the aforementioned means. As described supra, the processing system 2314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 24:
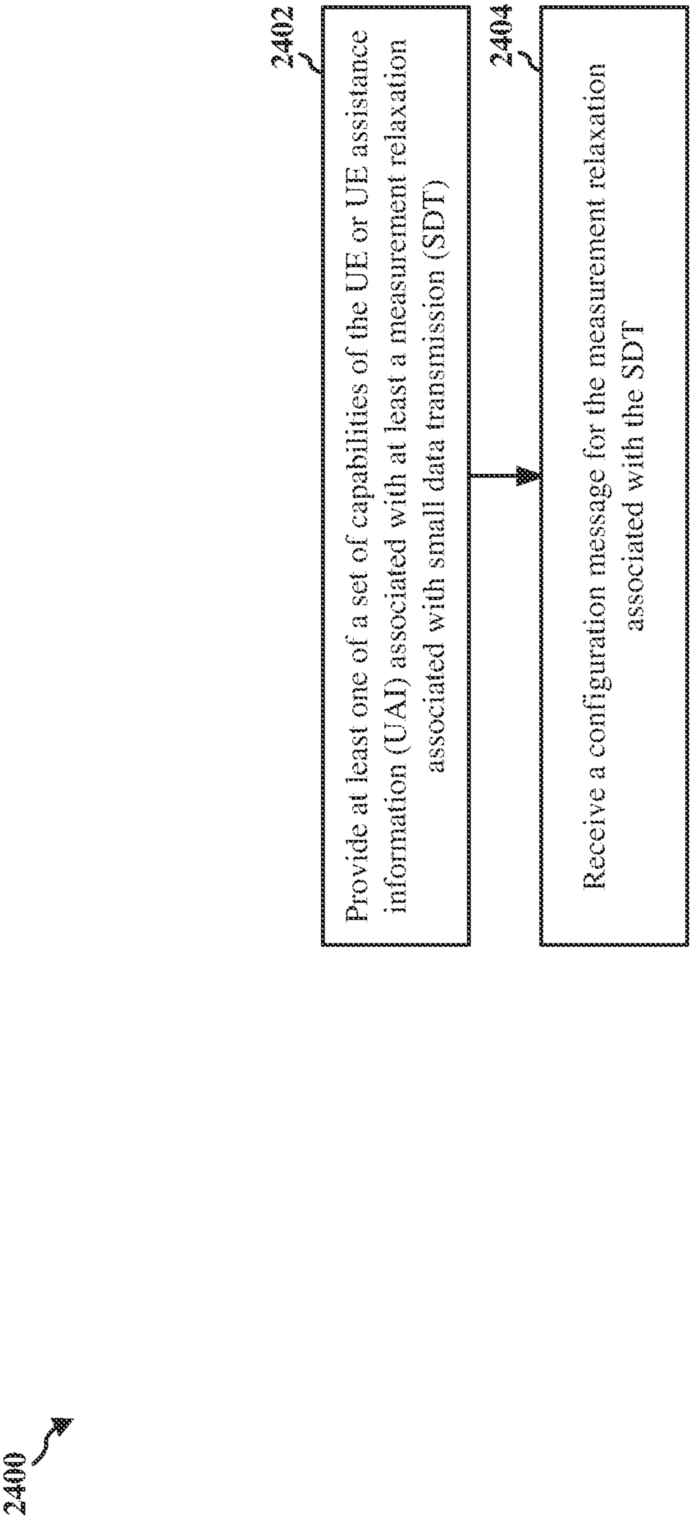
FIG. 24 is a flowchart of another exemplary method of wireless communication.

FIG. 24 is a flowchart 2400 of another exemplary method of wireless communication. The method may be performed by a UE (e.g., the UE 104, 1002, 1102, 1202, 1302, 1502; the apparatus 1802/1802'; the processing system 1914, which may include the memory 360 and which may be the entire UE 104, 1002, 1102, 1202, 1302, 1502 or a component of the UE 104, 1002, 1102, 1202, 1302, 1502, such as the TX processor 368, the RX processor 356, and/or the controller/processor 359).

At 2402, the UE provides at least one of a set of capabilities of the UE or UE assistance information (UAI) associated with at least a measurement relaxation associated with small data transmission (SDT). For example, the set of capabilities may indicate that the UE is capable of small data transmission (SDT), performing relaxed measurements during SDT, or other suitable capability. As another example, the UAI may indicate the UE relaxation state for performing different types of measurements (e.g., radio resource management (RRM), radio link monitoring (RLM), bidirectional forwarding detection (BFD)) while SDT is ongoing, the availability of data and/or signaling mapped to radio bearers not configured for SDT, or other suitable UAI. In some examples, the UAI may further include reports (e.g., CSI reports or other suitable reports) associated with measurement of CD-SSBs and/or NCD-SSBs in the serving cell and non-serving cell.

At 2404, the UE receives a configuration message for the measurement relaxation associated with the SDT. In some examples, all or part of the RRC configuration may be included in an RRC release message. The RRC message may indicate, for example, a number of SSBs (e.g., CD-SSBs and/or NCD-SSBs) associated with the serving cell and a non-serving cell (e.g., a neighbor or target cell for cell reselection) for the UE to measure. For example, the configured measurement relaxation can include a reduced duty cycle for measurements of serving/neighbor cells or a fewer number of neighbor cells to measure.

Figure 25:
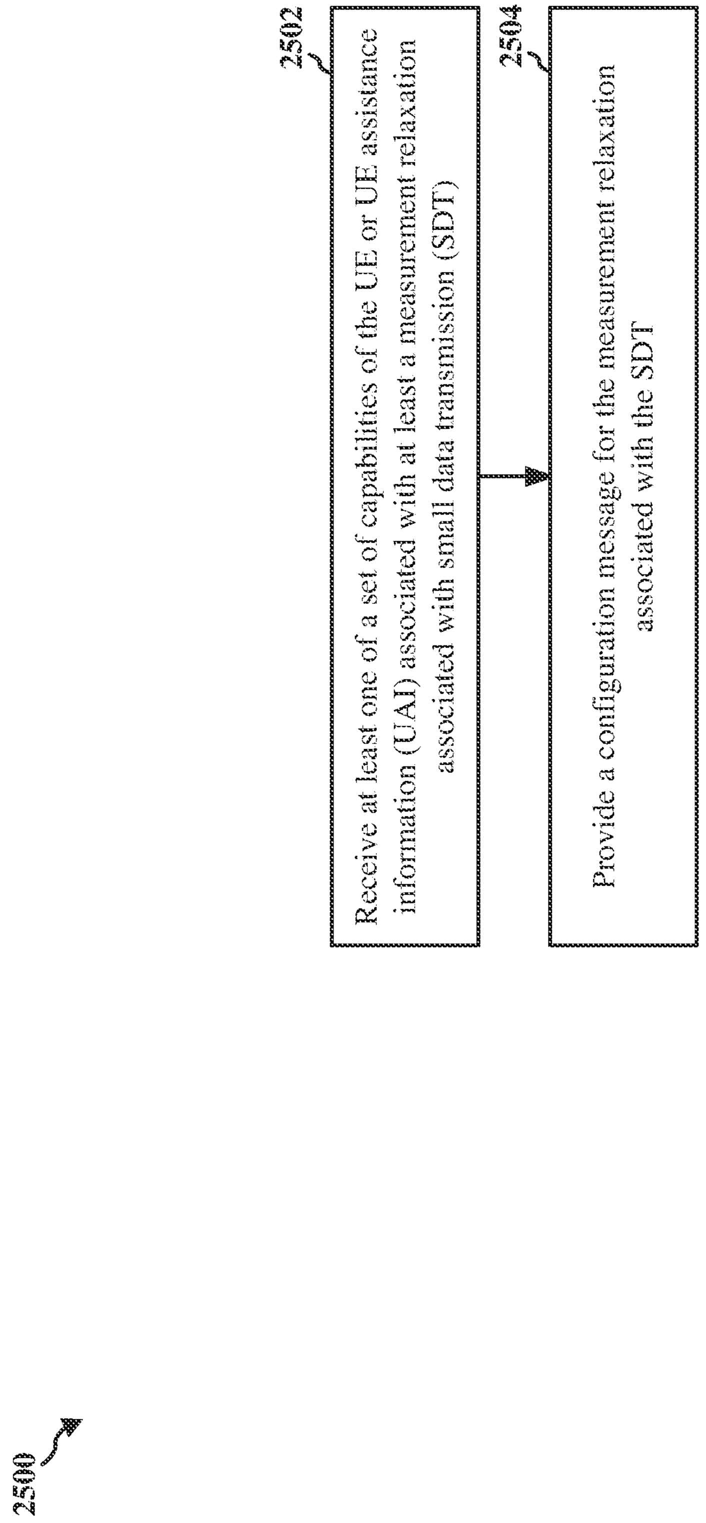
FIG. 25 is a flowchart of another method of wireless communication.

FIG. 25 is a flowchart 2500 of another exemplary method of wireless communication. The method may be performed by a base station (e.g., the base station 102, 1004, 1104, 1204, 1304, 1504; the apparatus 2202/2202'; the processing system 2314, which may include the memory 376 and which may be the entire base station 102, 1004, 1104, 1204, 1304, 1504 or a component of the base station 102, 1004, 1104, 1204, 1304, 1504, such as the TX processor 316, the RX processor 370, and/or the controller/processor 375).

At 2502, the base station receives at least one of a set of capabilities of a UE or UE assistance information (UAI) associated with at least a measurement relaxation associated with small data transmission (SDT). For example, the set of capabilities may indicate that the UE is capable of small data transmission (SDT), performing relaxed measurements during SDT, or other suitable capability. As another example, the UAI may indicate the UE relaxation state for performing different types of measurements (e.g., radio resource management (RRM), radio link monitoring (RLM), bidirectional forwarding detection (BFD)) while SDT is ongoing, the availability of data and/or signaling mapped to radio bearers not configured for SDT, or other suitable UAI. In some examples, the UAI may further include reports (e.g., CSI reports or other suitable reports) associated with measurement of CD-SSBs and/or NCD-SSBs in the serving cell and non-serving cell.

At 2504, the base station provides a configuration message associated with the measurement relaxation associated with the SDT. In some examples, all or part of the RRC configuration may be included in an RRC release message. The RRC message may indicate, for example, a number of SSBs (e.g., CD-SSBs and/or NCD-SSBs) associated with the serving cell and a non-serving cell (e.g., a neighbor or target cell for cell reselection) for the UE to measure. For example, the configured measurement relaxation can include a reduced duty cycle for measurements of serving/neighbor cells or a fewer number of neighbor cells to measure.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A. B. and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C. B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A user equipment (UE) for wireless communication, comprising:

at least one memory; and at least one processor coupled to the at least one memory and configured to:

obtain at least one of:

a first measurement of a first SSB that is associated with the serving cell or a downlink (DL) reference signal that is quasi-colocated with the first SSB in an initial DL bandwidth part, or a second measurement of a second SSB that is associated with the non-serving cell or a DL reference signal that is quasi-colocated with the second SSB in the initial DL bandwidth part;

determine that an event trigger has occurred, at least in part, based on when a first metric associated with the first measurement of the first SSB or the DL reference signal that is quasi-colocated with the first SSB is less than at least one set of thresholds configured for the serving cell, or when a second metric associated with the second measurement of the second SSB or the DL reference signal that is quasi-colocated with the second SSB is less than at least one set of thresholds configured for the non-serving cell;

obtain, in response to the event trigger, at least one of:

a third measurement of a third synchronization signal block (SSB) that is associated with the serving cell or a downlink (DL) reference signal that is quasi-colocated with the third SSB, or a fourth measurement of a fourth SSB that is associated with a non-serving cell or a DL reference signal that is quasi-colocated with the fourth SSB in one or more bandwidth parts that are not an initial DL bandwidth part configured by a serving cell of the UE; and perform a cell reselection operation based on at least one of the first measurement or the second measurement;

wherein each of the first SSB and the second SSB is a non-cell-defining synchronization signal block (NCD-SSB), and each of the third SSB and the fourth SSB is a cell-defining synchronization signal block (CD-SSB).

2. The UE of claim 1, wherein the at least one processor is further configured to:

indicate a set of capabilities of the UE and UE assistance information (UAI) associated with at least one of a measurement relaxation, a cell reselection operation, a small data transmission, or a small data reception of the apparatus in an inactive mode or an idle mode; and receive a configuration message for the measurement relaxation associated with the cell reselection operation.

3. The UE of claim 1, wherein a cell-defining synchronization signal block (CD-SSB) is not present in the initial DL bandwidth part of the UE, or a CD-SSB associated with the serving cell has a numerology different from a CD-SSB associated with the non-serving cell.

4. The UE of claim 1, wherein the initial DL bandwidth part and the one or more bandwidth parts are each less than a total bandwidth of the serving cell of the UE, and wherein the initial DL bandwidth part supports one or more small data transmissions or one or more small data receptions in an inactive mode or an idle mode of the UE.

5. The UE of claim 1, wherein the at least one processor is further configured to:

determine that the event trigger has occurred, at least in part, based on whether the UE has a valid timing advance (TA) and a valid configured grant physical uplink shared channel (CG-PUSCH) occasion for a configured grant small data transmission (CG-SDT).

6. A method for wireless communication at a user equipment (UE), the method comprising:

obtaining at least one of:

a first measurement of a first SSB that is associated with the serving cell or a downlink (DL) reference signal that is quasi-colocated with the first SSB in an initial DL bandwidth part, or a second measurement of a second SSB that is associated with the non-serving cell or a DL reference signal that is quasi-colocated with the second SSB in the initial DL bandwidth part;

determining that an event trigger has occurred, at least in part, based on when a first metric associated with the first measurement of the first SSB or the DL reference signal that is quasi-colocated with the first SSB is less than at least one set of thresholds configured for the serving cell, or when a second metric associated with the second measurement of the second SSB or the DL reference signal that is quasi-colocated with the second SSB is less than at least one set of thresholds configured for the non-serving cell;

obtaining, in response to the event trigger, at least one of:

a third measurement of a third synchronization signal block (SSB) that is associated with the serving cell or a downlink (DL) reference signal that is quasi-colocated with the third SSB, or a fourth measurement of a fourth SSB that is associated with a non-serving cell or a DL reference signal that is quasi-colocated with the fourth SSB in one or more bandwidth parts that is not an initial DL bandwidth part configured by a serving cell of the UE; and performing a cell reselection operation based on at least one of the first measurement or the second measurement;

wherein each of the first SSB and the second SSB is a non-cell-defining synchronization signal block (NCD-SSB), and each of the third SSB and the fourth SSB is a cell-defining synchronization signal block (CD-SSB).

7. The method of claim 6, further comprising:

indicating a set of capabilities of the UE and UE assistance information (UAI) associated with at least one of a measurement relaxation, a cell reselection operation, a small data transmission, or a small data reception of the UE in an inactive mode or an idle mode; and receiving a configuration message for the measurement relaxation associated with the cell reselection operation.

8. The method of claim 6, wherein a cell-defining synchronization signal block (CD-SSB) is not present in the initial DL bandwidth part of the UE, or a CD-SSB associated with the serving cell has a numerology different from a CD-SSB associated with the non-serving cell.

9. The method of claim 6, wherein the initial DL bandwidth part and the one or more bandwidth parts are each less than a total bandwidth of the serving cell of the UE, and wherein the initial DL bandwidth part supports one or more small data transmissions or one or more small data receptions in an inactive mode or an idle mode of the UE.

10. The method of claim 6, further comprising:

determining that the event trigger has occurred, at least in part, based on whether the UE has a valid timing advance (TA) and a valid configured grant physical uplink shared channel (CG-PUSCH) occasion for a configured grant small data transmission (CG-SDT).

11. A non-transitory computer-readable medium having stored therein instructions executable by one or more processors of a user equipment (UE) to cause the UE to:

obtain at least one of:

a first measurement of a first SSB that is associated with the serving cell or a downlink (DL) reference signal that is quasi-colocated with the first SSB in an initial DL bandwidth part, or a second measurement of a second SSB that is associated with the non-serving cell or a DL reference signal that is quasi-colocated with the second SSB in the initial DL bandwidth part;

determine that an event trigger has occurred, at least in part, based on when a first metric associated with the first measurement of the first SSB or the DL reference signal that is quasi-colocated with the first SSB is less than at least one set of thresholds configured for the serving cell, or when a second metric associated with the second measurement of the second SSB or the DL reference signal that is quasi-colocated with the second SSB is less than at least one set of thresholds configured for the non-serving cell;

obtain, in response to the event trigger, at least one of:

a third measurement of a third synchronization signal block (SSB) that is associated with the serving cell or a downlink (DL) reference signal that is quasi-colocated with the third SSB, or a fourth measurement of a fourth SSB that is associated with a non-serving cell or a DL reference signal that is quasi-colocated with the fourth SSB in one or more bandwidth parts that are not an initial DL bandwidth part configured by a serving cell of the UE; and perform a cell reselection operation based on at least one of the first measurement or the second measurement;

wherein each of the first SSB and the second SSB is a non-cell-defining synchronization signal block (NCD-SSB), and each of the third SSB and the fourth SSB is a cell-defining synchronization signal block (CD-SSB).

12. The non-transitory computer-readable medium of claim 11, further comprising instructions executable by the one or more processors of the UE to cause the UE to:

indicate a set of capabilities of the UE and UE assistance information (UAI) associated with at least one of a measurement relaxation, a cell reselection operation, a small data transmission, or a small data reception of the UE in an inactive mode or an idle mode; and receive a configuration message for the measurement relaxation associated with the cell reselection operation.

13. The non-transitory computer-readable medium of claim 11, wherein a cell-defining synchronization signal block (CD-SSB) is not present in the initial DL bandwidth part of the UE, or a CD-SSB associated with the serving cell has a numerology different from a CD-SSB associated with the non-serving cell.

14. The non-transitory computer-readable medium of claim 11, wherein the initial DL bandwidth part and the one or more bandwidth parts are each less than a total bandwidth of the serving cell of the UE, and wherein the initial DL bandwidth part supports one or more small data transmissions or one or more small data receptions in an inactive mode or an idle mode of the UE.

15. The non-transitory computer-readable medium of claim 11, further comprising instructions executable by the one or more processors of the UE to cause the UE to:

determine that the event trigger has occurred, at least in part, based on whether the UE has a valid timing advance (TA) and a valid configured grant physical uplink shared channel (CG-PUSCH) occasion for a configured grant small data transmission (CG-SDT).

* * * * *